(12) United States Patent
Iwaki et al.

(10) Patent No.: US 6,983,653 B2
(45) Date of Patent: Jan. 10, 2006

(54) FLOW SENSOR HAVING THIN FILM PORTION AND METHOD FOR MANUFACTURING THE SAME

(75) Inventors: Takao Iwaki, Obu (JP); Hiroyuki Wado, Toyota (JP); Toshimasa Yamamoto, Tokyo (JP); Kiyokazu Isomura, Kariya (JP); Tomoyuki Mizutani, Nisshin (JP); Akihiko Teshigahara, Nisshin (JP); Ryuuichirou Abe, Ichinomiya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/731,094

(22) Filed: Dec. 10, 2003

(65) Prior Publication Data

US 2004/0118202 A1   Jun. 24, 2004

(30) Foreign Application Priority Data

| Dec. 13, 2002 | (JP) | .............................. 2002-362187 |
| Dec. 13, 2002 | (JP) | .............................. 2002-362189 |
| Dec. 25, 2002 | (JP) | .............................. 2002-375021 |
| Jan. 29, 2003 | (JP) | .............................. 2003-020407 |
| Nov. 11, 2003 | (JP) | .............................. 2003-381757 |

(51) Int. Cl.
    *G01F 1/68*   (2006.01)
(52) U.S. Cl. .............................. 73/204.23; 73/204.25; 73/204.26; 73/283.1
(58) Field of Classification Search .......... 73/700–756, 73/283.1, 283.2, 283.3, 283.4, 204.25, 204.26
    See application file for complete search history.

(56) References Cited

U.S. PATENT DOCUMENTS

| 4,744,246 | A | * | 5/1988 | Busta ....................... 73/204.26 |
| 6,441,451 | B1 | * | 8/2002 | Ikeda et al. ................. 257/418 |
| 6,450,025 | B1 | | 9/2002 | Wado et al. |
| 6,490,915 | B2 | | 12/2002 | Yamada et al. |
| 6,725,724 | B2 | * | 4/2004 | Gluck ......................... 73/715 |
| 2003/0015034 | A1 | | 1/2003 | Iwaki et al. |

FOREIGN PATENT DOCUMENTS

| JP | 11-258021 | 9/1999 |
| JP | 2001-12985 | 1/2001 |
| JP | 2001-194201 | 7/2001 |
| JP | 2001-215141 | 8/2001 |
| JP | 2002-48616 | 2/2002 |
| JP | 2002-71416 | 3/2002 |

* cited by examiner

Primary Examiner—Max Noori
Assistant Examiner—Jermaine Jenkins
(74) Attorney, Agent, or Firm—Nixon & Vanderhye P.C.

(57) ABSTRACT

A flow sensor for detecting flow of fluid includes a thin film portion. The thin film portion has a heater and a detector for detecting temperature around the heater. The heater is made of semiconductor. This flow sensor has high sensor sensitivity with low energy consumption. Further, the sensor has high detection accuracy, and the thin film portion has high endurance. Furthermore, the flow sensor with a passivation film has appropriate thickness so as to improve strength of a thin film portion.

66 Claims, 40 Drawing Sheets

| MATERIAL | K [W/(m·k)] | ρ [Ω·m] | Kρ [W·Ω/k] |
|---|---|---|---|
| Aℓ | 236 | $5.50 \times 10^{-8}$ | $1.30 \times 10^{-5}$ |
| W | 177 | $4.90 \times 10^{-8}$ | $8.67 \times 10^{-6}$ |
| Pt | 72 | $9.81 \times 10^{-8}$ | $7.06 \times 10^{-6}$ |
| Cu | 403 | $1.55 \times 10^{-8}$ | $6.25 \times 10^{-6}$ |
| Si | 168 | $1.00 \times 10^{-5}$ | $1.68 \times 10^{-3}$ |

| TEMP. (°C) \ RATIO | 1/3 | 1/1 | 2/1 | 4/1 | 6/1 | 8/1 | 10/1 |
|---|---|---|---|---|---|---|---|
| 750 | × | × | × | ○ | ○ | ○ | ×× |
| 800 | × | × | ○ | ○ | ○ | ×× |  |
| 850 | × | ○ | ○ | ○ | ×× |  |  |

| TEMP. (°C) \ RATIO | 1/3 | 1/1 | 2/1 | 4/1 | 6/1 | 8/1 | 10/1 |
|---|---|---|---|---|---|---|---|
| 750 | 2 |  | 2.05 | 2.12 | 2.19 | 2.24 | 2.34 |
| 800 |  | 2.07 | 2.1 | 2.15 | 2.25 | 2.37 |  |
| 850 | 2.08 | 2.14 | 2.2 | 2.28 | 2.35 |  |  |

FLOW SENSOR HAVING THIN FILM PORTION AND METHOD FOR MANUFACTURING THE SAME

CROSS REFERENCE TO RELATED APPLICATIONS

This application is based on Japanese Patent Applications No. 2002-362189 filed on Dec. 13, 2002, No. 2002-362187 filed on Dec. 13, 2002, No. 2002-375021 filed on Dec. 25, 2002, No. 2003-20407 filed on Jan. 29, 2003, and No. 2003-381757 filed on Nov. 11, 2003, the disclosures of which are incorporated herein by reference.

FIELD OF EXEMPLARY EMBODIMENTS OF THE INVENTION

The exemplary embodiments of the present invention relate to a flow sensor having a thin film portion for detecting flow of fluid.

BACKGROUND

A thermal type flow sensor according to a prior art is disclosed in Japanese Patent Application Publications No. 2002-48616 and No. H11-258021. FIG. 63 shows a sensor 5000 according to the prior art. This sensor 5000 detects flow of fluid with measuring heat absorbed by the fluid.

Specifically, the sensor 5000 includes a heater for generating heat, and the heat is absorbed in the fluid. In this case, as amount of the flow of the fluid becomes large, the absorbed heat increases. Thus, the sensor 5000 detects the flow on the basis of the absorbed heat. For example, the heater is energized so as to maintain the temperature nearby the heater at a predetermined temperature. In this case, the heater consumes electric power, which corresponds to the absorbed heat, so that the electric power consumption in proportion to the flow of fluid is measured.

Alternatively, a thermal type flow sensor having a heater and a detector controls the heater so as to maintain a detected temperature at a predetermined temperature. The detector detects the temperature nearby the heater, the temperature including information of heat absorbed in fluid. Thus, the sensor detects flow of the fluid in proportion to the absorbed heat. In general, the heater works as a detector for detecting its own temperature.

The sensor 5000 includes a semiconductor substrate 5001 having a concavity. In the concavity, a sensing portion 5010 is disposed. The sensing portion 5010 detects flow of fluid. The sensing portion 5010 has a heater 5011, a pair of upstream temperature detectors 5012a, 5012b and a pair of downstream temperature detectors 5013a, 5013b. The pair of upstream temperature detectors 5012a, 5012b detects the temperature of the fluid disposed upstream from the heater 5011. The pair of downstream temperature detectors 5013a, 5013b detects the temperature of the fluid disposed downstream from the heater 5011. Further, the sensor 5000 includes an environmental temperature detector 5020 disposed on the substrate 5001. The environmental temperature detector 5020 detects the temperature of environment of the sensor 5000.

Each of the heater 5011, the pair of upstream temperature detectors 5012a, 5012b, the pair of downstream temperature detectors 5013a, 5013b and the environmental temperature detector 5020 connects to a pad 5040a–5040h through a lead wire 5030a–5030l, respectively. Then, they connect to an electronic circuit (not shown) for outputting a sensor signal corresponding to the flow.

Each of the heater 5011, the pair of upstream temperature detectors 5012a, 5012b, the pair of downstream temperature detectors 5013a, 5013b and the environmental temperature detector 5020 detects temperature by measuring its own resistance change. The electric circuit controls electric power supplying to the heater 5011 in such a manner that the temperature of the heater 5011, which is detected by its own resistance change, is set to be higher with a predetermined temperature than the environmental temperature detected by the environmental temperature detector 5020. Further, the electric circuit detects the heat absorbed by the fluid passing through the heater 5011 in accordance with the temperatures detected by the upstream and downstream temperature detectors 5012a–5013b.

In this sensor 5000, it is required to enlarge a width W of the heater 5011 in a flowing direction Z of the fluid so that sensitivity of the temperature of the heater 5011 is improved. However, when the width W of the heater 5011 is wide, sensitivity of the flow of the fluid is reduced. Further, the energy consumption of the sensor increases.

In addition, to improve sensor sensitivity of a flow sensor and to reduce electric power consumption of the flow sensor, it is required to decrease resistance of a lead wire of the sensor. In this view, a flow sensor having a thick lead wire according to a prior art is disclosed in Japanese Patent Application Publication No. 2002-71416. In this sensor, the thickness of the lead wire is in a range between 1 $\mu$m and 2 $\mu$m so as to reduce the resistance of the lead wire.

However, the sensor having the thick lead wire includes a large step disposed on the surface of the sensor. The large step disturbs the flow of the fluid, so that detection accuracy of the sensor is decreased. Further, a contamination in the fluid may adhere to the large step, so that heat capacity or heat conductivity of the sensor is changed. Therefore, the detection accuracy of the sensor is decreased.

Further, a flow sensor having a heater and a detector made of poly silicon film according to a prior art is disclosed in Japanese Patent Application Publications No. H11-258021 and No. 2001-12985.

When the heater and the detector are made of poly crystalline silicon film, the surface of each of the heater and the detector has a concavity and convexity since the poly crystalline silicon film has a grain boundary. Therefore, a passivation film covering the heater and the detector also has a surface with a concavity and convexity. If the top surface of the sensor, i.e., the surface of the passivation film has the concavity and convexity, a stress is concentrated at the concavity and convexity of the passivation film. This stress concentration at the concavity and convexity causes decrease of pressure resistance of the poly silicon film and decrease of maximum detection value of flow of fluid. Here, the maximum detection value is defined as a value, at which the poly silicon film is broken.

Further, in the above sensor, part of the passivation film becomes thin, the part being disposed at a corner of the heater or detector. Specifically, the corner of the heater or detector is sharpened, so that the thickness of the passivation film covering the corner of the heater or detector becomes small. Especially, when the heater or detector is formed with a dry etching method, the corner is much sharpened. This partially thinned passivation film causes decrease of pressure resistance of the poly silicon film and decrease of endurance against a collision of a large dust hit the passivation film.

The above sharpening of the corner also occurs in a sensor having a heater and detector made of single crystal silicon. Therefore, a passivation film covering the corner is thinned, so that pressure resistance of the thin film portion is reduced and endurance against a collision of a large dust hit on the passivation film is decreased.

Further, a flow sensor having a passivation film made of silicon nitride according to a prior art is disclosed in Japanese Patent Application Publications No. H11-271123 and No. 2001-194201. The passivation film reinforces a thin film portion of the sensor. However, the thickness of the passivation film is limited so that damage caused by the collision of a dust hit on the passivation film is not sufficiently reduced. Further, to reduce a large tensile stress in the silicon nitride film, a thick silicon oxide film is formed between a substrate and the silicon nitride film. The large tensile stress is mainly applied to the silicon nitride film when the silicon nitride film is formed on the substrate. When the thickness of the silicon oxide film becomes large, the Young's modulus of the thin film portion is reduced. Therefore, the thin film portion is easily deformed, so that the endurance of the thin film portion is decreased.

SUMMARY

In view of the above problem, it is a feature of exemplary embodiments of the present invention to provide a flow sensor having high sensor sensitivity with low energy consumption and to provide a method for manufacturing the same.

It is another feature of exemplary embodiments of the present invention to provide a flow sensor having high detection accuracy and to provide a method for manufacturing the same.

It is further another feature of exemplary embodiments of the present invention to provide a flow sensor with a thin film portion having high endurance and to provide a method for manufacturing the same.

It is furthermore another feature of exemplary embodiments of the present invention to provide a flow sensor with a passivation film having appropriate thickness so as to improve strength of a thin film portion and to provide a method for manufacturing the same.

A flow sensor for detecting flow of fluid includes a thin film portion. The thin film portion has a heater and a detector for detecting temperature around the heater. The heater is made of semiconductor. This flow sensor has high sensor sensitivity with low energy consumption, and high detection accuracy. Further, the sensor with the thin film portion has high endurance.

Preferably, the heater is made of semiconductor having P type conductivity, and has a width in a range between 7 $\mu$m and 80 $\mu$m. More preferably, the semiconductor having P type conductivity is a boron doped silicon. Furthermore, preferably, the semiconductor having P type conductivity has an impurity concentration being equal to or larger than $1 \times 10^{20} cm^{-3}$.

Preferably, the heater is made of poly crystalline silicon. More preferably, the heater is made of phosphorous doped poly crystalline silicon. Furthermore, preferably, the phosphorous doped poly crystalline silicon has a phosphorous concentration being equal to or larger than $2 \times 10^{20} cm^{-3}$.

Preferably, the sensor further includes a lead wire connecting to the heater for supplying electric power to the heater. The heater is provided by a resistor. The resistor and the lead wire are made of semiconductor film, and the resistor is locally thinned.

Preferably, the sensor further includes a passivation film. At least one of the heater and the detector is made of a semiconductor resistor. The passivation film covers the heater and the detector. The semiconductor resistor has a surface covered with a thermal oxidation film.

Preferably, the sensor further includes a passivation film. The passivation film covers at least one surface of the heater and the detector. Here, one surface is disposed in a passage of the fluid. The passivation film is made of silicon nitride film having silicon rich composition, in which a ratio of silicon to nitrogen is larger than that in a stoichiometric composition. In this case, the sensor with the passivation film has appropriate thickness so as to improve strength of the thin film portion.

Further, a method for manufacturing a flow sensor for detecting flow of fluid includes the steps of forming a thin film portion with using a silicon substrate, and forming a heater and a detector in the thin film portion. Here, the sensor includes the thin film portion. The thin film portion has the heater and the detector for detecting temperature around the heater. The heater is made of semiconductor. The sensor manufactured with this method has high sensor sensitivity with low energy consumption, and high detection accuracy. Further, the sensor with the thin film portion has high endurance.

Furthermore, a method for manufacturing a flow sensor having a heater, detector for detecting flow of fluid and a lead wire connecting to the heater and the detector for supplying electric power, includes the step of forming a semiconductor film as the heater, the detector and the lead wire. The sensor manufactured with this method has high sensor sensitivity with low energy consumption, and high detection accuracy. Further, the sensor with the thin film portion has high endurance.

Preferably, the method further includes the step of thinning part of the semiconductor film for providing the heater and the detector. More preferably, the method further includes the steps of forming a mask film on one part of the semiconductor film for providing the heater and the detector, and performing heat treatment to the semiconductor film with using the mask film so that the other part of the semiconductor film is insulated so as to form the heater and the detector as a non-insulated part. Further, preferably, the method further includes the steps of forming a passivation film on the heater and the detector, patterning a semiconductor film into a semiconductor resistor so that the semiconductor resistor provides the heater and the detector, and performing heat treatment to the patterned semiconductor film so that a thermal oxidation film is formed on the surface of the semiconductor resistor. The heater, the detector and the passivation film provide a thin film portion. Furthermore, preferably, the method further includes the step of forming a passivation film with using a thermal chemical vapor deposition method. The passivation film is made of silicon nitride film having silicon rich composition, in which a ratio of silicon to nitrogen is larger than that in a stoichiometric composition.

BRIEF DESCRIPTION OF THE DRAWINGS

The above and other objects, features and advantages of exemplary embodiments of the present invention will become more apparent from the following detailed description made with reference to the accompanying drawings. In the drawings.

DETAILED DESCRIPTION OF NON-LIMITING EXEMPLARY (First Embodiment)

Figure 63:
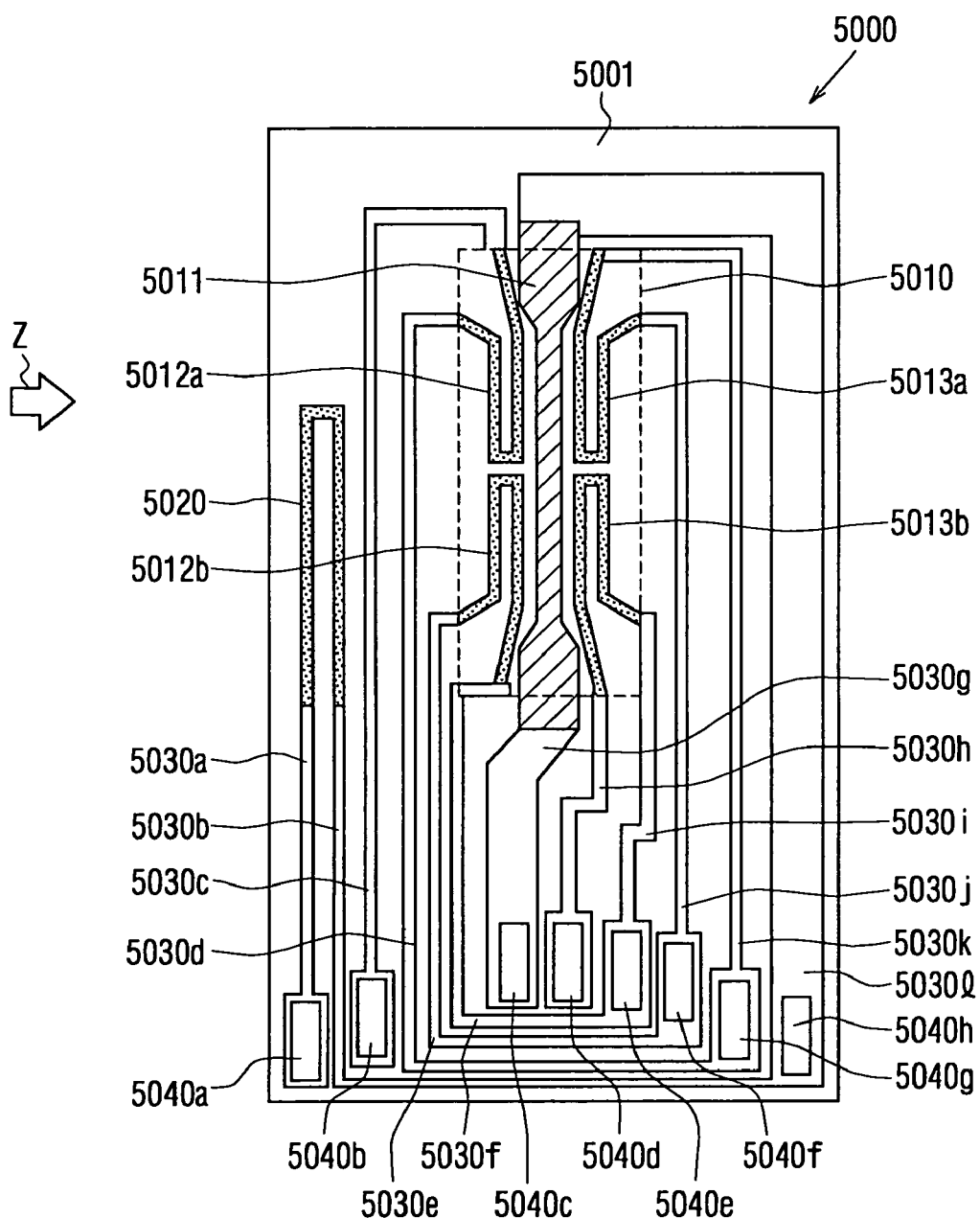
FIG. 63 is a plan view showing a flow sensor according to a prior art.

The inventors have considered the reason why sensitivity of the flow sensor 5000 according to the prior art is reduced when the width W of the heater 5011 becomes wide in case of the flow sensor 5000 shown in FIG. 63. Further, the inventors have considered the reason why the energy consumption of the sensor 5000 increases when the width W of the heater 5011 in the flow sensor 5000 becomes wide. The reasons are described as follows.

When the width W of the heater 5011 of the sensor 5000 becomes large, the resistance of the heater 5011 is reduced. Specifically, the resistance of the heater 5011 is decreased compared with that of the lead wire 5030g, 5030l. On the other hand, the temperature of the heater 5011 is detected by its resistance change. The resistance change includes voltage drops at the lead wires 5030g, 5030l. Therefore, when the resistance of the heater 5011 is comparatively small in relation to the resistance of the lead wires 5030g, 5030l, the voltage drops at the lead wires 5030g, 5030l becomes comparatively large. Thus, a detection accuracy of the temperature of the heater 311 is reduced because the resistance change includes comparatively large voltage drops as an error. Accordingly, the sensitivity of the sensor 5000 is reduced.

Next, the reason why the energy consumption of the sensor 5000 increases is described as follows. The same amount of current flows through the heater 5011 and through the lead wires 5030g, 5030l. When the resistance of the heater 5011 becomes small, it is required to enlarge the current flowing through the heater 5011 so that a predetermined heat is necessitated to generate at the heater 5011. Therefore, the current passing through the lead wires 5030g, 5030l also increases, so that excess energy consumption at the lead wires 5030g, 5030l increases. Thus, the energy consumption of the sensor 5000 increases because of the excess energy consumption at the lead wires 5030g, 5030l.

Figure 1:
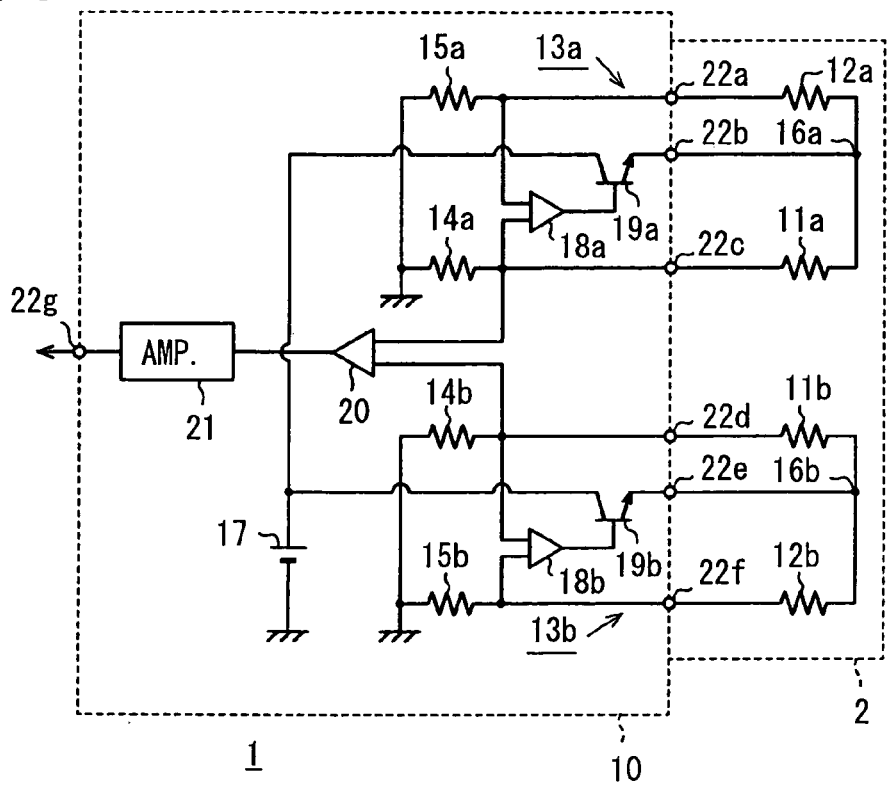
FIG. 1 is a circuit diagram showing a flow meter having a flow sensor according to a first embodiment of the present invention.

In view of the above consideration, a flow meter 1 having a flow sensor 2 according to a first embodiment of the present invention is prepared, as shown in FIG. 1. The meter 1 includes the thermal type flow sensor 2 and an electric circuit 10. The electric circuit 10 outputs a sensor signal in accordance with a flow of fluid detected by the flow sensor 2. The flow sensor 2 includes an upstream heater 11a and a downstream heater 11b, and an upstream temperature detector 12a and a downstream temperature detector 12b. Here, the upstream and downstream temperature detectors 12a, 12b also detect environmental temperature of the flow meter 1 on the basis of their own resistance changes in accordance with temperature change. However, the upstream and downstream temperature detectors 12a, 12b can detect the environmental temperature with using other detecting method.

The upstream and downstream heaters 11a, 11b work as a heating element, and also work as a temperature detector for detecting its own temperature. Therefore, the upstream and downstream heaters 11a, 11b function as a resistance for generating heat, and change their resistance in accordance with their temperature, so that the resistance change corresponds to their temperature. Thus, the temperature of the heater 11a, 11b is obtained. The flow sensor 2 detects the flow of the fluid based on a heat absorbed in the fluid, the heat being generated between the upstream and downstream heaters 11a, 11b. The flow sensor 2 also detects a flow direction of the fluid based on difference between heats absorbed in the fluid, each of the heats being generated at the upstream or downstream heaters 11a, 11b, respectively.

The electric circuit 10 outputs a sensor signal in accordance with the detected flow of the fluid and the detected flow direction detected by the flow sensor 2. Specifically, the flow sensor 2 is supplied with electric power in such a manner that the difference between the upstream heater 11a and the upstream temperature detector 12a is controlled at a predetermined value, and the difference between the downstream heater 11b and the downstream temperature detector 12b is also controlled at another predetermined value. For, example, each predetermined value is set to be 200° C. The flow of fluid and the flow direction are calculated on the basis of the electric power supplied to the flow sensor 2. Then, the electric circuit 10 outputs the sensor signal in accordance with the flow of the fluid and the flow direction.

Next, the construction of the flow meter 1 having the flow sensor 2 and the electric circuit 10 is described as follows. The flow meter 1 includes an upstream Wheatstone bridge 13a and a downstream Wheatstone bridge 13b. The upstream Wheatstone bridge 13a corresponds to an upstream side of a suction passage, and the downstream Wheatstone bridge 13b corresponds to a downstream side of the suction passage.

In the upstream Wheatstone bridge 13a, the upstream heater 11a and a resistance 14a, and the upstream temperature detector 12a and a resistance 15a are connected each other in parallel in a case where the current flows from the upstream heater 11a to the resistance 14a, and flows from the upstream temperature detector 12a to the resistance 15a. A power supply 17 supplies a predetermined electric power toward a contact point 16a between the upstream heater 11a and the upstream temperature detector 12a through an upstream transistor 19a. Both of voltage drops at the upstream heater 11a and at the upstream temperature detector 12a are introduced into an upstream differential amplifier 18a. The upstream differential amplifier 18a controls the upstream transistor 19a in accordance with the above two voltage drops so that the two voltage drops are equalized, i.e., the upstream Wheatstone bridge 13a becomes balanced. Here, the upstream heater 11a, the contact point 16a and the upstream temperature detector 12a are connected to the electric circuit 10 through terminals 22a–22c, respectively.

When the upstream Wheatstone bridge 13a becomes balanced, the temperature of the upstream heater 11a is higher than that of the upstream temperature detector 12a with a predetermined temperature. Therefore, the temperature dependence of resistance of the upstream heater 11a is set to be equal to that of the upstream temperature detector 12a, which is set independently from the environmental temperature.

On the other hand, in the downstream Wheatstone bridge 13b, the downstream heater 11b and a resistance 14b, and the downstream temperature detector 12b and a resistance 15b are connected each other in parallel in a case where the current flows from the downstream heater 11b to the resistance 14b, and flows from the downstream temperature detector 12b to the resistance 15b. The power supply 17 supplies a predetermined electric power toward a contact point 16b between the downstream heater 11b and the downstream temperature detector 12b through a downstream transistor 19b. Both of voltage drops at the downstream heater 11b and at the downstream temperature detector 12b are introduced into a downstream differential amplifier 18b. The downstream differential amplifier 18b controls the downstream transistor 19b in accordance with the above two voltage drops so that the two voltage drops are equalized, i.e., the downstream Wheatstone bridge 13b becomes balanced. Here, the downstream heater 11b, the contact point 16b and the downstream temperature detector 12b are connected to the electric circuit 10 through terminals 22d–22f, respectively.

When the downstream Wheatstone bridge 13b becomes balanced, the temperature of the downstream heater 11b is higher than that of the downstream temperature detector 12b with a predetermined temperature. Therefore, the temperature dependence of resistance of the downstream heater 11b is set to be equal to that of the downstream temperature detector 12b, which is set independently from the environmental temperature.

Both of the voltage drops at the upstream heater 11a in the upstream Wheatstone bridge 13a and at the downstream heater 11b in the downstream Wheatstone bridge 13b are introduced into a differential amplifier 20. Then, the differential amplifier 20 outputs a sensor signal in accordance with a difference between the above two voltage drops. Then, the sensor signal is amplified with an amplifier circuit 21, and the amplified signal is outputted from a terminal 22g of the electric circuit 10. Here, the sensor signal outputted from the terminal 22g corresponds to the flow of the fluid and the flow direction.

Figure 2:
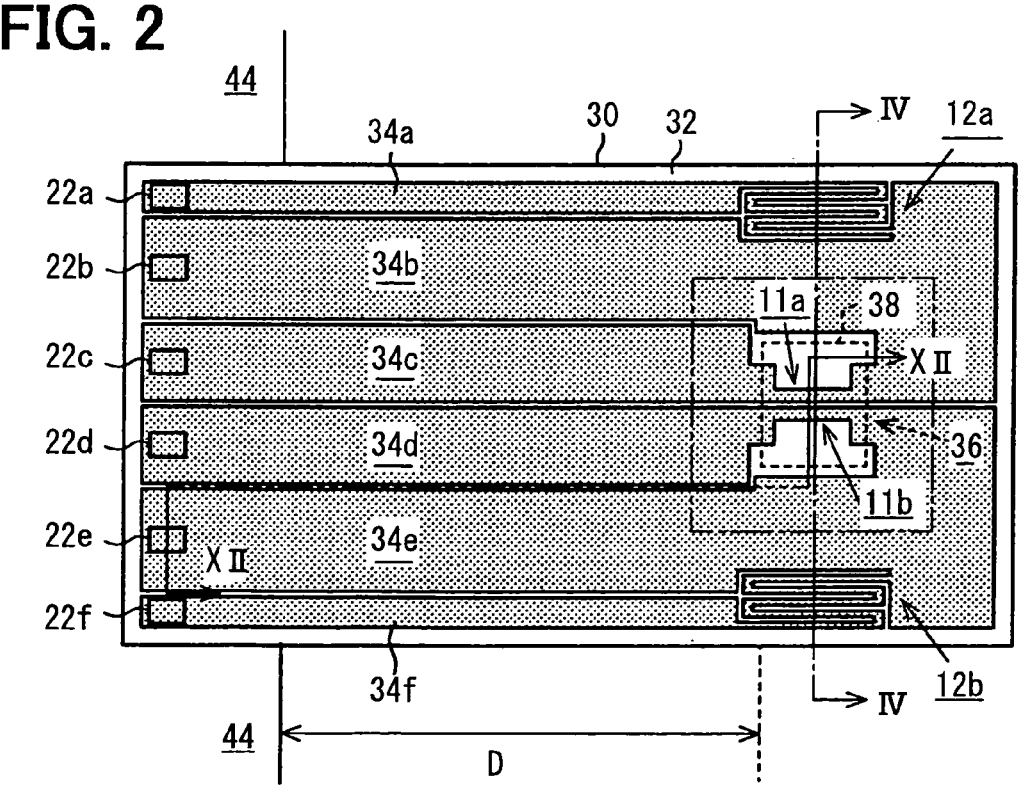
FIG. 2 is a plan view showing the flow sensor according to the first embodiment.

FIG. 2 shows the construction of the flow sensor 2. The flow sensor 2 includes a semiconductor substrate 30. A silicon oxide film 32 is formed on the substrate 30. The upstream and downstream heaters 11a, 11b, and the upstream and downstream temperature detectors 12a, 12b are formed on the silicon oxide film 32. The upstream and downstream heaters 11a, 11b, and the upstream and downstream temperature detectors 12a, 12b are connected to the terminals 22a–22f through lead wires 34a–34f, respectively.

The substrate 30 includes a concavity 36. Specifically, the backside of the substrate 30 is opened so as to form the concavity 36. The concavity 36 has a rectangular shape shown as a dashed line and a chain line in FIG. 2. Specifically, the opening of the backside of the substrate 30 has a shape shown as the chain line in FIG. 2. This opening area becomes small, as it goes to an upside of the substrate 30. Then, at the upside of the substrate 30, the opening area of the concavity 36 becomes a small rectangular shown as the dashed line in FIG. 2.

Since the substrate 30 has the concavity 36, the upstream and downstream heaters 11a, 11b are disposed on a thin film portion 38, which builds a bridge in the concavity 36 of the substrate 30. The thickness of the thin film portion 38 is thinner than other portions of the flow sensor 2. Therefore, heat capacitance of the thin film portion 38 becomes small, so that the thin film portion 38 is thermally isolated from the other portions of the flow sensor 2. Therefore, response of the sensor 2 in proportion to the flow of the fluid is improved. Although the thin film portion 38 has a rectangular shape, the thin film portion 38 can have other shape. Although four sides of the thin film portion 38 connect to the substrate 30, only two side of the thin film portion 38 can connect to the substrate 30. Although the opening of the backside of the substrate has a rectangular shape, the opening can have other shape.

Figure 3A:
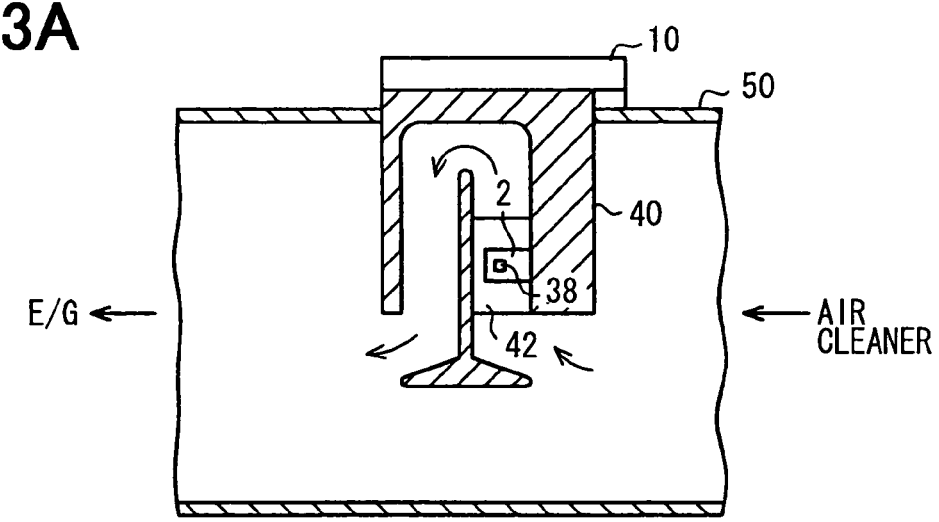
FIG. 3A is a schematic cross-sectional view showing the flow sensor mounted in an air suction passage.

The flow meter 1 is suitably used for a vehicle. Specifically, the flow meter 1 is disposed in an air suction passage of an internal combustion engine of the vehicle. However, the flow meter 1 can be mounted on other equipment so that the flow sensor 2 detects flow of fluid. FIG. 3A shows the flow meter 1 disposed in an air suction passage 50. The air flows from an air cleaner side to an engine side. Part of the air is introduced into a flow meter assembly 40, and then the part of the air is outputted from the flow meter assembly 40. The flow meter assembly 40 includes the flow sensor 2. The electric circuit 10 of the flow meter 1 is disposed outside the air suction passage 50. The flow sensor 2 and the electric circuit 10 are connected together through a wire (not shown). Although the backside of the flow sensor 2 is not exposed, the backside of the flow sensor 2 can be exposed in the air suction passage.

As shown in FIG. 3A, the thin film portion 38 of the flow sensor 2 is disposed such that the upstream heater 11a and the upstream temperature detector 12a are disposed on the air cleaner side from the downstream heater 11b and the downstream temperature detector 12b. Both of the upstream and downstream heaters 11a, 11b are disposed in such a manner that a longitudinal direction of each heater 11a, 11b is perpendicular to the flow direction. The upstream heater 11a and the downstream heater 11b are disposed mirror symmetrically, and have the same dimensions. Further, the upstream heater 11a and the downstream heater 11b are disposed symmetrically with a center axis disposed between the upstream heater 11a and the downstream heater 11b, the center axis being perpendicular to the flow direction of the fluid, i.e., the suction air.

Figure 3B:
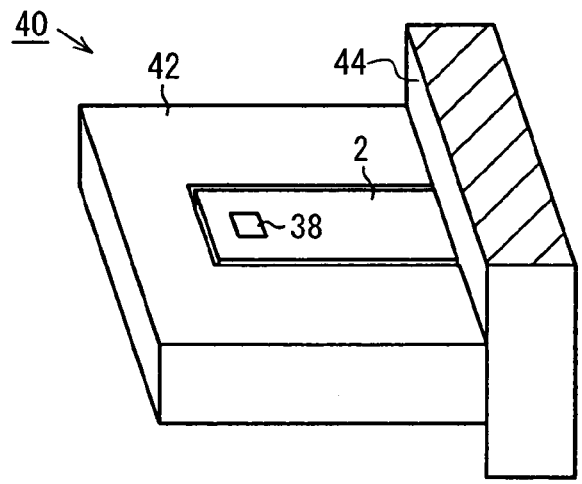
FIG. 3B is an enlarged perspective view showing the flow sensor.
Figure 3C:
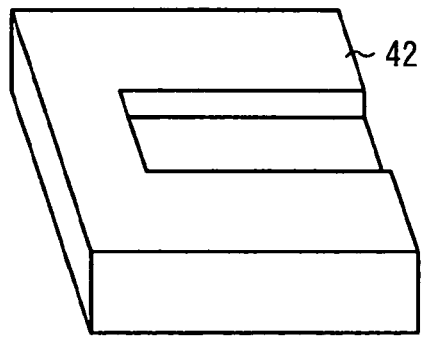
FIG. 3C is a perspective view showing a housing of the flow sensor, according to the first embodiment.

FIG. 3B shows the flow sensor 2 mounting on the flow meter assembly 40. The surface of the flow sensor 2 is exposed from a housing 42. However, the sidewall and the backside of the flow sensor 2 are covered with the housing 42. A portion of the flow sensor 2 near by the terminals 22a–22g is covered with a support portion 44 of the flow meter assembly 40. FIG. 3C shows the shape of the support portion 44. A clearance between the side of the thin film portion 38 and the inner surface of the support portion 38 is in a range between 10 μm and 20 μm.

Figure 4:
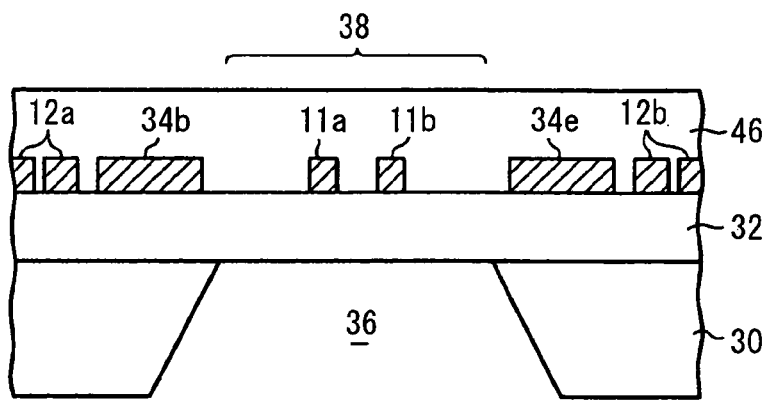
FIG. 4 is an enlarged cross-sectional view showing the flow sensor taken along line IV—IV in FIG. 2, according to the first embodiment.

Next, the thin film portion 38 is described in detail as follows. FIG. 4 is a cross-sectional view showing the thin film portion 38 taken along line IV—IV in FIG. 2. The semiconductor substrate 30 made of silicon includes the silicon oxide film 32. On the silicon oxide film 32, the upstream and downstream heaters 11a, 11b, the lead wires 34b, 34e, and the upstream and downstream temperature detectors 12a, 12b are disposed, and are made of single crystal silicon. They 11a, 11b, 34b, 34e, 12a, 12b are covered with a silicon nitride film 46. Here, the silicon oxide film 32 and the silicon nitride film 46 are formed on all the surface of the substrate 30 including the surface of the concavity 36. Although both of the heaters 11a, 11b and the detectors 12a, 12b are made of single crystal silicon, at least one of the heaters 11a, 11b and the detectors 12a, 12b can be formed of other material. Although the silicon oxide film 32 is made of silicon oxide, the film 32 can be made of other insulation material such as silicon nitride. Although the silicon nitride film 46 is made of silicon nitride, the film 46 can be made of other insulation material such as silicon oxide.

Both of the upstream and downstream heaters 11a, 11b are formed of single crystal silicon with doping boron (i.e., B), so that they have a P-type conductivity. This boron dope prevents the upstream and downstream heaters 11a, 11b from deteriorating with time due to environmental conditions such as high temperature and longtime operation.

Figure 5:
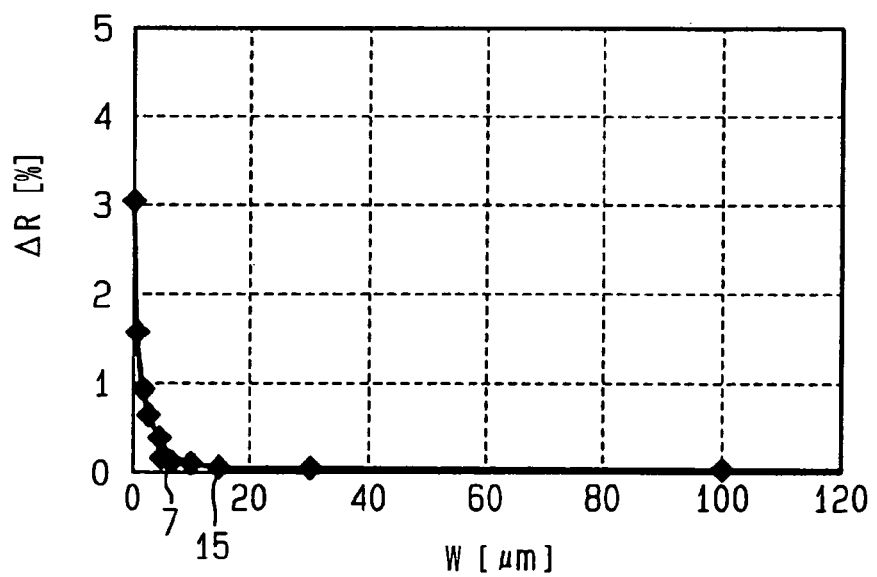
FIG. 5 is a graph showing a relationship between a width W and a rate of resistance change ΔR, according to the first embodiment.

The deterioration with time of boron doped single crystal silicon is described as follows. Specifically, the resistance change with time is examined. FIG. 5 shows a relationship between the width W of a boron doped silicon resistor as a sample and a rate of resistance change ΔR of the boron doped silicon resistor. The resistor is disposed at 310° C. for 1500 hours. The rate of resistance change ΔR of the resistor is calculated between the resistances of the resistor having different width W before heat treatment and after heat treatment. The widths W of the resistors are 0.5 μm, 1 μm, 2 μm, 3 μm, 5 μm, 7 μm, 10 μm, 15 μm, 30 μm, and 100 μm.

As shown in FIG. 5, in a case where the width W of the resistor is equal to or smaller than 15 μm, the rate of resistance change ΔR becomes larger, as the width W of the resistor becomes smaller. Specifically, in a case where the width W of the resistor is equal to or smaller than 7 μm, the rate of resistance change ΔR exponentially increases, as the width W of the resistor becomes smaller. However, in a case where the width W of the resistor is equal to or larger than 15 μm, the rate of resistance change ΔR becomes minimum, i.e., the resistance does not change, even when the width W of the resistor becomes larger. Accordingly, In case of the boron doped silicon resistor, the resistance change of the resistor, i.e., the deterioration of the resistance with time, can be suppressed in a case where the width W of the resistor is equal to or larger than 7 μm. Preferably, the width W of the resistor is equal to or larger than 15 μm, so that the resistance change with time is minimized.

Figure 6:
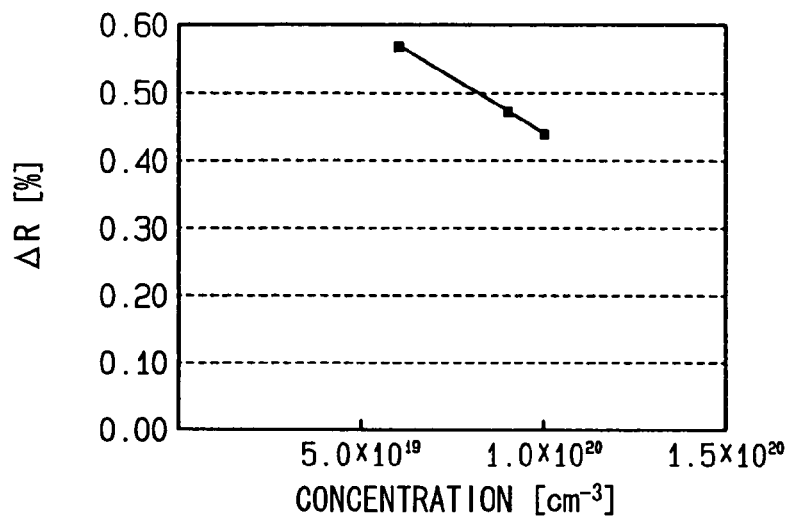
FIG. 6 is a graph showing a relationship between an impurity concentration and the rate of resistance change ΔR, according to the first embodiment.

The characteristics of the boron doped silicon resistor are described as follows. Specifically, the affection of impurities in the silicon resistor is examined. FIG. 6 shows a relationship between the rate of resistance change ΔR of the boron doped silicon resistor and an impurity concentration, i.e., a boron concentration in the silicon resistor. In this case, the width of the resistor is set to 30 μm, and the resistor is heated at 310° C. for 500 hours. The resistance change between the resistor before heat treatment and after heat treatment is measured.

As shown in FIG. 6, as the impurity concentration becomes higher, the rate of resistance change ΔR becomes small. Thus, when the impurity concentration in the silicon resistor becomes higher, the deterioration of the resistance with time is reduced.

Figure 7:
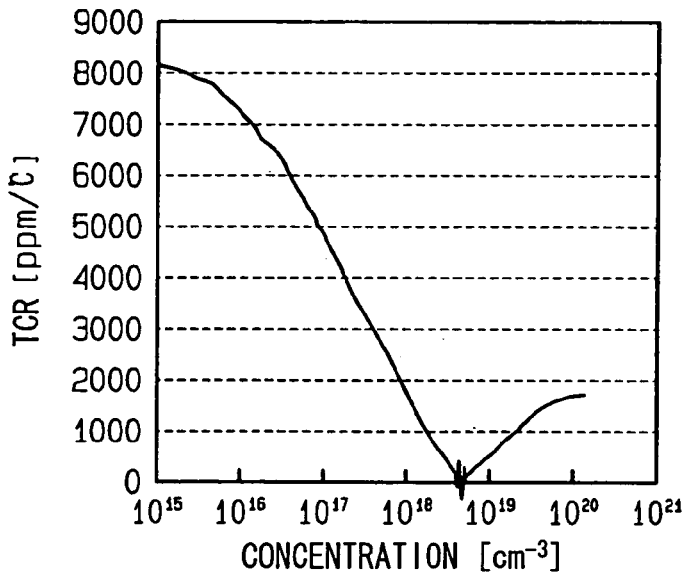
FIG. 7 is a graph showing a relationship between the impurity concentration and a temperature coefficient of resistance TCR, according to the first embodiment.

Further, in bulk silicon, a relationship between the temperature coefficient of resistance TCR of the bulk silicon and the impurity concentration in the bulk silicon is shown in FIG. 7. In a case where the impurity concentration is equal to or larger than $5\times10^{18}\text{cm}^{-3}$, as the impurity concentration becomes larger, the temperature coefficient of resistance TCR becomes large. Therefore, when the upstream and downstream heaters 11a, 11b is made of the boron doped silicon resistor, as the impurity concentration in the resistor becomes larger, the sensitivity of the resistor is improved. That is because the upstream and downstream heaters 11a, 11b detect their own temperature on the basis of their resistance change.

Thus, it is preferred that the impurity concentration in the boron doped silicon resistor is substantially equal to the maximum concentration of carrier (i.e., boron), which is a solution limit of carrier. Therefore, the impurity concentration is equal to or larger than $1\times10^{20}\text{cm}^{-3}$, and is equal to or smaller than the solution limit. Further, it is preferred that the impurities in the silicon resistor are disposed uniformly.

Figure 8:
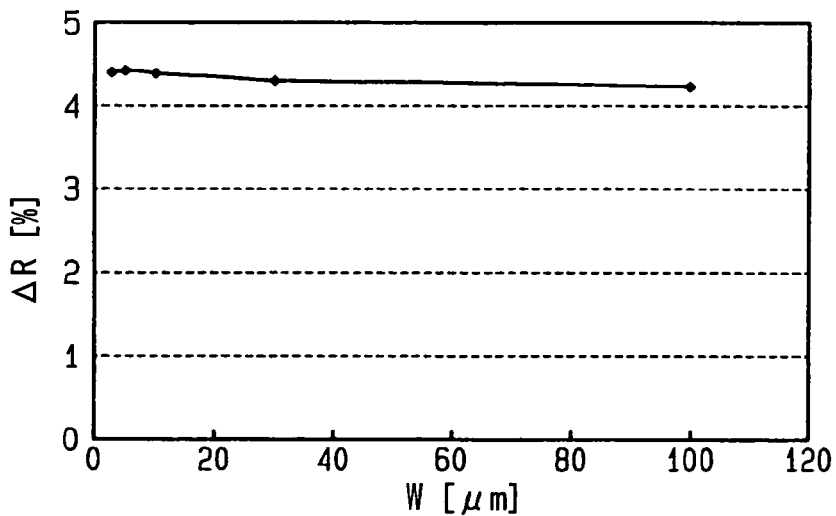
FIG. 8 is a graph showing a relationship between the width W and the rate of resistance change ΔR, according to the first embodiment.
Figure 9A:
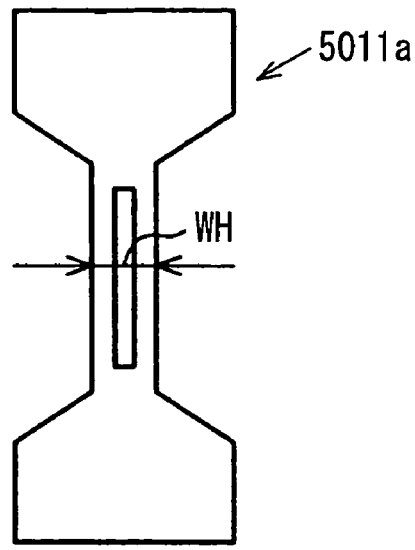
FIGS. 9A to 9D are plan views showing a different heater as a comparison, according to a prior art.
Figure 9B:
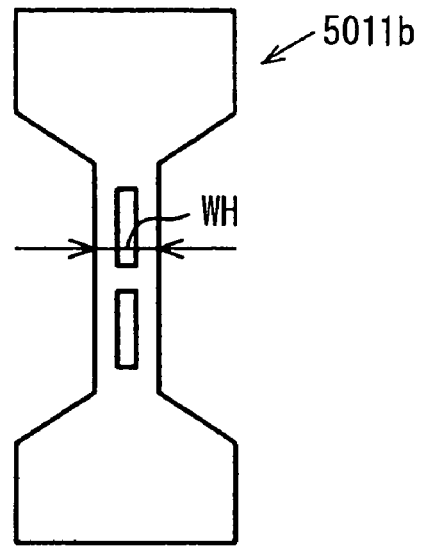
Figure 9C:
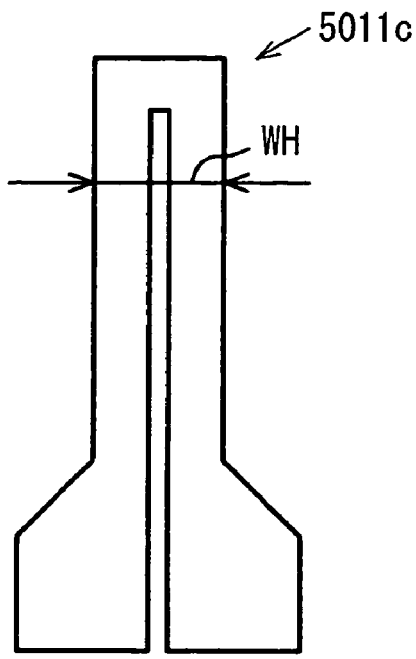
Figure 9D:
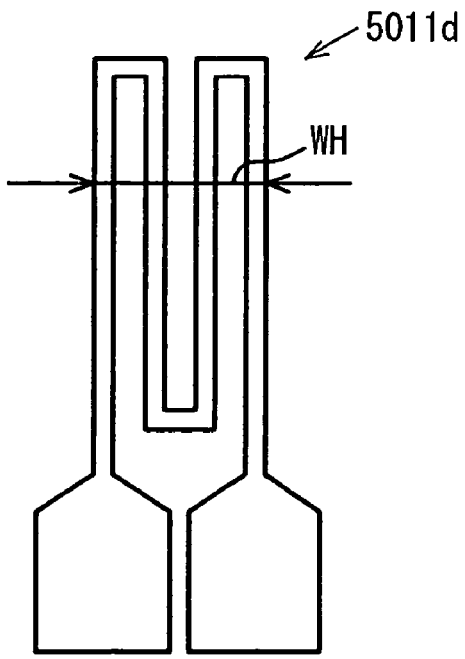

Further, phosphorous instead of boron is doped in a single crystal silicon, so that a phosphorized silicon resistor as a sample is formed. FIG. 8 shows a relationship between the width W of the phosphrized silicon resistor and the rate of resistance change ΔR of the phosphorized silicon resistor. As shown in FIG. 8, the phosphorized silicon resistor has no width dependency of the rate of resistance change ΔR. Further, the rate of resistance change ΔR of the phosphorized silicon resistor is over ten times larger than that of the boron doped silicon resistor.

Figure 10:
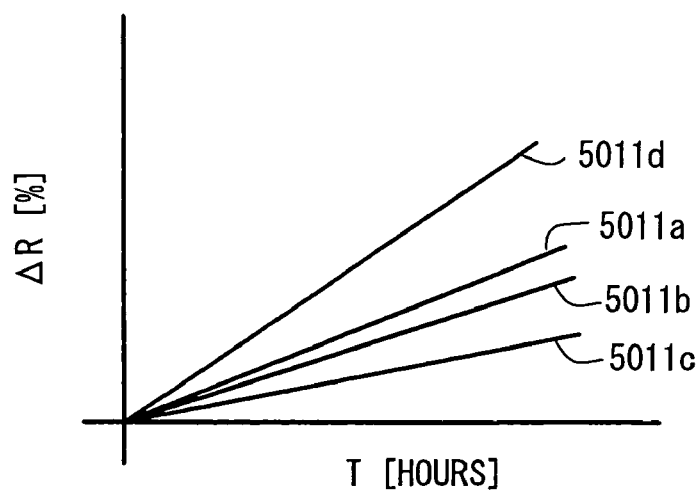
FIG. 10 is a graph showing a relationship between a holding time T and a rate of resistance change ΔR, according to the first embodiment.

Here, the inventors have examined the upstream and downstream heaters made of phosphorized single crystal silicon. FIGS. 9A–9D show the heaters 5011a–5011d as a comparison, which is provided in the prior art (i.e., Japanese Patent Application Publication No. 2002-48616). The heaters 5011a–5011d are made of phosphorized single crystal silicon. Each width WH of the heaters 302–305 is set to be 100 μm. The heaters 5011a–5011d shown in FIGS. 9A–9D are annealed at a predetermined temperature, and then the resistance of each heater 5011a–5011d is measured. FIG. 10 shows a relation ship between a holding time T and a rate of resistance change ΔR of the heater 5011a–5011d. Here, the heater 5011a–5011d is annealed during the holding time T. As shown in FIG. 10, as the holding time T becomes larger, the rate of resistance change ΔR of the heater 5011a–5011d increases. On the other hand, the heater made of boron doped single crystal silicon can be controlled appropriately.

Figure 11:
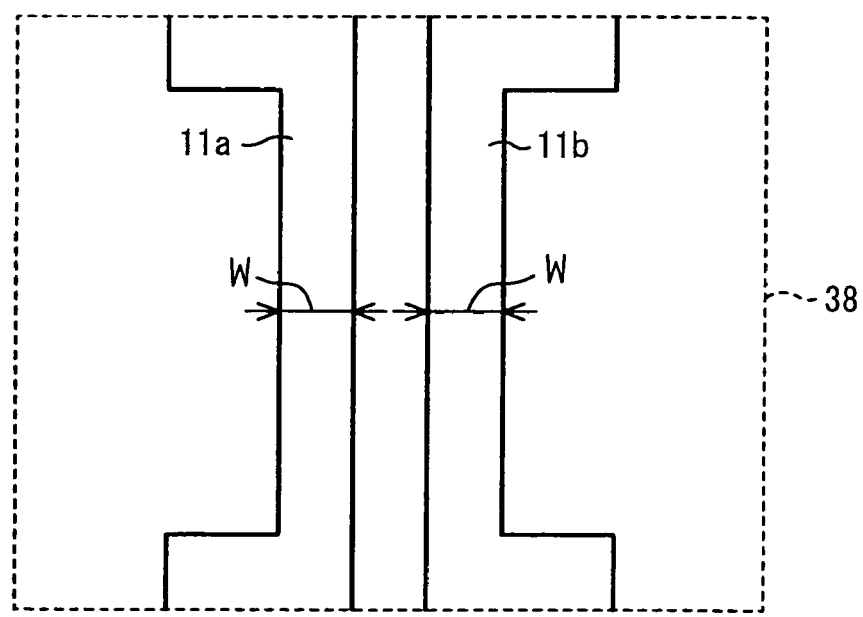
FIG. 11 is a plan view showing a thin film portion of the flow sensor according to the first embodiment.

Next, each width W of the upstream and downstream heaters 11a, 11b is examined. FIG. 11 shows the width W of the upstream and downstream heaters 11a, 11b. The width W is set in a range between 7 μm and 30 μm. This range is determined by the following reason.

To minimize the electric power consumption of the flow sensor 2 and to improve the sensitivity of the flow sensor 2, the resistance of the upstream heater 11a is required to become larger compared with those of the lead wires 34b, 34c, and the resistance of the downstream heater 11b is required to become larger compared with those of the lead wires 34d, 34e. Specifically, the ratio between the resistances of the upstream heater 11a and the lead wire 34b, 34c is preferably enlarged, and the ratio between the resistances of the downstream heater 11b and the lead wire 34d, 34e is also preferably enlarged.

Here, the part of the flow sensor 2 disposed nearby the terminals 22a–22f is covered with the support portion 44. As shown in FIGS. 2 and 3B, a distance D between the support portion 44 and the thin film portion 38 is preferably secured to a certain length so as not to disturb the flow of the fluid. For example, the distance D is set to be equal to or larger than 2 mm. Therefore, the length of the lead wire 34a–34f in the flow direction has a lower limit.

On the other hand, it is required to minimize the dimensions of the flow sensor 2. Specifically, it is preferred that the area of the flow sensor 2 becomes small. This is because, for example, the number of flow sensors 2 formed from one silicon wafer is maximized when the flow sensor 2 is formed from a silicon wafer. Therefore, it is preferred that the area of the flow sensor 2 becomes small within a range of the limitation of the distance D between the support portion 44 and the thin film portion 38. Thus, the reduction of resistance of the lead wire 34a–34f has a limit, the reduction being performed to enlarge the width W of the lead wire 34a–34f.

Further, when the lengths of the upstream and downstream heaters 11a, 11b are increased so as to increase the resistances of the upstream and downstream heaters 11a, 11b, the area of the thin film portion 38 becomes large. This causes to enlarge the dimensions of the flow sensor 2. Further, the electric power consumption of the flow sensor 2 becomes larger, since the thermal capacity of the thin film portion becomes large.

Thus, the area of the thin film portion 38 is equal to or smaller than 800 m×800 µm. The length between the thin film portion and each terminal 22a–22f is in a range between 2.5 mm and 4.0 mm. Each width W of the upstream and downstream heaters 11a, 11b is in a range between 7 µm and 50 µm. Preferably, the area of the thin film portion 38 is equal to or smaller than 700 m×700/m . Preferably, each width W of the upstream and downstream heaters 11a, 11b is in a range between 7 µm and 30 µm. More preferably, the width of W of the upstream and downstream heaters 11a, 11b is in a range between 15 µm and 30 µm.

In the above case, the upstream and downstream heaters 11a, 11b can be formed such that the resistance change of the heaters with time is reduced. Further, the electric power consumption of the flow sensor 2 is reduced, and the sensitivity of the flow senor 2 is improved.

Next, the flow sensor 2 is manufactured with the following method. As shown in FIGS. 12A to 13C, a silicon on insulator substrate (i.e., SOI substrate) is prepared at first. The SOI substrate includes a semiconductor substrate 30, a silicon oxide film 32, and a single crystal silicon film 48. The semiconductor substrate 30 is made of single crystal silicon having N-type conductivity. The thickness of the silicon oxide film 32 is 1 µm. The single crystal silicon film 48 has P-type conductivity, and the thickness of the single crystal silicon film 48 is in a range between 0.6 µm and 1.5 µm.

Figure 12A:
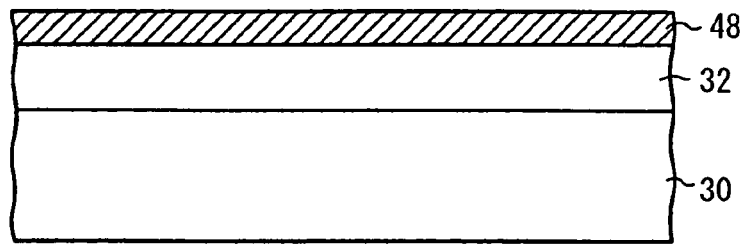
FIGS. 12A to 13C are cross-sectional views of the sensor taken along line XII—XII in FIG. 2 explaining a manufacturing method for manufacturing the flow sensor according to the first embodiment.
Figure 12B:
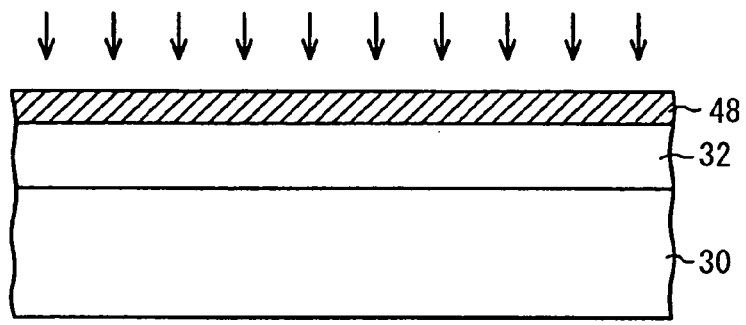

As shown in FIG. 12B, boron is doped into the single crystal silicon film 48 so that the impurity concentration of boron in the single crystal silicon film 48 is in a range between $1 \times 10^{20} cm^{-3}$ and $2 \times 10^{20} cm^{-3}$. The doping is performed by the ion implantation method. Further, the doping can be performed by the gas phase diffusion method or the solid phase diffusion method. The gas phase diffusion method is such that the impurities are diffused from the gas phase into the silicon film 48. The solid phase diffusion method is such that an oxide film doped with the impurities contacts the silicon film so that the impurities is diffused into the silicon film from the surface of the silicon film. Further, the impurity concentration of boron in the single crystal silicon film 48 can be set to another value.

Then, the SOI substrate is heated at a predetermined temperature such as 1150° C. during a predetermined time such as 2 hours so as to activate the boron doped single crystal silicon film 48.

Figure 12C:
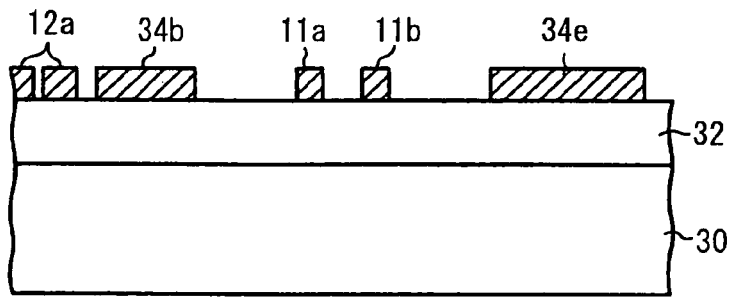

As shown in FIG. 12C, the single crystal silicon film 48 is patterned into a predetermined pattern with using reactive ion etching method so that the upstream and downstream heaters 11a, 11b, the upstream and downstream temperature detectors 12a, 12b and the lead wires 34a–34f are formed. In this way, the upstream heater 11a and the upstream temperature detector 12a are manufactured in the same process, and the downstream heater 11b and the downstream temperature detector 12b are also manufactured in the same process, so that each temperature coefficient of resistance TCR of the upstream heater 11a and the upstream temperature detector 12a are equalized, and each temperature coefficient of resistance TCR of the downstream heater 11b and the downstream temperature detector 12b are also equalized easily. Here, after the upstream and downstream heaters 11a, 11b and the like are patterned, the impurity can be doped into the single crystal silicon film 48.

Figure 12D:
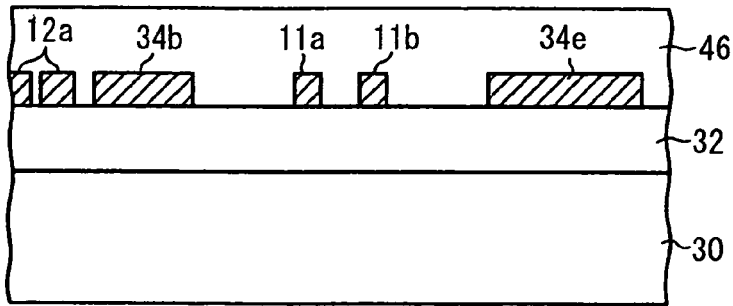

As shown in FIG. 12D, the silicon nitride film 46 is formed on the SOI substrate with using a low-pressure chemical vapor deposition (i.e., low pressure CVD). Here, the thickness of the silicon nitride film 46 is, for example, 1.5 µm. The deposition condition of the low-pressure CVD is described as follows. A gas flow rate is $SiH_2Cl_2:NH_3=4:1$, an atmospheric temperature is 850° C., and a pressure is 20 Pa.

Figure 13A:
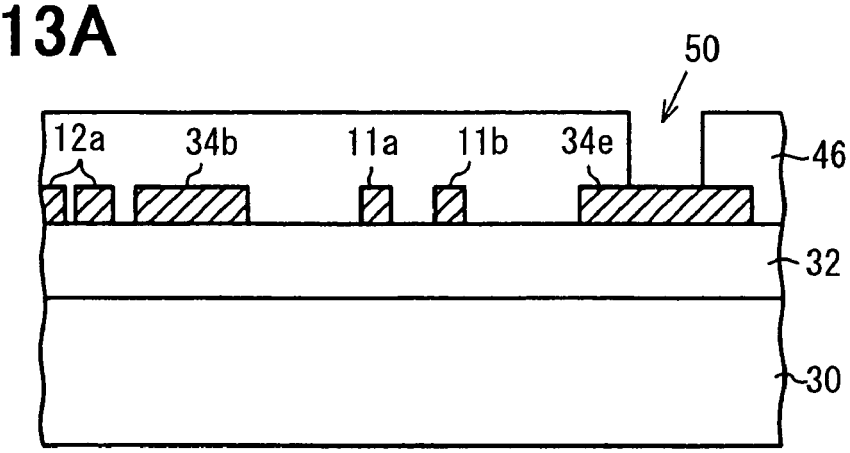
Figure 13B:
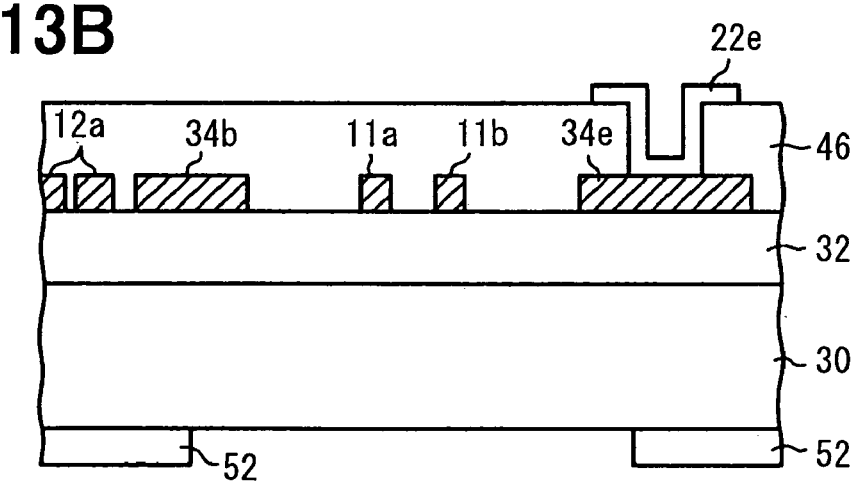

As shown in FIG. 13A, the silicon nitride film 46 is etched with using reactive ion etching method so that a contact hole 50 is formed. As shown in FIG. 13B, a metallic film made of, for example, aluminum is deposited on the silicon nitride film 46. The thickness of the metallic film is, for example, 1 µm. After that, the metal film is etched into a predetermined pattern, so that the terminal 22e is formed in the contact hole 50. Simultaneously, the terminals 22a–22d, 22f are also formed.

Next, as shown in FIG. 13B, a silicon nitride film 52 is formed on the backside of the substrate 30 with using plasma CVD method. The thickness of the silicon nitride film 52 is, for example, 1 µm. Then, the silicon nitride film 52 is etched into a predetermined pattern with using reactive ion etching method, so that an opening of the silicon nitride film 52 is formed. The opening corresponds to a region shown as the chain line in FIG. 2.

Figure 13C:
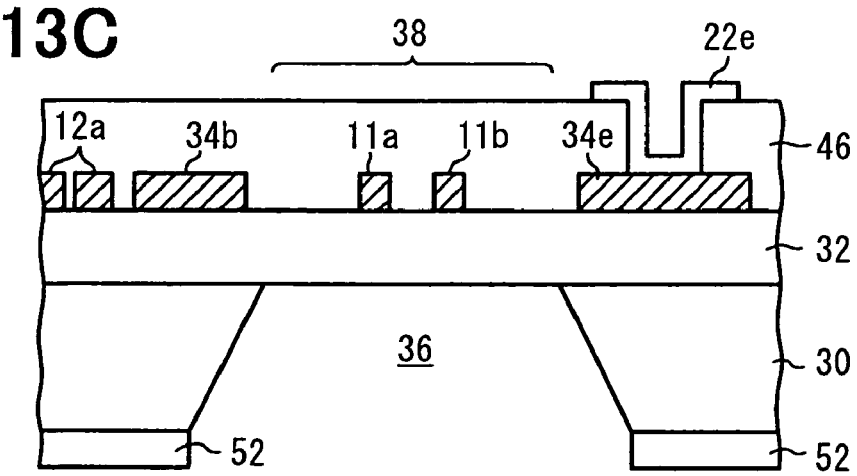

As shown in FIG. 13C, the semiconductor substrate 30 is etched with using the silicon nitride film 52 as a mask, so that the concavity 36 is formed in substrate 30. Thus, the thin film portion 38 is formed so as to build a bridge in the concavity 36 of the substrate 30. In this case, the etching is preferably performed as follows.

The etching is performed with wet etching method using alkali etchant such as potassium hydroxide (i.e., KOH) or tetra methyle ammonium hydroxide (i.e., TMAH). The backside of the substrate 30 is prepared to have a single silicon {100} plane, which has six equivalent planes. However, the backside of the substrate 30 can be a single silicon {110} plane. The opening of the silicon nitride film 52 is formed to have a rectangular shape, and each side of the rectangular is parallel to the <110> direction of single crystal silicon.

In the above case, the substrate 30 is etched along with the {111} plane with using the above etchant. Thus, the thin film portion 38 can be formed to have a rectangular shape. Further, a pair of sides of the rectangular of the thin film portion 38 is formed to be perpendicular to the flow direction.

Although the thin film portion 38 is formed with the wet etching method, the thin film portion 38 can be formed with dry etching method. In this case, the backside of the substrate 30 is not required to have the {100}plane. Although the thin film portion 38 is made of the silicon oxide film 32, the thin film portion 38 can be formed of other insulation film such as a silicon nitride film.

The flow meter 1 having the flow sensor 2 according to the first embodiment has the following merits.

The upstream and downstream heaters 11a, 11b are formed of the boron doped single crystal silicon, and each width W of the upstream and downstream heaters 11a, 11b is set in a range between 7 μm and 50 μm. Therefore, the sensor sensitivity of the flow sensor 2 is improved. Further, the electric power consumption of the flow meter is reduced. Furthermore, the resistance change of the heaters 11a, 11b with time is reduced, i.e., the characteristics of the flow meter 1 such as sensor sensitivity is substantially stabilized even when the flow meter 1 operates for a long time at high temperature.

Each impurity concentration in the upstream and downstream heaters 11a, 11b is set in a range between $1 \times 10^{20}$ cm$^{-3}$ and $2 \times 10^{20}$cm$^{-3}$. However, the impurity concentration in the upstream and downstream heaters 11a, 11b can be set to another value. Therefore, the resistance change of the heaters 11a, 11b with time is much reduced even when the flow meter operates for a long time at high temperature. Further, since the temperature coefficient of resistance TCR of the upstream and downstream heaters 11a, 11b is comparatively high, the sensor sensitivity of the flow sensor 2 becomes high.

The upstream and downstream temperature detectors 12a, 12b are formed simultaneously with the upstream and downstream heaters 11a, 11b. Therefore, each temperature coefficient of resistance TCR of the upstream heater 11a and the upstream temperature detector 12a are equalized, and each temperature coefficient of resistance TCR of the downstream heater 11b and the downstream temperature detector 12b are also equalized easily.

The upstream heater 11a and the downstream heater 11b are disposed mirror symmetrically, and have the same dimensions. Further, the upstream heater 11a and the downstream heater 11b are disposed symmetrically with a center axis disposed between the upstream heater 11a and the downstream heater 11b, the center axis being perpendicular to the flow direction of the fluid. Therefore, the detection accuracy for detecting the flow of the fluid and the flow direction are improved.

The lead wires 34a–34f are formed together with the upstream and downstream heaters 11a, 11b. Therefore, the number of manufacturing process is reduced, so that the manufacturing cost is reduced.

Although the heaters 11a, 11b and the upstream and downstream temperature detectors 12a, 12b are made of boron doped single crystal silicon, they can be formed of other-atom-doped silicon such as indium doped single crystal silicon or phosphorized single crystal silicon.

The upstream and downstream heaters 11a, 11b work as a heater and as a detector for detecting its own temperature. The upstream and downstream heaters 11a, 11b are controlled so as to coincide the detected temperature to a predetermined temperature, so that the sensor 2 detects the flow of fluid on the basis of the electric power consumption of the heaters 11a, 11b. However, the heater 11a, 11b can be provided by two parts, which are a heater and a detector. In this case, the heater is controlled so as to coincide the detected temperature detected by the detector to a predetermined temperature. Then, the sensor 2 detects the flow of the fluid on the basis of the electric power consumption of the heater. In this case, it is preferred that the maximum width of the detector is lower than the maximum width of the heater.

Although the flow sensor 2 provides the upstream and downstream temperature detectors 12a, 12b, a signal generator instead of the flow sensor 2 can provide the detectors 12a, 12b. In this case, the temperature coefficient of resistance TCR of the upstream heater 11a is set to that of the upstream temperature detector 12a, and the temperature coefficient of resistance TCR of the downstream heater 11b is set to that of the downstream temperature detector 12b.

Although the flow sensor 2 includes two heaters 11a, 11b, the sensor 2 can have a single heater and a single temperature detector for detecting the flow of the fluid on the basis of the electric power consumption consumed at the single heater.

Further, the heater 11a, 11b can work as the second detector for detecting its own temperature, so that the heater is controlled to have a predetermined temperature on the basis of the detected temperature. A temperature around the heater is detected by another detector, so that the sensor detects the heat absorbed in the fluid on the basis of the detected temperature around the heater.

Although the heater 11a, 11b and detector 12a, 12b for detecting a physical quantity is applied to the flow sensor 2, they can be applied to a gas sensor, an IR sensor, and an infrared light sensor.

(Second Embodiment)

Figure 14:
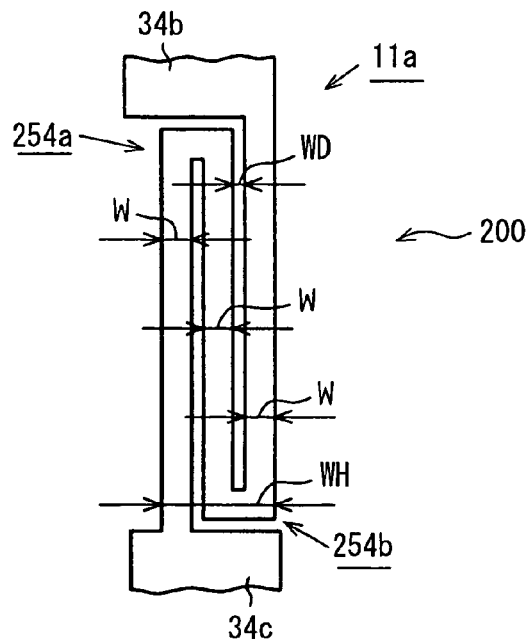
FIG. 14 is a plan view showing an upstream heater of a flow sensor according to a second embodiment of the present invention.

A flow sensor according to a second embodiment of the present invention is suitably used for a flow meter for detecting flow of air sucked into an internal combustion engine of a vehicle. FIG. 14 shows the upstream heater 11a of the flow sensor 200 according to the second embodiment. In the sensor 200, the upstream heater 11a and the downstream heater 11b are disposed mirror symmetrically, and have the same dimensions and the same shape.

As shown in FIG. 14, the upstream heater 11a includes a plurality of line heaters, each of which is connected together in series. The current flow direction of one line heater is different from that of the neighboring line heater. Specifically, the line heater extending from the lead wire 34c extends toward the lead wire 34b, and has a connection portion 254a nearby the lead wire 34b. At the connection portion 254a, the current flow reverses. Then, the line heater extends toward the lead wire 34c, and has another connection portion 254b nearby the lead wire 34c. At the connection portion 254b, the current flow reverses again. Then, the line heater extends toward the lead wire 34b, so that the line heater connects to the lead wire 34b.

The upstream heater 11a has connection portions 254a, 254b, so that a width WH of the upstream heater 11a is larger than the width W of the line heater. Here, the width WH of the upstream heater 11a is disposed in a direction perpendicular to the flow direction of the fluid. This upstream heater 11a having the width WH provides increase of radiation of heat radiating from the upstream heater 11a to the fluid passing through the upstream heater 11a.

Further, the length of the upstream heater 11a becomes long, the length being disposed in the current flow direction.

Therefore, the resistance of the upstream heater 11a becomes large. Thus, the resistance of the upstream heater 11a becomes large compared with those of the lead wires 34b, 34c. Therefore, the electric power consumption of the flow sensor 200 is much reduced. Further, the sensitivity of the sensor 200 is much improved.

Here, the upstream heater 11a is made of the boron doped single crystal silicon, and the width W of each line heater is equal to or larger than 7 μm. Further, a vertical width of the connection portion 254a, 254b of the line heater is also set to be equal to or larger than 7 μm. The vertical width of the connection portion 254a, 254b is a width of the line heater in a vertical direction, which is perpendicular to the width WH. Therefore, the resistance change of the heaters 11a, 11b with time is reduced even when the flow sensor 200 operates for a long time at high temperature. Preferably, the width W of each line heater 11a, 11b is equal to or larger than 15 μm.

In the sensor 200, the width W is, for example, 7 μm, a distance between the line heaters is set to be 5 μm, and the width WH is set to be 31 μm.

The upstream heater 11a and the downstream heater 11b are disposed mirror symmetrically, and have the same dimensions. Further, the upstream heater 11a and the downstream heater 11b are disposed symmetrically with a center axis disposed between the upstream heater 11a and the downstream heater 11b, the center axis being perpendicular to the flow direction of the fluid. Therefore, the detection accuracy for detecting the flow of the fluid and the flow direction are improved.

Figure 15:
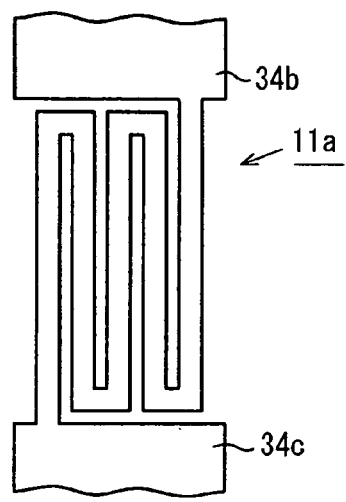
FIG. 15 is a plan view showing another upstream heater of the flow sensor according to the second embodiment.

Although the upstream and downstream heaters 11a, 11b has two connection portions 254a, 254b, the upstream and downstream heaters 11a, 11b can have more connection portions. For example, as shown in FIG. 15, the upstream heater 11a has four connection portions.

(Third Embodiment)

Figure 16:
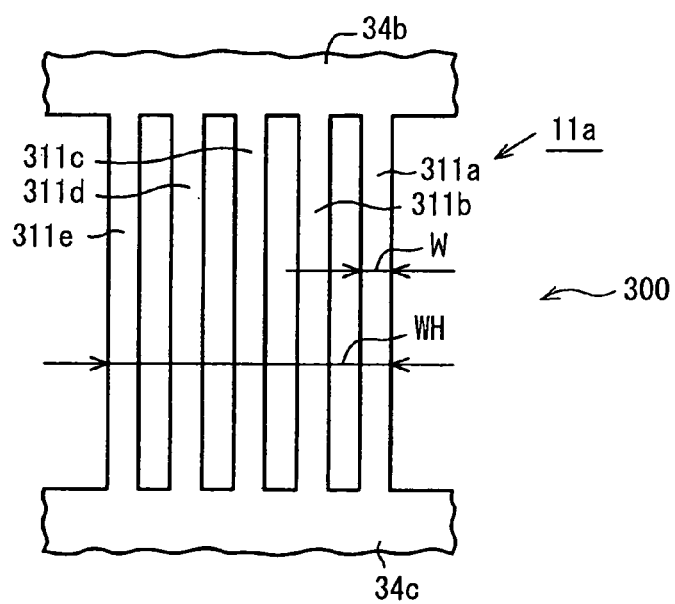
FIG. 16 is a plan view showing an upstream heater of a flow sensor according to a third embodiment of the present invention.

A flow sensor 300 according to a third embodiment of the present invention is shown in FIG. 16. In the sensor 300, the upstream heater 11a and the downstream heater 11b are disposed mirror symmetrically, and have the same dimensions and the same shape.

As shown in FIG. 16, the upstream heater 11a has a plurality of line heaters 311a–311e, which is disposed in parallel between the lead wires 34b, 34c. The width WH of the upstream heater 11a is disposed in a direction perpendicular to the flow direction of the fluid. This width WH is larger than a total width of the width W of each line heater 311a–311e. The upstream heater 11a having the width WH provides increase of radiation of heat radiating from the upstream heater 11a to the fluid passing through the upstream heater 11a. Thus, the sensitivity of the flow sensor 300 is improved.

Further, the width W of each line heater 311a–311e is smaller than the width WH, so that the upstream heater 11a is secured to have a certain resistance. Specifically, the reduction of resistance of the upstream heater 11a is suppressed. Thus, the resistance of the upstream heater 11a becomes large compared with those of the lead wires 34b, 34c. Therefore, the electric power consumption of the flow sensor 300 is much reduced. Further, the sensitivity of the sensor 300 is much improved.

Here, each line heater 311a–311e is made of the boron doped single crystal silicon, and the width W of each line heater 311a–311e is equal to or larger than 7 μm. Therefore, the resistance change of the heaters 11a, 11b with time is reduced even when the flow sensor 300 operates for a long time at high temperature. Preferably, the width W of the line heaters 311a–311e is equal to or larger than 15 μm.

Although the upstream heater 11a has five line heaters, the upstream heater 11a can have other number of line heaters such as two line heaters.

(Fourth Embodiment)

Figure 17:
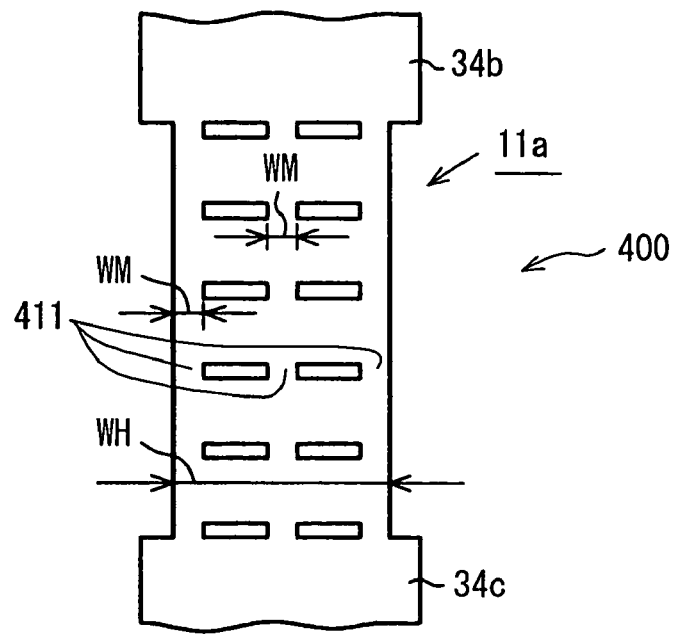
FIG. 17 is a plan view showing an upstream heater of a flow sensor according to a fourth embodiment of the present invention.

A flow sensor 400 according to a fourth embodiment of the present invention is shown in FIG. 17. In the sensor 400, the upstream heater 11a and the downstream heater 11b are disposed mirror symmetrically, and have the same dimensions and the same shape.

As shown in FIG. 17, the upstream heater 11a has a plurality of narrow portions 411. In FIG. 17, there are eighteen narrow portions 411. The narrow portion 411 limits the current flow flowing through the upstream heater 11a. The narrow portion 411 has a width WM in a direction perpendicular to the flow direction of the fluid. The width WM is set to be equal to or larger than 7 μm. Preferably, the width WM is equal to or larger than 15 μm.

Since upstream heater 11a has the narrow portions 411, the resistance of upstream heater 11a becomes large. Further, when the width WH is set to be large, the radiation of heat at the upstream heater 11a is increased. And the resistance of upstream heater 11a is secured to have a predetermined value, i.e., the resistance of the upstream heater 11a becomes large compared with those of the lead wires 34b, 34c. Therefore, the electric power consumption of the flow sensor 400 is much reduced. Further, the sensitivity of the sensor 400 is much improved.

Preferably, the upstream heater 11a is designed such that the current does not flow in a lateral direction (i.e., perpendicular to the flow direction of the fluid) in FIG. 17. In this case, the electric power consumption of the upstream heater 11a is reduced.

(Fifth Embodiment)

Figure 18:
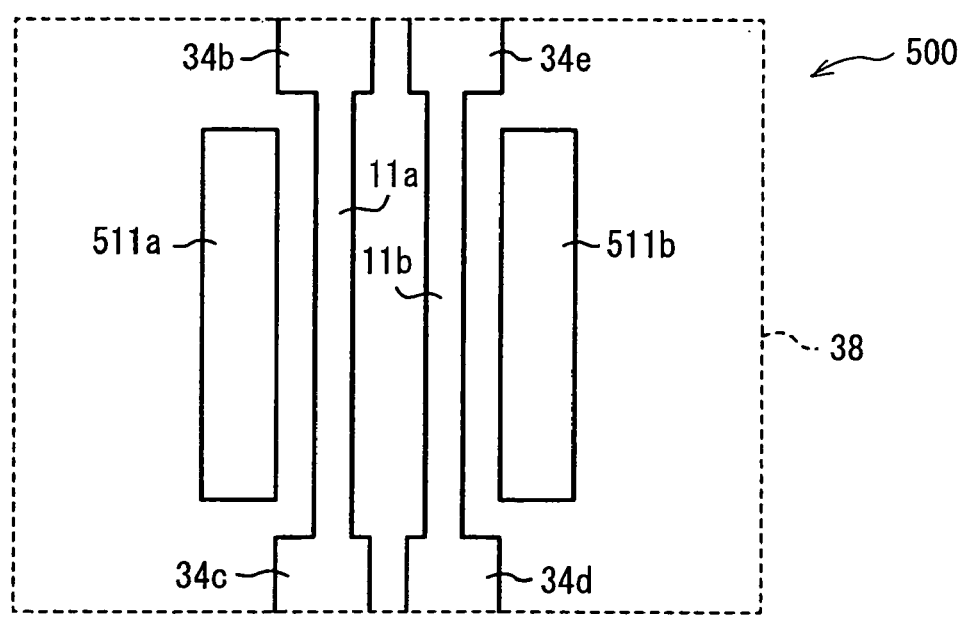
FIG. 18 is a plan view showing an upstream heater of a flow sensor according to a fifth embodiment of the present invention.

A flow sensor 500 according to a fifth embodiment of the present invention is shown in FIG. 18. In the sensor 500, the upstream heater 11a and the downstream heater 11b are disposed mirror symmetrically, and have the same dimensions and the same shape.

As shown in FIG. 18, a pair of thermal conduction members 511a, 511b is formed on the thin film portion 38. The thermal conduction members 511a, 511b are made of highly thermal conductive material, which has a high thermal conductivity higher than that of the silicon nitride film 46. The thermal conduction members 511a, 511b are surrounded by the silicon nitride film 46, so that the thermal conduction members 511a, 511b are insulated electrically. Therefore, the current does not flow through the thermal conduction members 511a, 511b.

The thermal conduction members 511a, 511b assist the heat radiation radiated from the upstream and downstream heaters 11a, 11b. Accordingly, the heat being absorbed in the fluid is increased. Thus, the electric power consumed at the upstream and downstream heaters 11a, 11b is large in relation to the width W, so that the sensitivity of the flow sensor 500 is improved.

Further, the current does not flow through the thermal conduction members 511a, 511b, so that the thermal conduction members 511a, 511b does not consume the electric power. Therefore, the electric power consumption of the sensor 500 does not increase.

Further, the thermal conduction member 511a faces the upstream heater 11a, and is disposed upstream from the upstream heater 11a. The heat radiated from the upstream heater 11a conducts to the thermal conduction member 511a. Specifically, the thermal conduction member 511a radiates the heat from the upstream heater 11a toward the upstream from the upstream heater 11a. Therefore, the upstream heater 11a can be controlled rapidly in accordance with the change of the flow of the fluid disposed on the upstream side.

Also, the thermal conduction member 511b faces the downstream heater 11b, and is disposed downstream from the downstream heater 11b. The heat radiated from the downstream heater 11b conducts to the thermal conduction member 511b. Specifically, the thermal conduction member 511b radiates the heat from the downstream heater 11b toward the downstream from the down stream heater 11b. Therefore, the downstream heater 11b can be controlled rapidly in accordance with the change of the flow of fluid disposed on the downstream side.

Thus, the thermal conduction members 511a, 511b provide to improve the response of the sensor 500 in relation to the flow of the fluid and the flow direction of the fluid. Specifically, even if the flow of the fluid or the velocity of fluid is rapidly changed, this rapid change can be followed through the thermal conduction members 511a, 511b so that the temperature distribution of the flow sensor 500 is also changed rapidly. Thus, the sensor 500 can detect the temperature change immediately so that the response of the sensor 500 is improved.

Preferably, the thermal conduction members 511a, 511b are disposed mirror symmetrically, and have the same dimensions and the same shape. Further, the thermal conduction members 511a, 511b are disposed linearly symmetrically with a center axis between the upstream and downstream heaters 11a, 11b. Thus, the sensitivity of the sensor 500 in the flow direction of the fluid is improved.

Further, the upstream and downstream heaters 11a, 11b, the lead wires 34a-34f, and the thermal conduction members 511a, 511b are made of the same material in the same manufacturing process simultaneously. Therefore, the heat resistance of the thermal conduction members 511a, 511b is reduced, so that the thermal conductivity of the thermal conduction members 511a, 511b is secured to have a predetermined value. The above reason is described as follows.

Figures 19, 21:
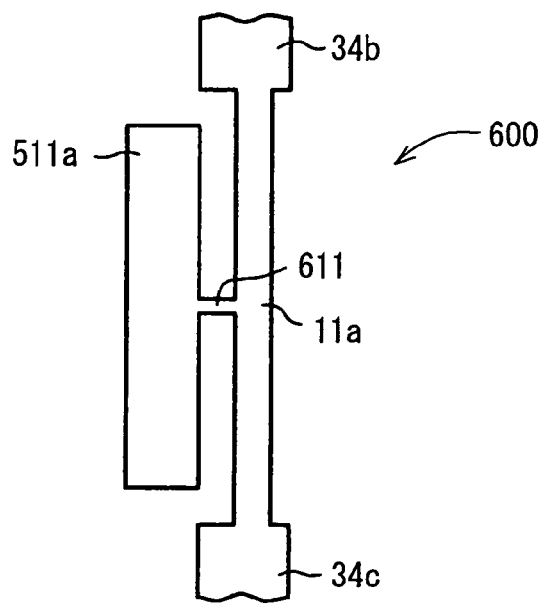
FIG. 19 is a table showing a thermal conductivity K, an electrical resistivity ρ, and a product K·ρ of the thermal conductivity K and the electrical resistivity ρ in various materials, according to the fifth embodiment.
FIG. 21 is a plan view showing an upstream heater of a flow sensor according to a sixth embodiment of the present invention.

FIG. 19 shows a thermal conductivity K, an electrical resistivity ρ, and a product K·ρ of the thermal conductivity K and the electrical resistivity ρ in various materials, which are aluminum (i.e., Al), tungsten (i.e., W), platinum (i.e., Pt), copper (i.e., Cu), and impurity doped silicon (i.e., doped Si). The thermal conductivity K and the electrical resistivity p in each material is measured at 0° C., except for the doped Si that is measured at 300K. The impurity concentration in the doped Si is $1 \times 10^{20} cm^{-3}$.

The thermal conductivity K of the doped Si is almost the same as that of a metal such as Al, W, Pt and Cu. However, the electrical resistivity ρ of the doped Si is much larger than that of the metal. Therefore, when the sheet resistances of the upstream and downstream heaters 11a, 11b, the lead wires 34a-34f, and the like are set to be a predetermined value, the film thickness of them made of the doped Si becomes thicker than that in a case where they are made of the metal. Therefore, the film thickness of the thermal conduction members 511a, 511b made of the doped Si is also thicker than that in a case where they are made of the metal. Therefore, the heat resistance of the thermal conduction members 511a, 511b made of the doped Si is smaller than that in a case where they are made of the metal. This reason is described as follows.

When the length, the width, the film thickness of each thermal conduction member 511a, 511b are defined as L, W, H, respectively, the heat resistance HR of the thermal conduction member 511a, 511b is described as:

$$HR = L/K \cdot W \cdot H \quad (F1)$$

Here, K is the thermal conductivity of the thermal conduction member 511a, 511b.

The sheet resistance SR of the upstream and downstream heaters 11a, 11b, which has the same film thickness as the thermal conduction member 511a, 511b, is described as:

$$SR = \rho/H \quad (F2)$$

According to Formulas F1 and F2, the heat resistance HR is calculated as:

$$HR = (1/K \cdot \rho) \times (L \cdot SR) + W \quad (F3)$$

Therefore, when the sheet resistance SR, the width W, the length L is fixed to a predetermined value, the heat resistance HR of the thermal conduction member 511a, 511b is in proportion to (1/K ρ). Therefore, the heat resistance HR of the thermal conduction member 511a, 511b becomes small as a value of (1/Kρ) of the material becomes smaller. Specifically, the thermal conductivity of the thermal conduction member 511a, 511b is improved, i.e., increased.

The doped Si has a small value of (1/Kρ), which is much smaller than that of the metal. Therefore, the thermal conduction member 511a, 511b made of the doped Si has a high thermal conductivity compared with that in a case where they are made of the metal.

Figure 20A:
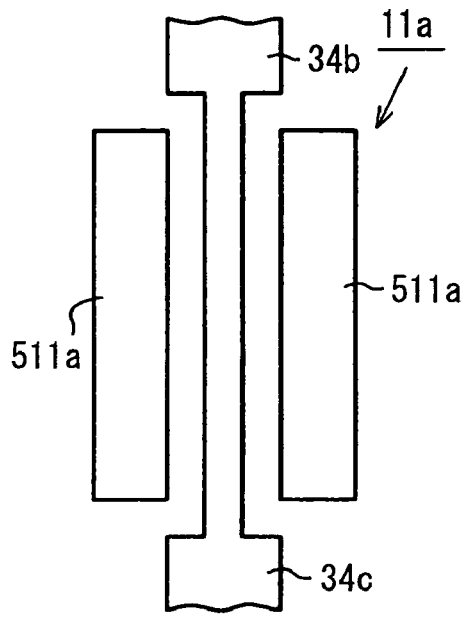
FIGS. 20A–20D are plan views showing different upstream heaters of the flow sensor according to the fifth embodiment.
Figure 20B:
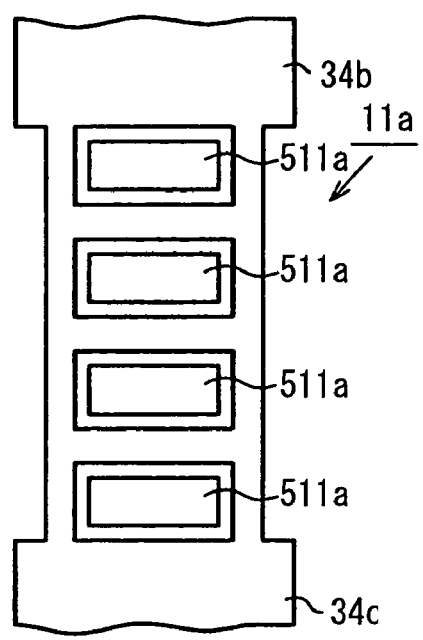
Figure 20C:
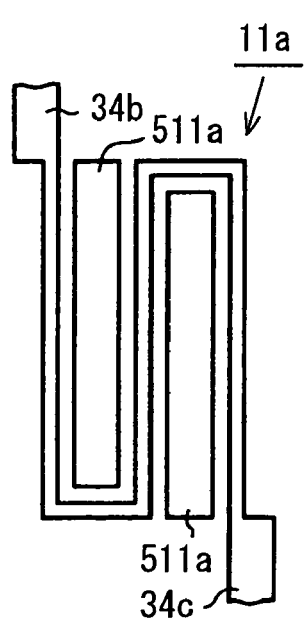
Figure 20D:
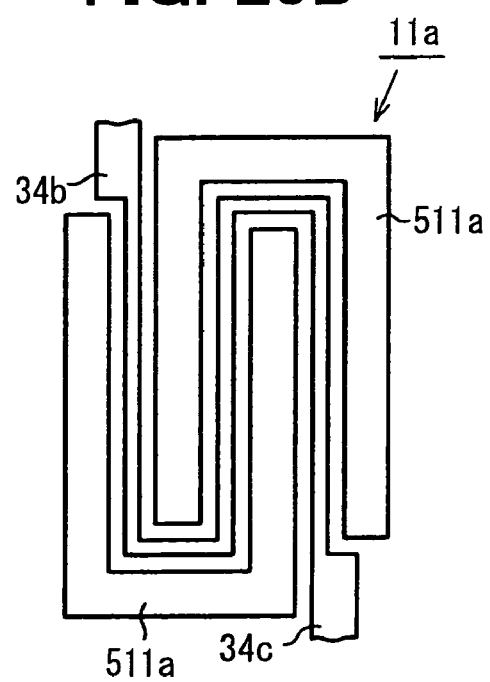

Although the thermal conduction member 511a, 511b has a rectangular shape, the thermal conduction member 511a, 511b can have other shape. For example, the thermal conduction member 511a, 511b has a various shape, as shown in FIGS. 20A–20D. For example, a pair of the thermal conduction members 511a is disposed on both sides of the upstream heater 11a, as shown in FIG. 20A. Further, as shown in FIG. 20B, a plurality of the thermal conduction members 511a is disposed in the upstream heater 11a without any connection between the thermal conduction member and the upstream heater 11a. Further, as shown in FIGS. 20C and 20D, a plurality of the thermal conduction members 511a is disposed nearby the upstream heater 11a having a plurality of connection portions. Here, it is preferred that the upstream and downstream heaters 11a, 11b and the thermal conduction members 511a, 511b are disposed linearly symmetrically with a center axis between the upstream and downstream heaters 11a, 11b.

Although the thermal conduction member 511a, 511b are disposed symmetrically with the upstream and downstream heaters 11a, 11b, the thermal conduction member 511a, 511b can be disposed asymmetrically with the heaters 11a, 11b. Although the thermal conduction member 511a, 511b are formed simultaneously together with the heaters 11a, 11b, the thermal conduction member 511a, 511b can be formed in a different process. Further, the thermal conduction member 511a, 511b can be made of other material such as metallic material.

Further, the heater 11a, 11b can be made of poly silicon or metallic material. Further, the width W of the heater 11a, 11b can be set to other value, which is out of the range between 7 μm and 50 μm.

(Six Embodiment)

A flow sensor 600 according to a sixth embodiment of the present invention is shown in FIG. 21. In the sensor 600, the upstream heater 11a and the downstream heater 11b are disposed mirror symmetrically, and have the same dimensions and the same shape.

As shown in FIG. 21, the thermal conduction member 511a is formed on the thin film portion 38. The thermal conduction member 511a is made of highly thermal conductive material, which has a high thermal conductivity higher than that of the silicon nitride film 46. The current does not flow through the thermal conduction member 511a substantially. The thermal conduction member 511a connects to the upstream heater 11a at one portion, which is provided by a thermal connection 611 made of single crystal silicon.

Therefore, the heat generated in the upstream heater 11a directly conducts to the thermal conduction member 511a through the thermal connection 611. Thus, the temperature of the thermal conduction member 511a follows the temperature of the upstream heater 11a rapidly, so that the response of heat conduction is improved. Further, the heat radiation of the upstream heater 11a is much improved, so that the sensitivity of the flow sensor 600 increases.

Further, the thermal conduction member 511a connects to the upstream heater 11a at the single thermal connection 611. Therefore, the current does not flow into the thermal conduction member 511a through the thermal connection 611, so that the electric power does not consume at the thermal conduction member 511a.

Preferably, the thermal conduction members 511a, 511b having the thermal connection 611 are disposed mirror symmetrically, and have the same dimensions and the same shape. Further, the thermal conduction members 511a, 511b having the thermal connection 611 are disposed linearly symmetrically with a center axis between the upstream and downstream heaters 11a, 11b. Thus, the sensitivity of the sensor 600 in the flow direction of the fluid is improved.

Figure 22A:
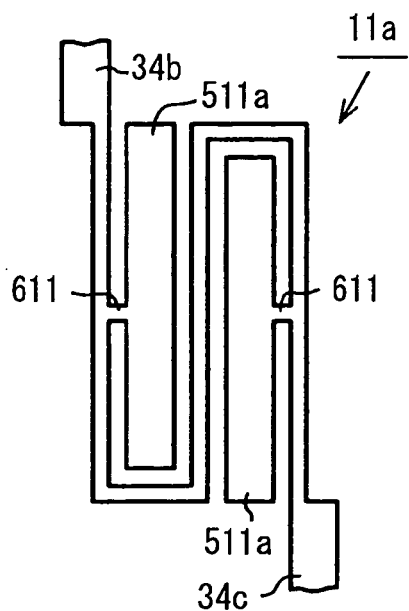
FIGS. 22A–22C are plan views showing different upstream heaters of the flow sensor according to the sixth embodiment.
Figure 22B:
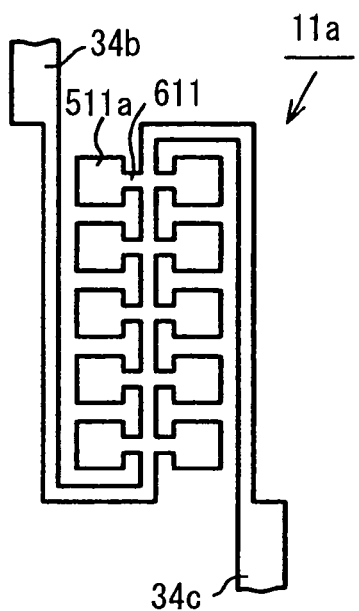
Figure 22C:
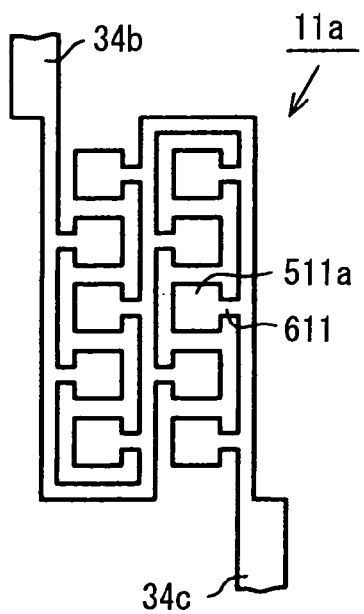

Although the thermal conduction member 511a, 511b has a rectangular shape, the thermal conduction member 511a, 511b can have other shape. For example, the thermal conduction member 511a, 511b has a various shape, as shown in FIGS. 22A–22C. For example, a plurality of the thermal conduction members 511a is disposed nearby the upstream heater 11a having a plurality of connection portions 611. Each thermal conduction member 511a connects to the upstream heater 11a through a plurality of thermal connections 611. Here, it is preferred that the upstream and downstream heaters 11a, 11b and the thermal conduction members 511a with the connection portions are disposed linearly symmetrically with a center axis between the upstream and downstream heaters 11a, 11b.

(Seventh Embodiment)

Figure 23:
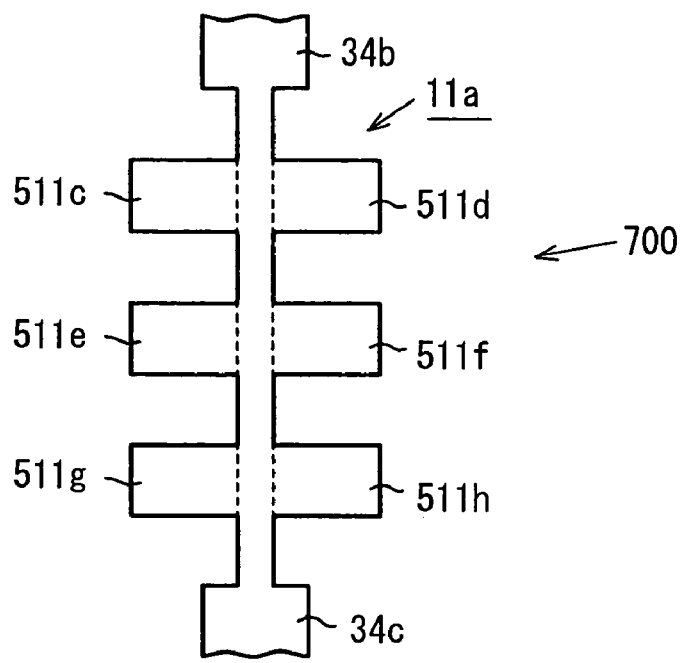
FIG. 23 is a plan view showing an upstream heater of a flow sensor according to a seventh embodiment of the present invention.

A flow sensor 700 according to a seventh embodiment of the present invention is shown in FIG. 23. In the sensor 700, the upstream heater 11a and the downstream heater 11b are disposed mirror symmetrically, and have the same dimensions and the same shape.

As shown in FIG. 23, a plurality of thermal conduction members 511c–511h is formed on the thin film portion 38. Each thermal conduction member 511c–511h is made of highly thermal conductive material, which has a high thermal conductivity higher than that of the silicon nitride film 46. The current does not flow through the thermal conduction member 511c–511h substantially. The thermal conduction member 511c–511h directly connects to the upstream heater 11a, and is protruded from the upstream heater 11a in a direction perpendicular to the longitudinal direction of the upstream heater 11a.

Therefore, the heat generated in the upstream heater 11a directly conducts to the thermal conduction member 511c–511h. Thus, the temperature of the thermal conduction member 511c–511h follows the temperature of the upstream heater 11a rapidly, so that the response of heat conduction is improved. Further, the heat radiation of the upstream heater 11a is much improved, so that the sensitivity of the flow sensor 700 increases.

Further, the thermal conduction member 511c–511h connects to the upstream heater 11a at one portion. Therefore, the current does not flow into the thermal conduction member 511c–511h substantially, so that the electric power does not consume at the thermal conduction member 511c–511h.

Although the sensor 700 includes six thermal conduction members 511c–511h, the sensor 700 can have different number of thermal conduction members such as two thermal conduction members. Although the thermal conduction member 511c–511h has a rectangular shape, the thermal conduction member can have other shape. Further, although the upstream heater 11a does not have any connection portion, the upstream heater 11a can have a plurality of connection portions. Moreover, the upstream heater 11a can have other shape.

(Eighth Embodiment)

Figure 24:
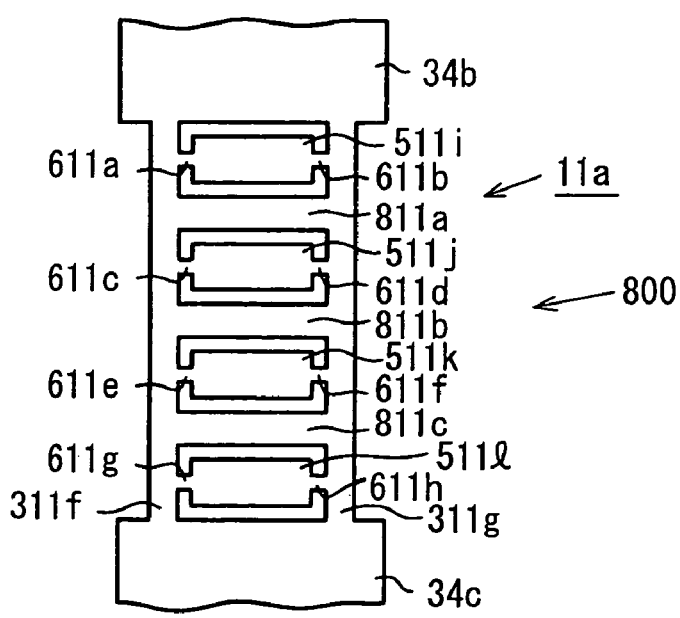
FIG. 24 is a plan view showing an upstream heater of a flow sensor according to an eighth embodiment of the present invention.

A flow sensor 800 according to an eighth embodiment of the present invention is shown in FIG. 24. In the sensor 800, the upstream heater 11a and the downstream heater 11b are disposed mirror symmetrically, and have the same dimensions and the same shape.

As shown in FIG. 24, a plurality of thermal conduction members 511i–511l is formed on the thin film portion 38. Each thermal conduction member 511i–511l is made of highly thermal conductive material that is single crystal silicon, which has a high thermal conductivity higher than that of the silicon nitride film 46. The thermal conduction member 511i–511l connects to the upstream heater 11a through a plurality of thermal connections 611a–611h made of single crystal silicon. Each thermal conduction member 511i–511l has a pair of thermal connections 611a–611h and two contact points between the thermal conduction member 511i–511l and a pair of thermal connections 611a–611h. The upstream heater 11a is formed so as to equalize the electric potentials at two contact points.

Specifically, the upstream heater 11a includes a pair of line heaters 311f, 311g, which are connected together in parallel. Bridges 811a–811c connect a pair of line heaters 311f, 311g, and are made of single crystal silicon. The thermal conduction member 511i is disposed between the lead wire 34b and the bridge 811a, the thermal conduction member 511j is disposed between the bridge 811a and the bridge 811b, and so on.

The thermal conduction member 511i connects to the line heater 311f through the thermal connection 611a, and connects to the line heater 311g through the thermal connection 611b. A contact point between the thermal conduction member 511i and the thermal connection 611a, and another contact point between the thermal conduction member 511i and the thermal connection 611b have the same electric potential. Other thermal conduction members 511j–511l have the same construction.

Therefore, the heat radiation radiated from the upstream heater 11a is increased, so that the heat being absorbed into the fluid becomes large. Thus, the electric power consumption consumed at the upstream heater 11a becomes large so that the sensitivity of the sensor 800 is improved. Specifically, the heat radiation of the upstream heater 11a is much improved, so that the sensitivity of the flow sensor 800 increases.

Further, the upstream heater 11a is formed so as to equalize the electric potentials at two contact points between the thermal conduction member 511i–511l and a pair of thermal connections 611a–611h. Therefore, the current does not flow through the thermal conduction member 511i–511l, so that the electric power does not consume at thermal conduction member 511*i*–511*l*. Thus, the electric power consumption of the sensor 800 is reduced.

Although the current flows through the bridge 811*a*–811*c*, the bridge 811*a*–811*c* can be formed so as not to pass the current. In this case, the bridge 811*a*–811*c* works as the thermal conduction member 511*i*–511*l*.

Here, the thermal conduction member 511*i*–511*l*, the thermal connection 611*a*–611*h* and the heaters 11*a* can have other shape. Further, the sensor 800 can have a plurality of thermal conduction members and thermal connections.

(Ninth Embodiment)

A flow sensor 900 according to a ninth embodiment of the present invention includes the thin film portion 38, dimensions of which are equal to or smaller than 1.0 mm×1.0 mm, and the distance D between the thin film portion 38 and the terminals 22*a*–22*f*, which is in a range between 2.5 mm and 4.5 mm. In this case, the maximum value of the width W of the heater 11*a*, 11*b* becomes larger. However, when the width W is large, the heat radiation of the heater 11*a*, 11*b* increases, so that the electric power consumption at the heater 11*a*, 11*b* increases. The inventors have examined a relationship between the heat radiation and the width W.

Figure 25:
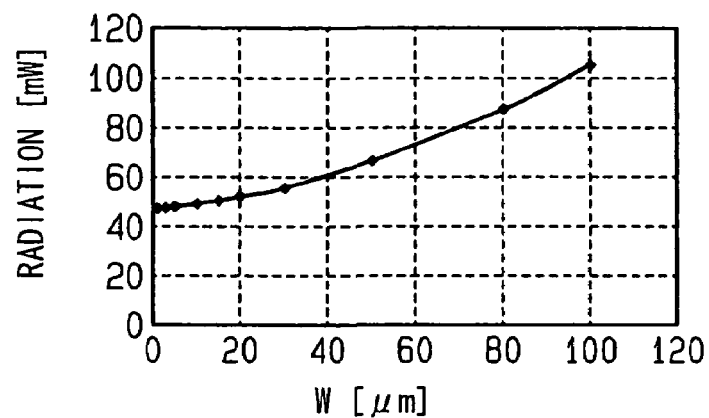
FIG. 25 is a graph showing a relationship between a width W of a heater and a heat radiation, according to a ninth embodiment of the present invention.
Figure 26:
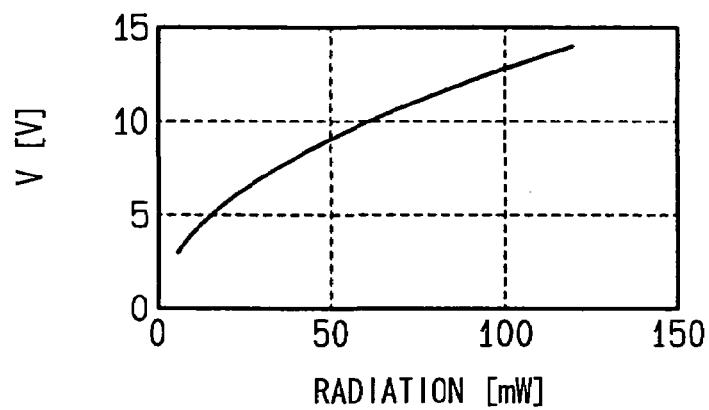
FIG. 26 is a graph showing a relationship between the heat radiation and a required voltage V of the heater, according to the ninth embodiment.
Figure 27:
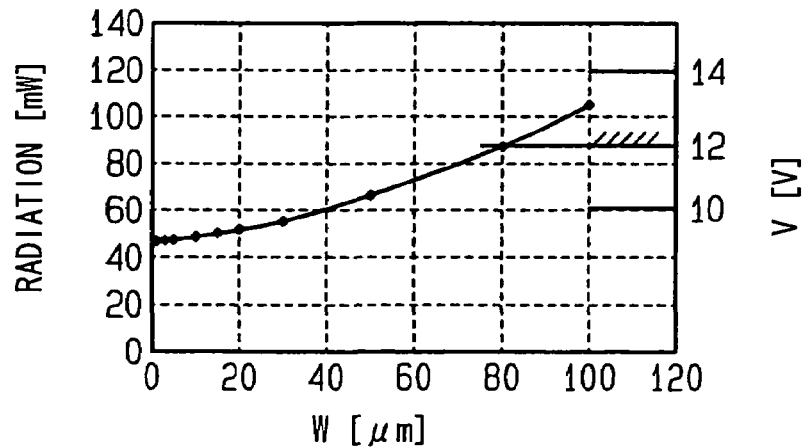
FIG. 27 is a graph showing a relationship between the width W, the heat radiation and the required voltage V of the heater, according to the ninth embodiment.

FIG. 25 shows the relationship between the heat radiation and the width W of a heater as a sample, which has a length of 400 $\mu$m. As the width W becomes large, the heat radiation increases. This is because the area of heat radiation increases in accordance with increase of the width W. FIG. 26 shows a relationship between the heat radiation and a required voltage V. As the heat radiation becomes large, the required voltage V increases. FIG. 27 shows a relationship among the width W, the heat radiation and the required voltage V. Thus, when the width W becomes large, the required voltage V also increases.

In a case where the flow meter 1 having the flow sensor 2 is mounted in an air suction passage of an internal combustion engine of a vehicle, available supply voltage outputted from a battery of the vehicle is lower than 12V. Therefore, the maximum value of the width W is about 80 $\mu$m. Further, it is considered that the length L of the heater 11*a*, 11*b* is set to be lower than 400 $\mu$m. However, in this case, the resistance of the heater 11*a*, 11*b* becomes small in relation to the resistance of the lead wire 34*a*–34*f*. Further, the length of the heater 11*a*, 11*b* is not sufficiently long that the heat is lost from the edge of the heater 11*a*, 11*b*. Therefore, to hold the average temperature of the heater 11*a*, 11*b* at a predetermined temperature, the electric power consumption becomes large.

Thus, the width W of the upstream and downstream heaters 11*a*, 11*b* is preferably in a range between 7 $\mu$m and 80 $\mu$m.

(Tenth Embodiment)

Figure 28:
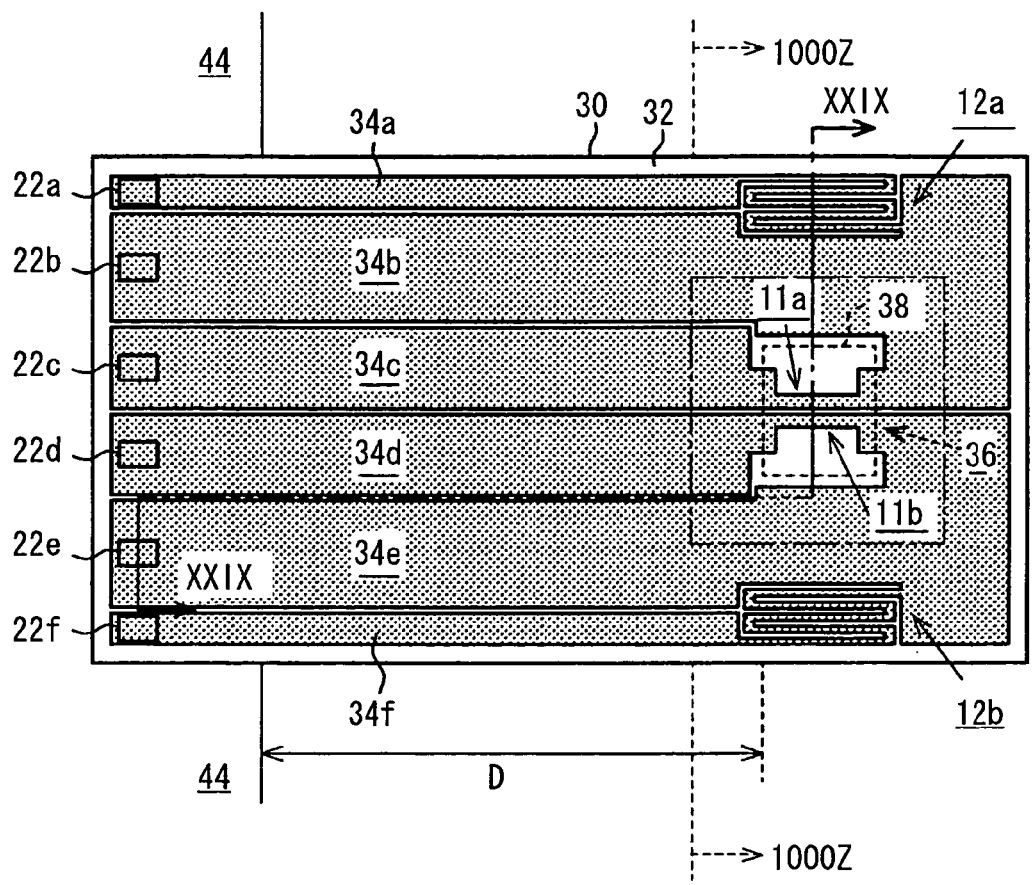
FIG. 28 is a plan view showing a flow sensor according to a tenth embodiment of the present invention.
Figure 29:
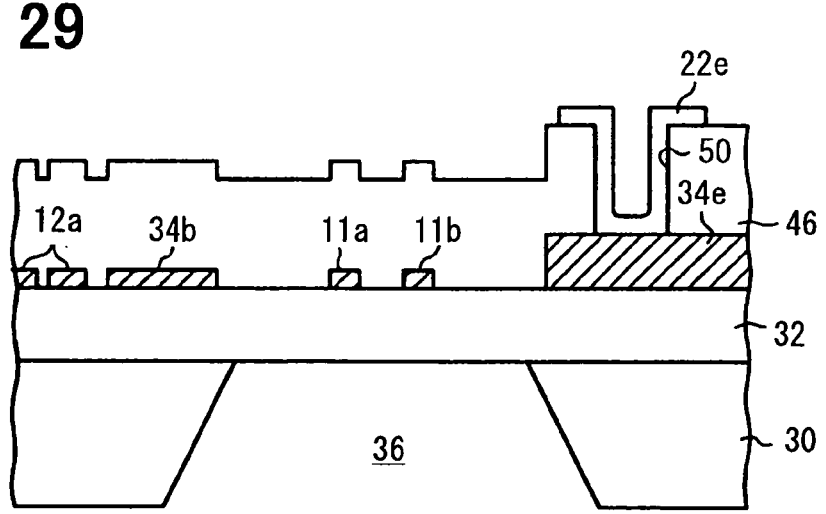
FIG. 29 is an enlarged cross-sectional view showing the flow sensor taken along line XXIX—XXIX in FIG. 28, according to the tenth embodiment.

A flow sensor 1000 according to a tenth embodiment of the present invention is shown in FIGS. 28 and 29. In the sensor 1000, the upstream heater 11*a* and the downstream heater 11*b* are disposed mirror symmetrically, and have the same dimensions and the same shape.

As shown in FIG. 29, the contact hole 50 is formed in the silicon nitride film 46, and corresponds to the lead wire 34*e*. In the contact hole 50, the terminal 22*e* is disposed, so that the terminal 22*a* connects to the lead wire 34*e*. Here, the upstream and downstream heaters 11*a*, 11*b*, the upstream and downstream temperature detectors 12*a*, 12*b*, and the lead wires 34*a*–34*f* are made of silicon film. Part of the silicon film composing the upstream and downstream heaters 11*a*, 11*b* is locally thinned. Specifically, the silicon film disposed in a region 1000Z shown in FIG. 28 is thinned, i.e., right side of the flow sensor 1000 in FIG. 28 is locally thinned. Therefore, the lead wires 34*b*, 34*e* are also locally thinned. That is, thickness of each of the upstream and downstream heaters 11*a*, 11*b*, the upstream and downstream temperature detectors 12*a*, 12*b* and the lead wire 34*b* becomes small, as shown in FIG. 29.

Therefore, total thickness of the flow sensor 1000 disposed in the region 1000Z becomes small, so that steps of the surface of the silicon nitride film 46 becomes small, the steps being disposed in the region 1000Z. Thus, the step of the silicon nitride film 46 is reduced sufficiently so that the flow of fluid is limited from being disturbed. Further, a contamination is limited from adhering on the silicon nitride film 46 at the step. Thus, the detection accuracy of the sensor 1000 is improved.

Further, the thickness of the upstream and downstream heaters 11*a*, 11*b* becomes thin in relation to the lead wires 34*a*, 34*c*, 34*d*, 34*f*. Furthermore, the thickness of the upstream and downstream heaters 11*a*, 11*b* becomes thin in relation to part of the lead wire 34*b*, 34*e*, which is disposed left side of the region 1000Z. Therefore, the resistance of each of the upstream and downstream heaters 11*a*, 11*b* is secured to be large in relation to the lead wires 34*a*–34*f*. Specifically, ratio of resistance between the upstream heater 11*a* and the lead wire 34*b*, 34*c*, and ratio of resistance between the upstream heater 11*b* and the lead wire 34*d*, 34*e* are secured to be large. Thus, the electric power consumption of the sensor 1000 is reduced, and the sensitivity of the sensor 1000 is improved.

Preferably, the width W of the upstream and downstream heaters 11*a*, 11*b* is several ten times larger than the thickness of the upstream and downstream heaters 11*a*, 11*b*.

Next, the flow sensor 1000 is manufactured with the following method. As shown in FIGS. 30A to 31C, the SOI substrate is prepared at first. The SOI substrate includes the semiconductor substrate 30, the silicon oxide film 32, and the single crystal silicon film 48. The semiconductor substrate 30 is made of single crystal silicon having N-type conductivity. The thickness of the substrate 30 is 625 $\mu$m. The thickness of the silicon oxide film 32 is 1 $\mu$m. The single crystal silicon film 48 has P-type conductivity, which is formed with boron doping, and the thickness of the single crystal silicon film 48 is in a range between 1.0/m and 5.0 $\mu$m. The dose amount of the boron for doping on the single crystal silicon film 48 is $2\times10^{15} \text{cm}^{-2}$.

Although the SOI substrate is prepared, the above construction can be formed from a silicon substrate. Further, the silicon film 48 can be formed of poly silicon film instead of single crystal silicon film.

Figure 30A:
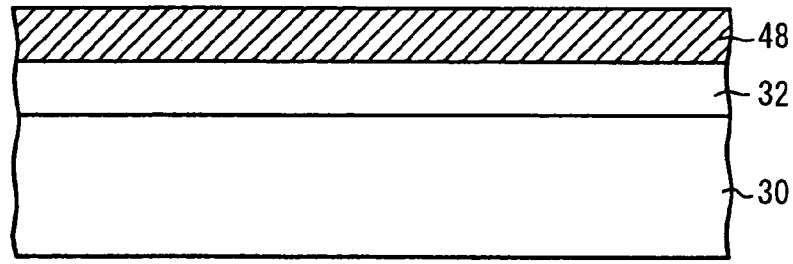
FIGS. 30A to 31C are cross-sectional views of the sensor taken along line XXIX—XXIX in FIG. 28 explaining a manufacturing method for manufacturing the flow sensor according to the tenth embodiment.
Figure 30B:
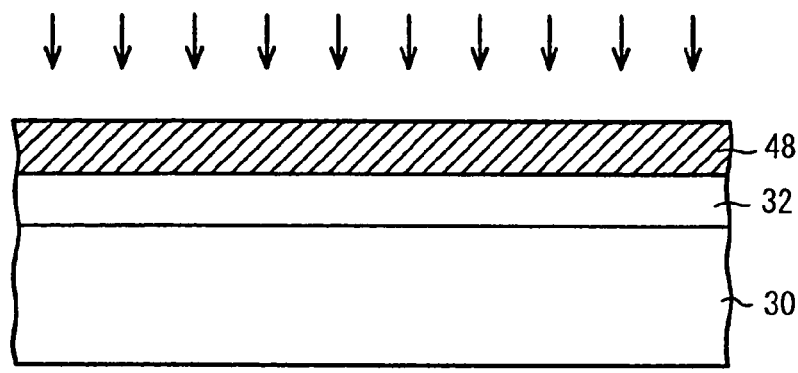

As shown in FIG. 30B, the boron is doped into the single crystal silicon film 48 so that the dose amount of the impurity on the single crystal silicon film 48 is $2\times10^{16} \text{cm}^{-2}$. The doping is performed by the ion implantation method. Further, the doping can be performed by the gas phase diffusion method and the solid phase diffusion method. The gas phase diffusion method is such that the impurities are diffused from the gas phase into the silicon film 48. The solid phase diffusion method is such that an oxide film doped with the impurities contacts the silicon film so that the impurities is diffused into the silicon film from the surface of the silicon film. Further, the impurity concentration of boron in the single crystal silicon film 48 can be set to another value, i.e., the dose amount of the boron can be set to another value.

Then, the SOI substrate is heated at a predetermined temperature such as 1150° C. during a predetermined time such as 2 hours so as to activate the boron doped single crystal silicon film 48.

Figure 30C:
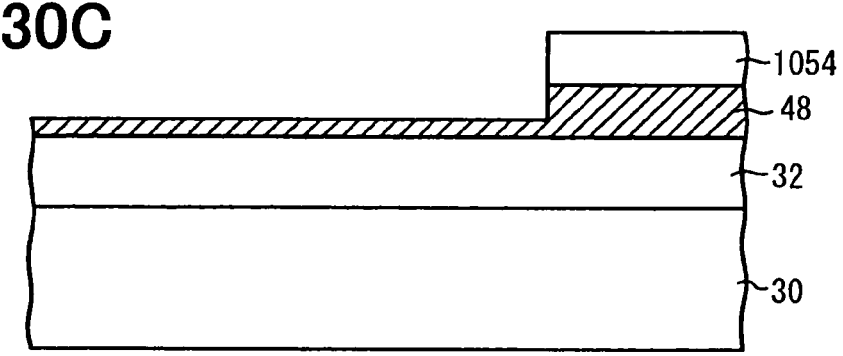

As shown in FIG. 30C, a resist 1054 is formed on part of the single crystal silicon 48, which is right side of the region 1000Z, i.e., the resist 1054 is formed on the single crystal silicon 48 except for the region 1000Z. The part of the single crystal silicon 48 is etched with the resist 1054 as a mask by the reactive ion etching method. Thus, the single crystal silicon 48 disposed in the region 1000Z is thinned. Preferably, the thickness of the thinned single crystal silicon 48 is in a range between 0.5 µm and 1.5 µm. Here, the etching is controlled with the etching time so that the thickness of the single crystal silicon 48 is controlled.

Although the single crystal silicon film 48 disposed in the region 1000Z is thinned, certain part of the single crystal silicon film 48 can be only thinned. The certain part of the single crystal silicon film 48 is a region, to which the upstream and downstream heaters 11a, 11b are projected in the flow direction of the fluid. Further, at least part of the single crystal silicon film 48 disposed in the region 1000Z and to become the upstream and downstream heaters 11a, 11b can be only thinned. Although the single crystal silicon film 48 disposed in the region 1000Z is thinned, the single crystal silicon film is deposited again on a pre-deposited silicon film except for the region 1000Z after the pre-deposited silicon film having a certain thickness is formed on the silicon oxide film 32. Thus, the partially thinned single crystal silicon film 32 is obtained.

Figure 31A:
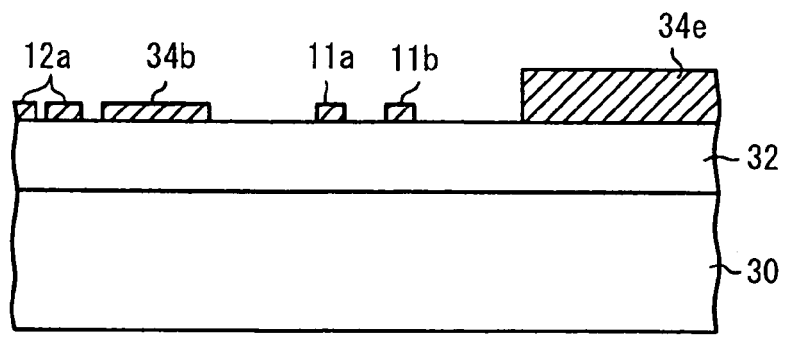

Next, as shown in FIG. 31A, the resist 1054 is removed. Then, the locally thinned single crystal silicon film 48 is patterned into a predetermined pattern with using reactive ion etching method so that the upstream and downstream heaters 11a, 11b, the upstream and downstream temperature detectors 12a, 12b and the lead wires 34a–34f are formed. In this way, the upstream heater 11a and the upstream temperature detector 12a are manufactured in the same process, and the downstream heater 11b and the downstream temperature detector 12b are also manufactured in the same process, so that each temperature coefficient of resistance TCR of the upstream heater 11a and the upstream temperature detector 12a are equalized, and each temperature coefficient of resistance TCR of the downstream heater 11b and the downstream temperature detector 12b are also equalized easily. However, after the upstream and downstream heaters 11a, 11b and the like are patterned, the impurity can be doped into the single crystal silicon film 48.

Figure 31B:
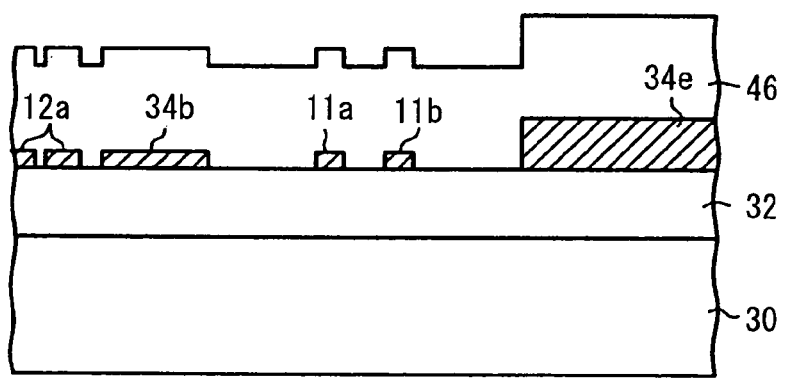

As shown in FIG. 31B, the silicon nitride film 46 is formed on the SOI substrate with using a low-pressure chemical vapor deposition (i.e., low pressure CVD). Here, the thickness of the silicon nitride film 46 is, for example, 1.5 µm. The deposition condition of the low-pressure CVD is described as follows. A gas flow rate is $SiH_2Cl_2:NH_3=4:1$, an atmospheric temperature is 850° C., and a pressure is 20 Pa.

Figure 31C:
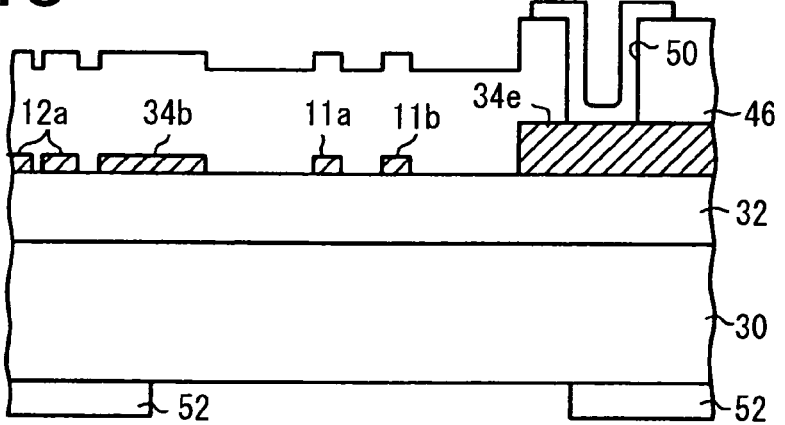

As shown in FIG. 31C, the silicon nitride film 46 is etched with using reactive ion etching method so that the contact hole 50 is formed. Further, a metallic film made of, for example, aluminum is deposited on the silicon nitride film 46. The thickness of the metallic film is, for example, 1 m. After that, the metal film is etched into a predetermined pattern, so that the terminal 22e is formed in the contact hole 50. Simultaneously, the terminals 22a–22d, 22f are also formed.

Next, the silicon nitride film 52 is formed on the backside of the substrate 30 with using plasma CVD method. The thickness of the silicon nitride film 52 is, for example, 1 µm. Then, the silicon nitride film 52 is etched into a predetermined pattern with using reactive ion etching method, so that the opening of the silicon nitride film 52 is formed. The opening corresponds to a region shown as the chain line in FIG. 28.

The semiconductor substrate 30 is etched with using the silicon nitride film 52 as a mask, so that the concavity 36 is formed in substrate 30. Thus, the thin film portion 38 is formed so as to build a bridge in the concavity 36 of the substrate 30. In this case, the etching is preferably performed as follows.

The etching is performed with wet etching method using alkali etchant such as potassium hydroxide (i.e., KOH) or tetra methyle ammonium hydroxide (i.e., TMAH). The backside of the substrate 30 is prepared to the single silicon {100} plane, which has six equivalent planes. However, the backside of the substrate 30 can be the single silicon {110} plane. The opening of the silicon nitride film 52 is formed to have a rectangular shape, and each side of the rectangular is parallel to the <110> direction of single crystal silicon.

In the above case, the substrate 30 is etched along with the {111} plane with using the above etchant. Thus, the thin film portion 38 can be formed to have a rectangular shape. Further, a pair of sides of the rectangular of the thin film portion 38 is formed to be perpendicular to the flow direction of the fluid.

Although the thin film portion 38 is formed with the wet etching method, the thin film portion 38 can be formed with dry etching method. In this case, the backside of the substrate 30 is not required to have {100} plane. Although the thin film portion 38 is made of the silicon oxide film 32, the thin film portion 38 can be formed of other insulation film such as a silicon nitride film.

In the above way, before the upside of the single crystal silicon 48 is locally etched and patterned, the boron is doped into the single crystal silicon film 48. Thus, the boron is limited from doping into the silicon oxide film 32. Therefore, after the boron is doped into the single crystal silicon film 48, the silicon film 48 is annealed sufficiently and appropriately for the diffusion and activation of the impurities, i.e., the boron. Here, if the impurity is doped in the silicon oxide film 32, the silicon oxide film 32 may be thermally fluidized so that the heat treatment of the single crystal silicon film 48 fails. However, in some cases, after the single crystal silicon film 48 is locally thinned, the impurity can be doped.

Further, the single crystal silicon film 48 is patterned after the single crystal silicon film 48 is locally thinned. Thus, the silicon oxide film 32 is limited from etching in the thinning process of the single crystal silicon film 48. If the single crystal silicon film 48 is locally thinned after the single crystal silicon film 48 is patterned, each part such as the upstream and downstream heater 11a, 11b and the like may be thinned. In the above method according to this embodiment, each part is not thinned because the single crystal silicon film 48 is patterned after the single crystal silicon film 48 is locally thinned. However, when the single crystal silicon film 48 is etched selectively compared with the silicon oxide film 32, the single crystal silicon film 48 can be locally thinned without over-etching after the single crystal silicon film 48 is patterned.

(Eleventh Embodiment)

Figure 32:
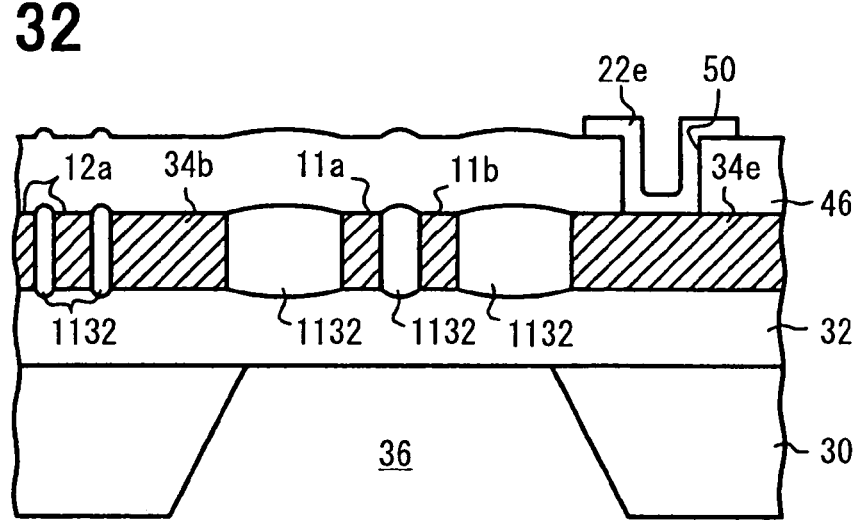
FIG. 32 is an enlarged cross-sectional view showing a flow sensor according to an eleventh embodiment of the present invention.

A flow sensor 1100 according to an eleventh embodiment of the present invention is shown in FIG. 32. In the sensor 1100, the upstream heater 11a and the downstream heater 11b are disposed mirror symmetrically, and have the same dimensions and the same shape.

The flow sensor 1100 includes a partial oxidation portion 1132 disposed on the silicon oxide film 32. The partial oxidation portion 1132 is also disposed between parts such as the upstream and downstream heaters 11a, 11b, the upstream and downstream temperature detectors 12a, 12b, and the lead wires 34b, 34e.

Here, the upstream and downstream heaters 11a, 11b, the upstream and downstream temperature detectors 12a, 12b, and the lead wires 34a–34f are formed with partially oxidizing the single crystal silicon film 48 so that the single crystal silicon film 48 is patterned into the upstream and downstream heaters 11a, 11b, the upstream and downstream temperature detectors 12a, 12b, and the lead wires 34a–34f. Specifically, the upstream and downstream heaters 11a, 11b, the upstream and downstream temperature detectors 12a, 12b, and the lead wires 34a–34f are patterned as a region, which is not oxidized in the thermal oxidation process of the single crystal silicon film 48. However, only the upstream and downstream heaters 11a, 11b can be formed with the partial oxidation process, so that the step of the silicon nitride film 46 disposed on the heaters 11a, 11b becomes small. Further, the silicon film 48 can be formed of poly crystalline silicon film instead of single crystal silicon film.

Accordingly, the height of each of the upstream and downstream heaters 11a, 11b, the upstream and downstream temperature detectors 12a, 12b, and the lead wires 34a–34f is substantially equal to that of the partial oxidation portion 1132. Therefore, when the silicon nitride film 46 is covered the upstream and downstream heaters 11a, 11b, the upstream and downstream temperature detectors 12a, 12b, and the lead wires 34a–34f, the surface of the silicon nitride film 46 is almost flat. Accordingly, the step of the silicon nitride film 46 is reduced sufficiently so that the flow of the fluid is limited from being disturbed. Further, a contamination is limited from adhering on the silicon nitride film 46 at the step. Thus, the detection accuracy of the sensor 1100 is improved.

Preferably, the width W of the upstream and downstream heaters 11a, 11b is several ten times larger than the thickness of the upstream and downstream heaters 11a, 11b.

Next, the flow sensor 1100 is manufactured with the following method. As shown in FIGS. 33A to 34C, the SOI substrate is prepared at first. The semiconductor substrate 30 is made of single crystal silicon having N-type conductivity. The thickness of the substrate 30 is 625 $\mu$m. The thickness of the silicon oxide film 32 is in a range between 1 $\mu$m and 3 $\mu$m. The single crystal silicon film 48 has P-type conductivity, which is formed with boron dope, and the thickness of the single crystal silicon film 48 is in a range between 0.6 $\mu$m and 2.0 $\mu$m. The boron concentration in the single crystal silicon film 48 is $2\times10^{15}$cm$^{-3}$.

Figure 33A:
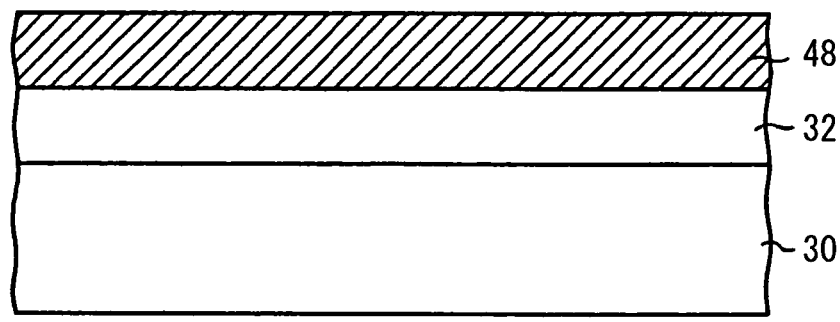
FIGS. 33A to 34C are cross-sectional views of the sensor explaining a manufacturing method for manufacturing the flow sensor according to the eleventh embodiment.
Figure 33B:
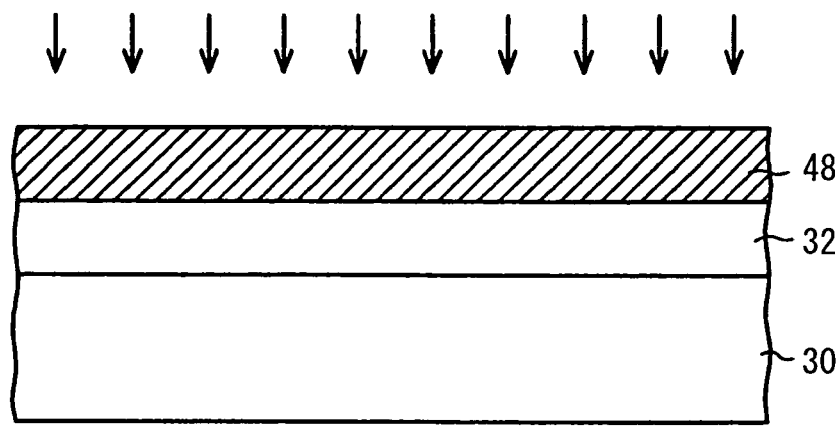

As shown in FIG. 33B, boron is doped into the single crystal silicon film 48 so that the dose amount of the boron onto the single crystal silicon film 48 is $2\times10^{15}$cm$^{-2}$. Then, the SOI substrate is heated at a predetermined temperature such as 1150° C. during a predetermined time such as 5 hours so as to activate the boron doped single crystal silicon film 48.

Figure 33C:
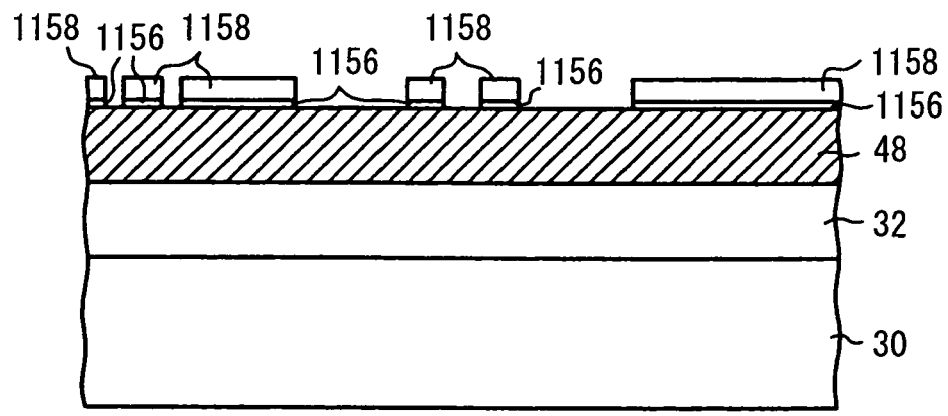

As shown in FIG. 33C, a pad oxidation film 1156 and a silicon nitride film 1158 are formed on the single crystal silicon film 48. The silicon nitride film 1158 is disposed on the pad oxidation film 1156, and has the thickness of 100 nm. Next, part of the silicon nitride film 1158 and the pad oxidation film 1156 is etched and removed, the part corresponding to the partial oxidation portion 1132.

Figure 34A:
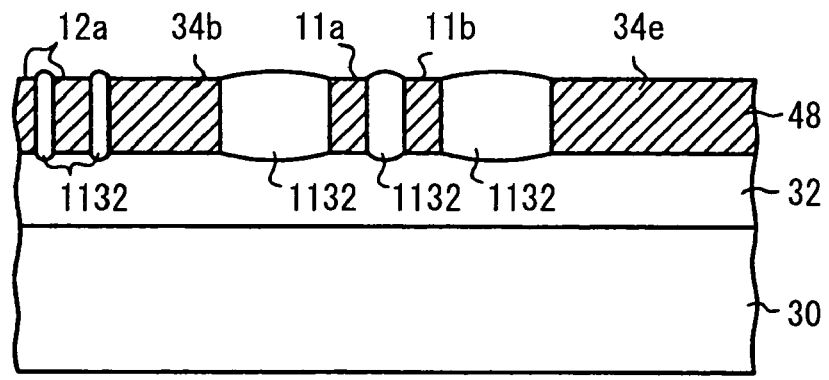

Next, as shown in FIG. 34A, the single crystal silicon film 48 is partially oxidized with using the silicon nitride film 1158 as a mask by thermal oxidation method, so that the partial oxidation portion 1132 is formed. Specifically, the single crystal silicon film 48 partially becomes an insulator so that the partial oxidation portion 1132 is formed. Thus, part of the single crystal silicon film 48 without being oxidized is patterned into the upstream and downstream heaters 11a, 11b, the upstream and downstream temperature detectors 12a, 12b, and the lead wires 34b, 34e. After that, the pad oxidation film 1156 and the silicon nitride film 1158 are etched and removed. Here, the process shown in FIGS. 33C and 34A is the same as the LOCOS (i.e., local oxidation of silicon) process.

In this way, the upstream heater 11a and the upstream temperature detector 12a are manufactured in the same process, and the downstream heater 11b and the downstream temperature detector 12b are also manufactured in the same process, so that each temperature coefficient of resistance TCR of the upstream heater 11a and the upstream temperature detector 12a are equalized, and each temperature coefficient of resistance TCR of the downstream heater 11b and the downstream temperature detector 12b are also equalized easily.

Although the single crystal silicon film 48 is partially oxidized to be an insulator, the single crystal silicon film 48 can be partially nitrided to be an insulator with using thermal process. Although the single crystal silicon film 48 is partially oxidized after the impurity is doped, the impurity can be doped after the single crystal silicon film 48 is partially oxidized.

Figure 34B:
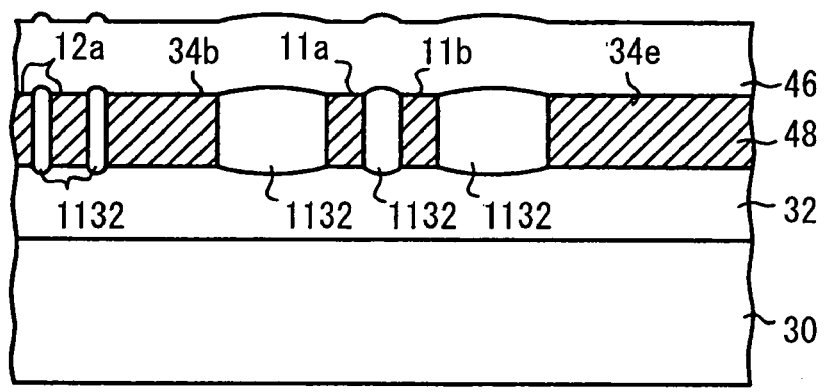

As shown in FIG. 34B, the silicon nitride film 46 is formed on the SOI substrate with using the low-pressure CVD method. Here, the thickness of the silicon nitride film 46 is, for example, 1.5 $\mu$m.

Figure 34C:
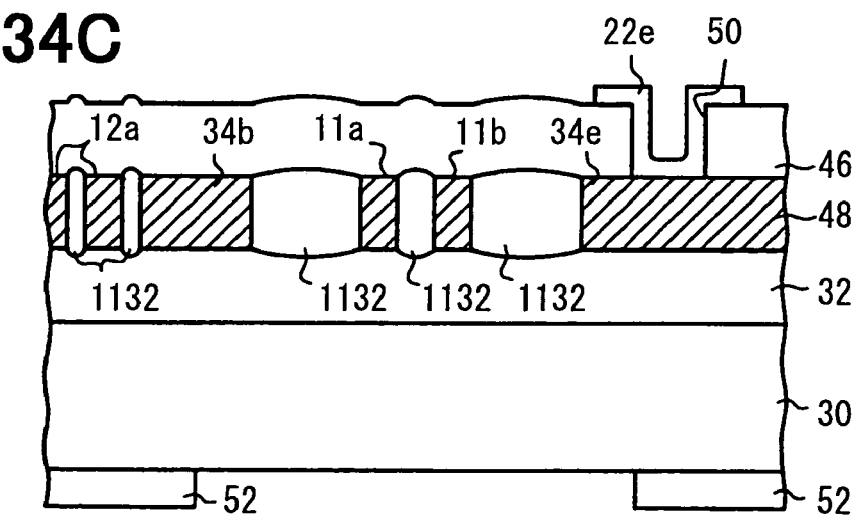

As shown in FIG. 34C, the silicon nitride film 46 is etched with using the reactive ion etching method so that the contact hole 50 is formed. Further, a metallic film made of, for example, aluminum is deposited on the silicon nitride film 46. The thickness of the metallic film is, for example, 1 $\mu$m. After that, the metal film is etched into a predetermined pattern, so that the terminal 22e is formed in the contact hole 50. Simultaneously, the terminals 22a–22d, 22f are also formed.

Next, the silicon nitride film 52 is formed on the backside of the substrate 30 with using the plasma CVD method. The thickness of the silicon nitride film 52 is, for example, 1 $\mu$m. Then, the silicon nitride film 52 is etched into a predetermined pattern with using the reactive ion etching method, so that the opening of the silicon nitride film 52 is formed.

The semiconductor substrate 30 is etched with using the silicon nitride film 52 as a mask, so that the concavity 36 is formed in the substrate 30. Thus, the thin film portion 38 is formed so as to build a bridge in the concavity 36 of the substrate 30.

(Twelfth Embodiment)

Figure 35:
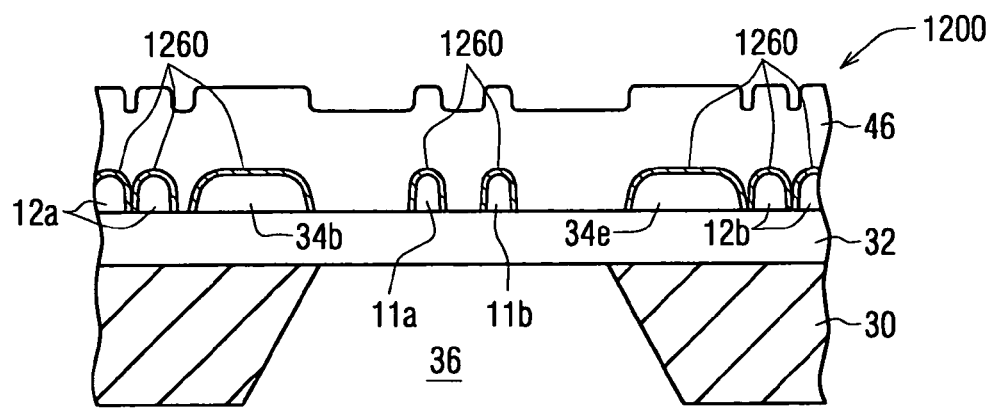
FIG. 35 is an enlarged cross-sectional view showing a flow sensor according to a twelfth embodiment of the present invention.

A flow sensor 1200 according to a twelfth embodiment of the present invention is shown in FIG. 35. In the sensor 1200, the upstream heater 11a and the downstream heater 11b are disposed mirror symmetrically, and have the same dimensions and the same shape.

As shown in FIG. 35, the insulation film 32 made of silicon nitride film is formed on the silicon substrate 30. Here, the film 32 is made of silicon nitride film instead of silicon oxide film. The upstream and downstream heaters 11a, 11b, the upstream and downstream temperature detectors 12a, 12b, and the lead wires 34a, 34e are formed on the insulation film 32. They are made of poly crystalline silicon, and are covered with the silicon nitride film 46. Further, each surface of the upstream and downstream heaters 11a, 11b, the upstream and downstream temperature detectors 12a, 12b, and the lead wires 34a, 34e is covered with a thermal oxidation film 1260. The thermal oxidation film 1260 is formed with a thermal oxidation method for oxidizing the surfaces of the upstream and downstream heaters 11a, 11b, the upstream and downstream temperature detectors 12a, 12b, and the lead wires 34a, 34e. Therefore, when a semiconductor film is patterned into the upstream and downstream heaters 11a, 11b, the upstream and downstream temperature detectors 12a, 12b, and the lead wires 34a, 34e, and then each corner of them 11a, 11b, 12a, 12b, 34b, 34e is sharpened, the thermal oxidation film 1260 rounds the sharpened corner. Although the lead wires 34b, 34e are covered with the thermal oxidation film 1260, it is not required that the lead wires 34b, 34e is covered with the thermal oxidation film 1260.

Accordingly, the thickness of silicon nitride film 46 as a passivation film covering the corners of them 11a, 11b, 12a, 12b, 34b, 34e is limited from thinning. Further, since each surface of them 11a, 11b, 12a, 12b, 34b, 34e is thermally oxidized, a concavity and convexity of the surface of them 11a, 11b, 12a, 12b, 34b, 34e is reduced. Here, the concavity and convexity is caused by grain boundaries of the poly crystalline silicon composing them 11a, 11b, 12a, 12b, 34b, 34e. Therefore, a concavity and convexity of the surface of the silicon nitride film 48 is also reduced. Furthermore, the thermal oxidation film 1260 prevents a contamination from penetrating from outside into them 11a, 11b, 12a, 12b, 34b, 34e, so that the thermal oxidation film 1260 works as a passivation film.

Next, the flow sensor 1200 is manufactured with the following method. As shown in FIGS. 36A to 38C, the semiconductor substrate 30 made of silicon is prepared at first. The insulation film 32 is formed on the substrate 30 with using the low-pressure CVD. Here, the thickness of the insulation film 32 is, for example, 1.5 $\mu$m. The deposition condition of the low-pressure CVD is described as follows. A gas flow rate is $SiH_2Cl_2:NH_3=4:1$, an atmospheric temperature is 850° C., and a pressure is 20 Pa.

Next, an amorphous silicon film 1248a is formed on the insulation film 32 with using the low-pressure CVD. Here, the thickness of the amorphous film 1248a is, for example, 1.0 $\mu$m. The deposition is, for example, performed at 550° C.

Figure 36A:
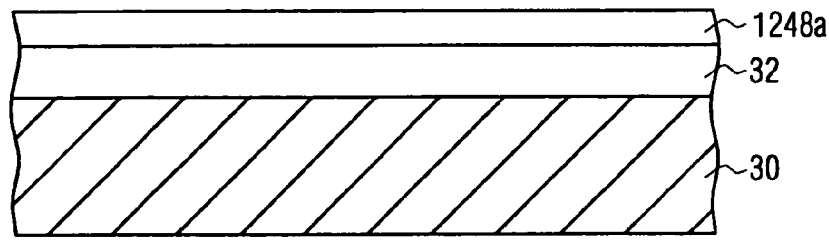
FIGS. 36A to 38C are cross-sectional views of the sensor explaining a manufacturing method for manufacturing the flow sensor according to the twelfth embodiment.
Figure 36B:
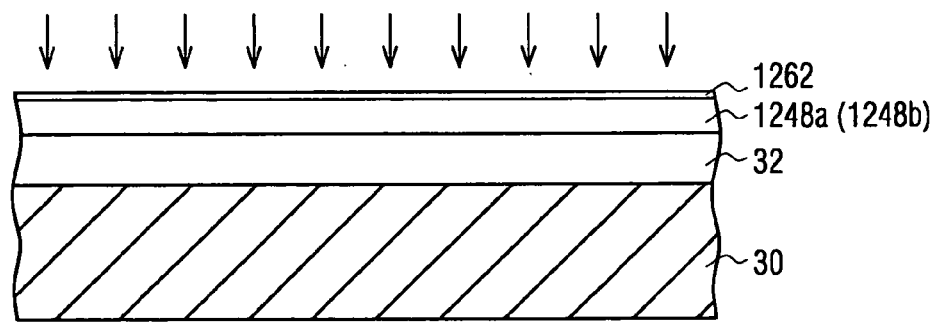

As shown in FIG. 36B, a transmission film 1262 made of silicon dioxide film is formed on the amorphous silicon film 1248a. A predetermined amount of boron is doped into the amorphous silicon film 1248a through the transmission film 1262.

Then, the substrate is annealed so that the amorphous silicon film 1248a is crystallized and the doped boron is diffused and activated in the poly crystalline silicon film 1248b. Here, the amorphous silicon film 1248a is crystallized so that the poly crystalline silicon film 1248b is formed. Preferably, a grain of the poly crystalline silicon film 1248b becomes larger under a certain condition of the above heat treatment. More preferably, under some conditions of the heat treatment, the maximum grain size of the poly crystalline silicon film 1248b become larger than the thickness of the amorphous silicon film 1248a. In the above cases where the grain size is sufficiently large, the poly crystalline silicon film 1248b has no grain boundary in the vertical direction, i.e., the film thickness direction.

The heat treatment having the above conditions is described as follows. For example, the amorphous silicon film 1248a is annealed at the first predetermined temperature (e.g., at 600° C.) during a predetermined time (e.g., 10 hours), and then the film 1248a is annealed again at the second predetermined temperature (e.g., 1150° C.), which is higher than the first predetermined temperature, during another predetermined time (e.g., 2 hours). This two-step annealing method provides to grow a grain of the poly crystalline silicon film 1248b largely. Then, the transmission film 1262 is removed.

Figure 36C:
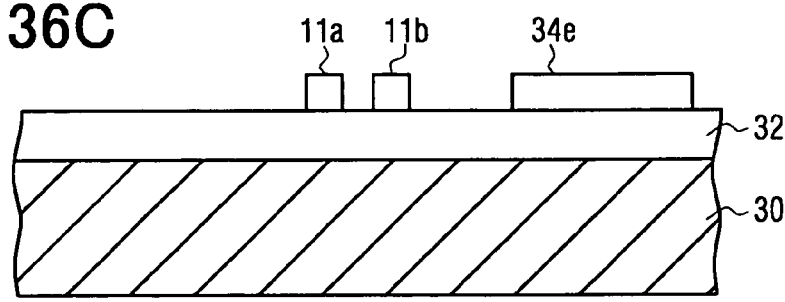

Next, as shown in FIG. 36C, the poly crystalline silicon film 1248b is patterned into a predetermined pattern with using reactive ion etching (i.e., RIE) method so that the upstream and downstream heaters 11a, 11b, the upstream and downstream temperature detectors 12a, 12b and the lead wires 34a–34f are formed. In this way, the upstream heater 11a and the upstream temperature detector 12a are manufactured in the same process, and the downstream heater 11b and the downstream temperature detector 12b are also manufactured in the same process, so that each temperature coefficient of resistance TCR of the upstream heater 11a and the upstream temperature detector 12a are equalized, and each temperature coefficient of resistance TCR of the downstream heater 11b and the downstream temperature detector 12b are also equalized easily.

Figure 36D:
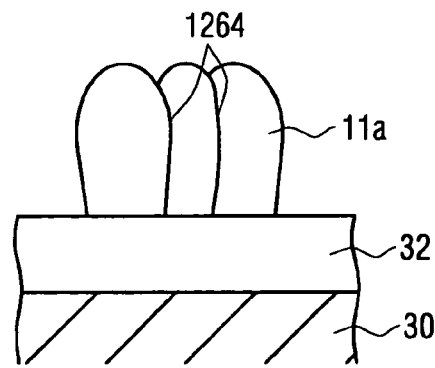

FIG. 36D is an enlarged cross-sectional view showing the upstream heater 11a made of poly crystalline silicon. In the upstream heater 11a, there is a plurality of grain boundaries 1264. However, since the grain size is larger than the thickness of the before annealing amorphous crystalline silicon film 1248a, the upstream heater 11a has no grain boundary in the film thickness direction. Thus, a single grain is disposed from the surface of the upstream heater 11a to the bottom of the upstream heater 11a. Accordingly, the performance of the upstream heater 11a is improved. However, the surface of the upstream heater 11a has a large concavity and convexity.

Figure 37A:
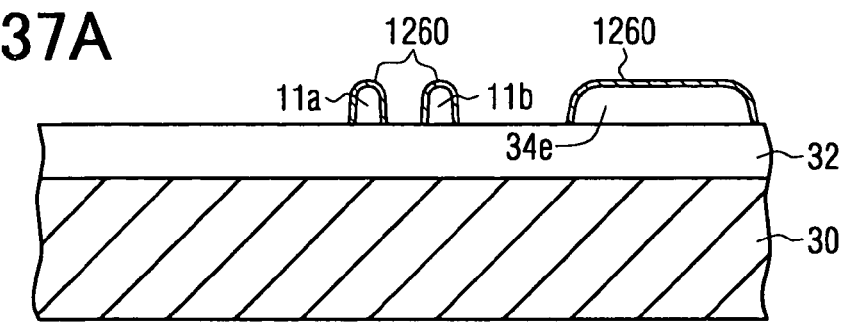
Figure 37B:
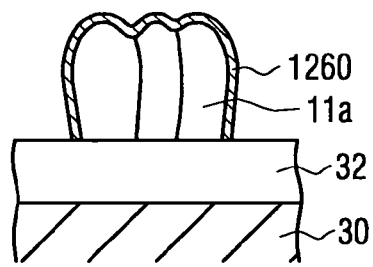

Next, as shown in FIG. 37A, each surface of the upstream and downstream heaters 11a, 11b, the upstream and downstream temperature detectors 12a, 12b and the lead wires 34b, 34e is thermally oxidized so that a thermal oxidation film 1260 is formed. This thermal oxidation is performed at a predetermined high temperature (e.g., in a range between 900° C. and 1150° C.) under an atmospheric pressure. However, the thermal oxidation can be performed under high pressure or low pressure. The thickness of the thermal oxidation film 1260 is, for example, one-tenth of the thickness of the poly crystalline silicon film 1248b (e.g., 0.1 $\mu$m). Thus, the concavity and convexity of the surface of the upstream heater 11a is reduced, as shown in FIG. 37B.

Here, since the heat treatment is performed after the boron is doped, the thermal oxidation film 1260 becomes fluidized during the heat treatment. Preferably, the above thermal oxidation is performed at a temperature being equal to or higher than 1000° C. In this case, the thermal oxidation film 1260 becomes much fluidized during the heat treatment. Further, in a case where the doping amount of the boron is large, the thermal oxidation film 1260 becomes much fluidized. In view of this point, the doping amount is preferably larger than $5 \times 10^{19} cm^{-3}$. More preferably, the doping amount of the boron is larger than $1 \times 10^{20} cm^3$.

Further, the above thermal oxidation and the boron doping are performed such that the concavity and convexity of the surface of the upstream heater 11a becomes equal to or smaller than one-tenth of the thickness of the poly crystalline silicon film 1248b.

Figure 37C:
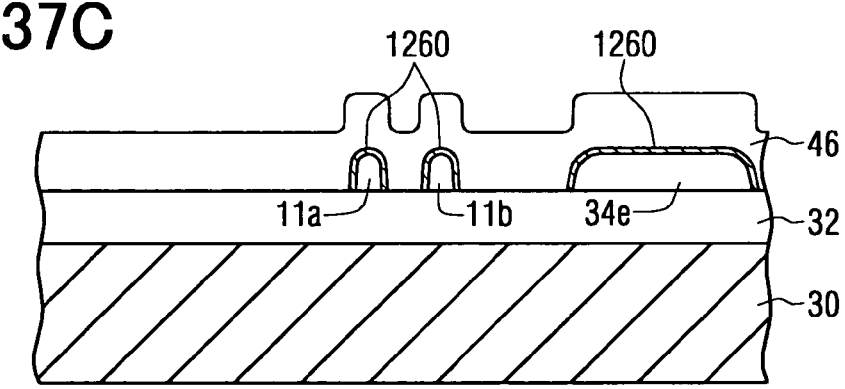

Next, as shown in FIG. 37C, the silicon nitride film 46 is formed on the substrate 30 with using the low pressure CVD. Here, the thickness of the silicon nitride film 46 is, for example, 1.5 $\mu$m. The deposition condition of the low-pressure CVD is described as follows. A gas flow rate is SiH₂Cl₂:NH₃=4:1, an atmospheric temperature is 850° C., and a pressure is 20 Pa.

Figure 37D:
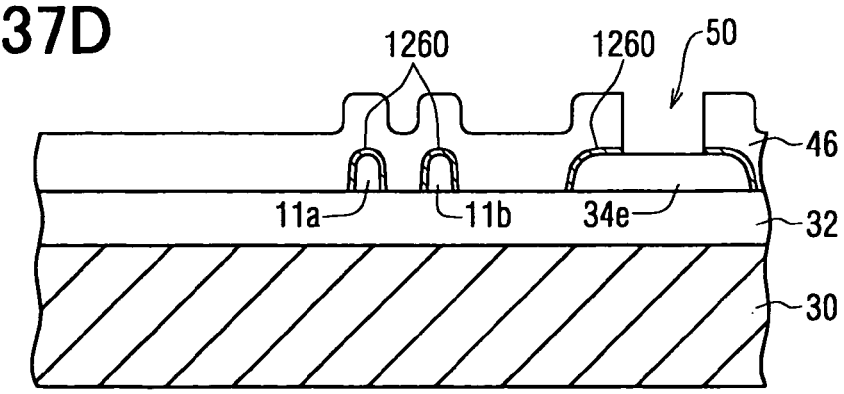
Figure 38A:
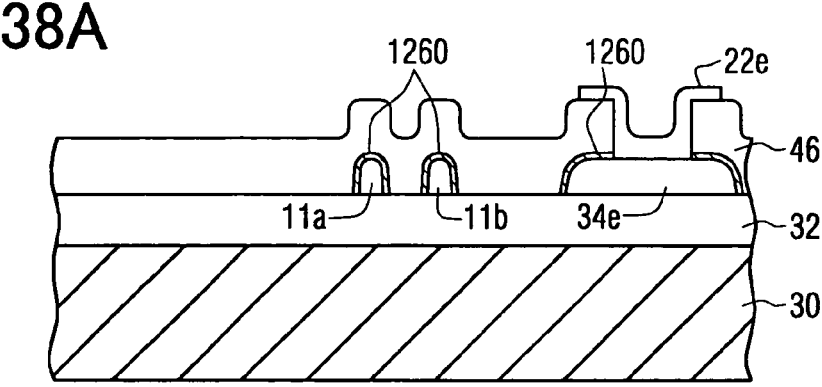

As shown in FIG. 37D, part of the silicon nitride film 46 and the thermal oxidation film 1260 is etched with using the RIE method so that the contact hole 50 is formed, the part being disposed on the lead wire 34*e*. As shown in FIG. 38A, a metallic film made of, for example, aluminum is deposited on the silicon nitride film 46. The thickness of the metallic film is, for example, 1 $\mu$m. After that, the metal film is etched into a predetermined pattern, so that the terminal 22*e* is formed in the contact hole 50. Simultaneously, the terminals 22*a*–22*d*, 22*f* are also formed.

Figure 38B:
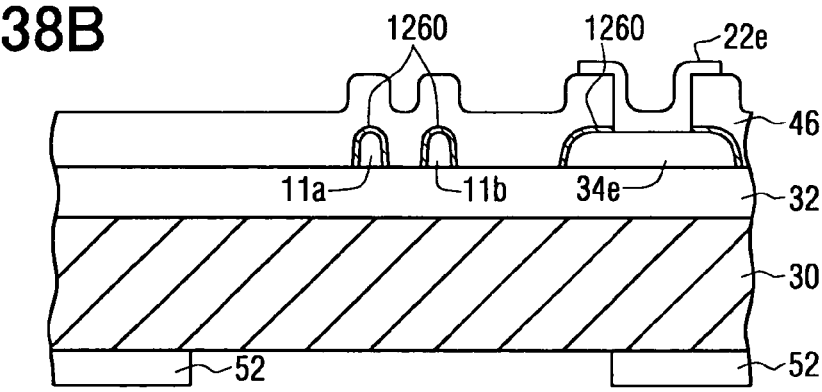

Next, as shown in FIG. 38B, the silicon nitride film 52 is formed on the backside of the substrate 30 with using the plasma CVD method. The thickness of the silicon nitride film 52 is, for example, 1 m. Then, the silicon nitride film 52 is etched into a predetermined pattern with using the RIE method, so that the opening of the silicon nitride film 52 is formed.

Figure 38C:
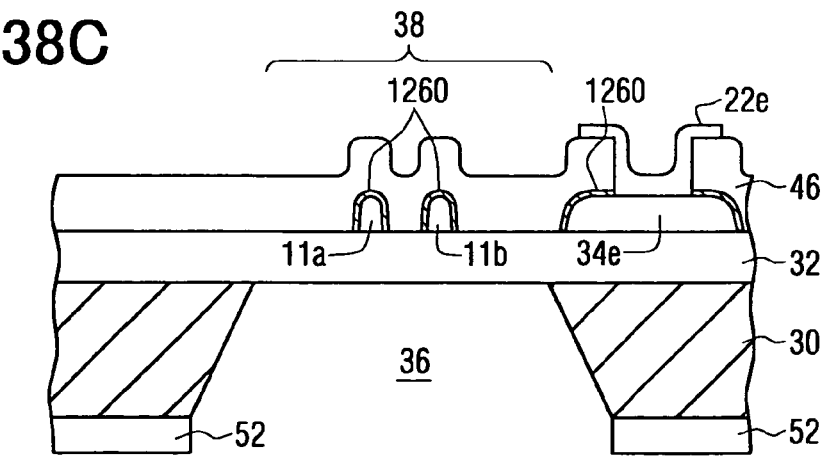

As shown in FIG. 38C, the semiconductor substrate 30 is etched with using the silicon nitride film 52 as a mask, so that the concavity 36 is formed in substrate 30. Thus, the thin film portion 38 is formed so as to build a bridge in the concavity 36 of the substrate 30. In this case, the etching is preferably performed as follows.

The etching is performed with wet etching method using alkali etchant such as potassium hydroxide (i.e., KOH) or tetra methyle ammonium hydroxide (i.e., TMAH). The backside of the substrate 30 is prepared to the single silicon {100} plane, which has six equivalent planes. However, the backside of the substrate 30 can be the single silicon {110} plane. The opening of the silicon nitride film 52 is formed to have a rectangular shape, and each side of the rectangular is parallel to the <110> direction of single crystal silicon.

In the above case, the substrate 30 is etched along with the {111} plane with using the above etchant. Thus, the thin film portion 38 can be formed to have a rectangular shape. Further, a pair of sides of the rectangular of the thin film portion 38 is formed to be perpendicular to the flow direction.

Although the thin film portion 38 is formed with the wet etching method, the thin film portion 38 can be formed with dry etching method. In this case, the backside of the substrate 30 is not required to have {100} plane.

Thus, the concavity and convexity of the surface of the silicon nitride film 46 is reduced so that the surface of the silicon nitride film 46 becomes flat. Accordingly, a concentration of a stress concentrated to a certain portion such as the concavity and convexity of the surface is reduced, even when the stress is applied to the silicon nitride film 46 such that the substrate 30 is diced (i.e., cut), the sensor 1200 is rinsed out (i.e., cleaned), and so on. Thus, the sensor 1200 has high pressure-resistance of the poly crystalline silicon film 1248*b*, so that the maximum detection value of flow of the fluid becomes large. Further, the sensor 1200 has long life endurance against a collision of a large dust hit on the silicon nitride film 46.

(Thirteenth Embodiment)

Figure 39:
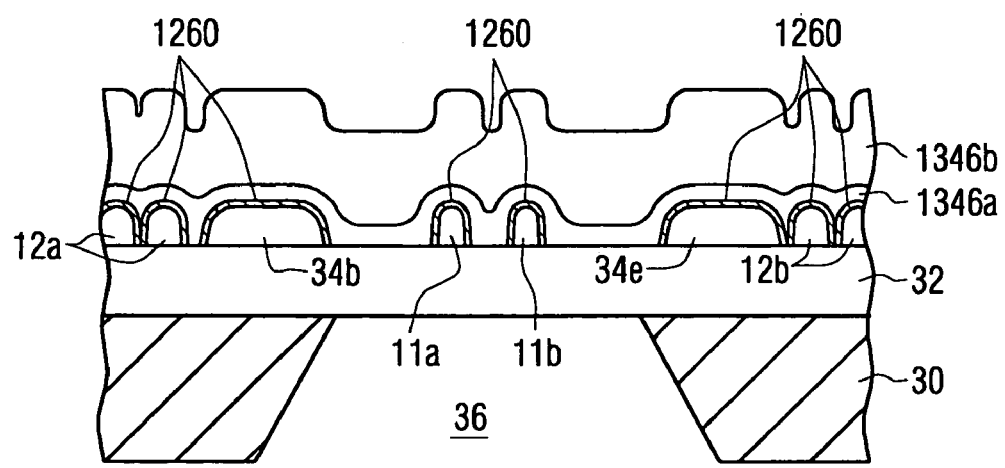
FIG. 39 is an enlarged cross-sectional view showing a flow sensor according to a thirteenth embodiment of the present invention.

A flow sensor 1300 according to a thirteenth embodiment of the present invention is shown in FIG. 39. In the sensor 1300, the upstream heater 11*a* and the downstream heater 11*b* are disposed mirror symmetrically, and have the same dimensions and the same shape.

As shown in FIG. 39, the insulation film 32 made of silicon oxide is formed on the silicon substrate 30. Here, the film 32 is made of silicon oxide film instead of silicon nitride film. The upstream and downstream heaters 11*a*, 11*b*, the upstream and downstream temperature detectors 12*a*, 12*b*, and the lead wires 34*a*, 34*e* are formed on the insulation film 32. They are made of single crystal silicon, and are covered with the first passivation film 1346*a* made of silicon oxide and the second passivation film 1346*b* made of silicon nitride. Further, each surface of the upstream and downstream heaters 11*a*, 11*b*, the upstream and downstream temperature detectors 12*a*, 12*b*, and the lead wires 34*a*, 34*e* is covered with the thermal oxidation film 1260. The thermal oxidation film 1260 is formed with the thermal oxidation method for oxidizing the surfaces of the upstream and downstream heaters 11*a*, 11*b*, the upstream and downstream temperature detectors 12*a*, 12*b*, and the lead wires 34*a*, 34*e*. Therefore, when a semiconductor film is patterned into the upstream and downstream heaters 11*a*, 11*b*, the upstream and downstream temperature detectors 12*a*, 12*b*, and the lead wires 34*a*, 34*e*, and then each corner of them 11*a*, 11*b*, 12*a*, 12*b*, 34*b*, 34*e* is sharpened, the thermal oxidation film 1260 rounds the sharpened corner. Accordingly, the thickness of the first and second passivation film 1346*a*, 1346*b* covering the corners of them 11*a*, 11*b*, 12*a*, 12*b*, 34*b*, 34*e* is limited from thinning. Although the first and second passivation film 1346*a*, 1346*b* are made of silicon oxide film and silicon nitride film, respectively, the first and second passivation film 1346*a*, 1346*b* can be made of other insulation film.

Next, the flow sensor 1300 is manufactured with the following method. As shown in FIGS. 40A to 41D, the SOI substrate is prepared at first. The insulation film 32 made of silicon oxide film is disposed on the substrate 30. Here, the thickness of the silicon oxide film 32 is, for example, 2.0 $\mu$m. The single crystal silicon film 48 is disposed on the silicon oxide film 32. The thickness of the single crystal silicon film 48 is, for example, 1.0 $\mu$m.

Figure 40A:
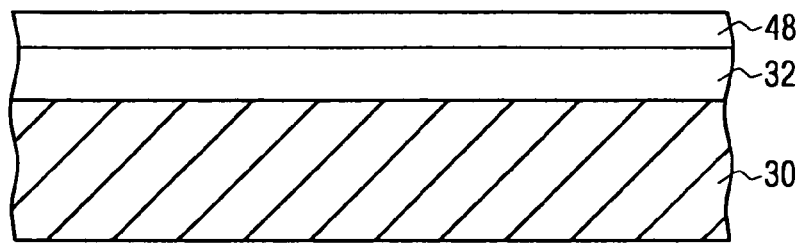
FIGS. 40A to 41D are cross-sectional views of the sensor explaining a manufacturing method for manufacturing the flow sensor according to the thirteenth embodiment.
Figure 40B:
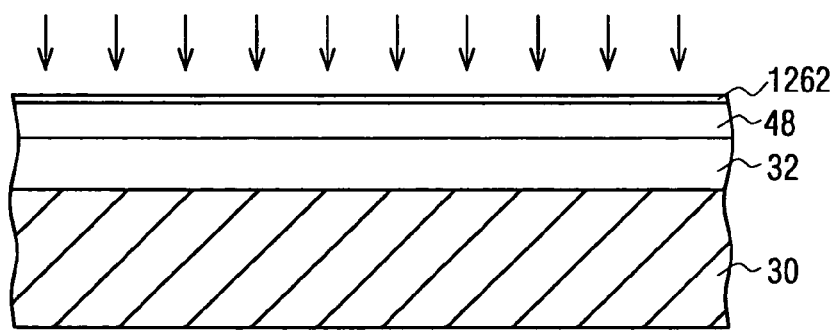

As shown in FIG. 40B, the single crystal silicon film 48 is thermally oxidized so that the transmission film 1262 is formed on the surface of the single crystal silicon film 48. Then, a predetermined amount of boron is doped into the single crystal silicon film 48 through the transmission film 1262.

Then, the substrate is annealed so that the doped boron is diffused and activated in the single crystal silicon film 48. The heat treatment is performed at a predetermined temperature (e.g., 1150° C.) during a predetermined time (e.g., 2 hours). Then, the transmission film 1262 is removed.

Figure 40C:
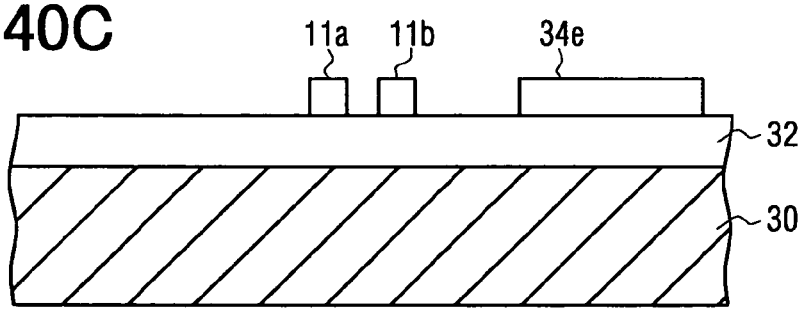

Next, as shown in FIG. 40C, the single crystal silicon film 48 is patterned into a predetermined pattern with the RIE method so that the upstream and downstream heaters 11*a*, 11*b*, the upstream and downstream temperature detectors 12*a*, 12*b* and the lead wires 34*a*–34*f* are formed. In this way, the upstream heater 11*a* and the upstream temperature detector 12*a* are manufactured in the same process, and the downstream heater 11*b* and the downstream temperature detector 12*b* are also manufactured in the same process, so that each temperature coefficient of resistance TCR of the upstream heater 11*a* and the upstream temperature detector 12*a* are equalized, and each temperature coefficient of resistance TCR of the downstream heater 11*b* and the downstream temperature detector 12*b* are also equalized easily.

Figure 40D:
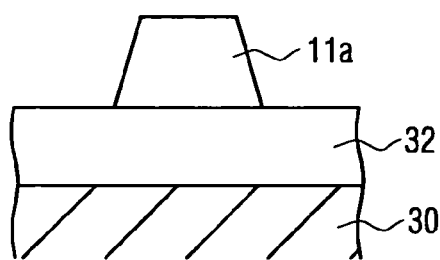

FIG. 40D is an enlarged cross-sectional view showing the upstream heater 11*a* made of single crystal silicon film. In the upstream heater 11*a*, there is a pair of corners disposed on both top ends of the upstream heater 11*a*. The corner is sharpened.

Figure 41A:
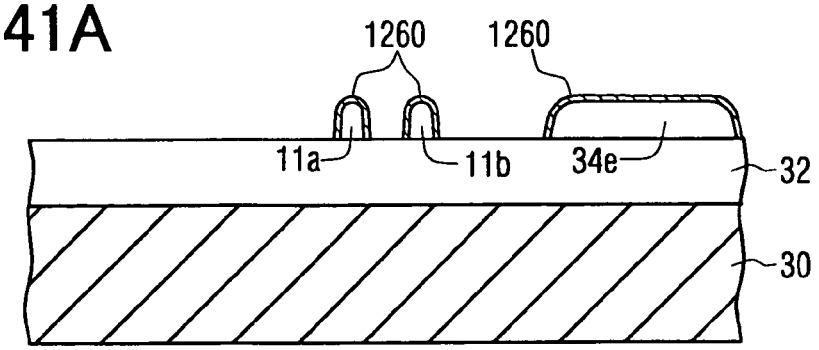
Figure 41B:
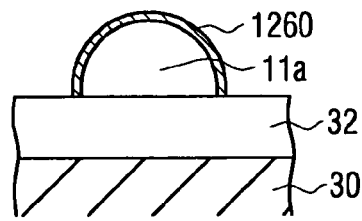

Next, as shown in FIG. 41A, each surface of the upstream and downstream heaters 11a, 11b, the upstream and downstream temperature detectors 12a, 12b and the lead wires 34b, 34e is thermally oxidized so that the thermal oxidation film 1260 is formed. The thickness of the thermal oxidation film 1260 is, for example, one-tenth of the thickness of the single crystal silicon film 48 (e.g., 0.1 m). Thus, the corners of the upstream heater 11a are rounded, as shown in FIG. 41B.

Figure 41C:
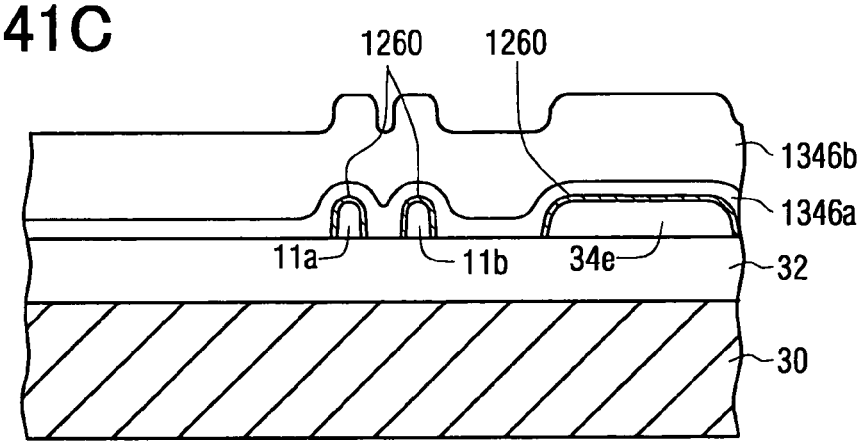

Next, as shown in FIG. 41C, the first passivation film 1346a made of silicon oxide film is formed on the substrate 30 with using the low pressure CVD. Here, the thickness of the silicon oxide film 1346a is, for example, 0.2 $\mu$m. Then, the first passivation film 1346a is annealed so that a stress in the silicon oxide film 1346a is reduced. The heat treatment is performed at a predetermined temperature (e.g., 1100° C.) during a predetermined time (e.g., 2 hours). Then, the second passivation film 1346b made of silicon nitride film is formed on the first passivation film 1346a with using the low pressure CVD. The thickness of the silicon nitride film 1346b is, for example, 3.0 $\mu$m.

Figure 41D:
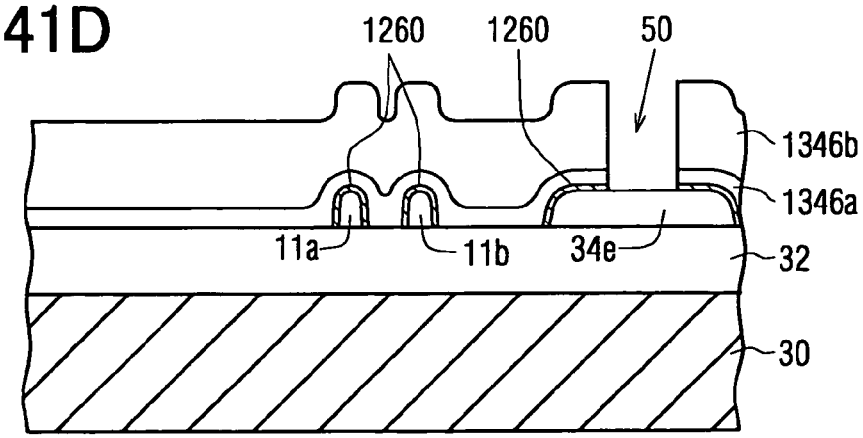

Next, as shown in FIG. 41D, part of the first and second passivation film 1346a, 1346b and the thermal oxidation film 1260 is etched with using the reactive ion etching method so that the contact hole 50 is formed, the part being disposed on the lead wire 34e. Then, the terminal 22e is formed in the contact hole 50. Simultaneously, the terminals 22a–22d, 22f are also formed. Next, the concavity 36 is formed in the substrate 30, so that the thin film portion 38 is formed.

(Fourteenth Embodiment)

A flow sensor 1400 according to a fourteenth embodiment of the present invention is manufactured with the following method. As shown in FIGS. 42A to 42D, the SOI substrate is prepared at first. The insulation film 32 made of silicon oxide film is disposed on the substrate 30. The single crystal silicon film 48 is disposed on the silicon oxide film 32.

Figure 42A:
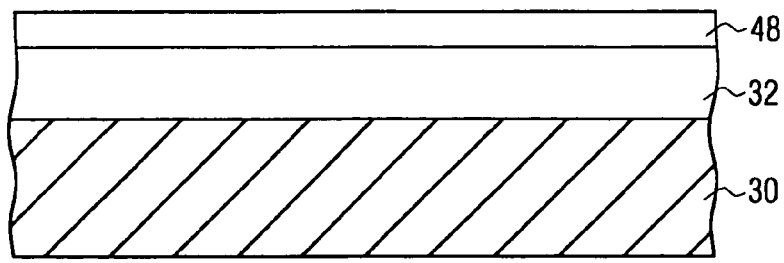
FIGS. 42A to 42D are cross-sectional views of a flow sensor explaining a manufacturing method for manufacturing the flow sensor according to a fourteenth embodiment of the present invention.
Figure 42B:
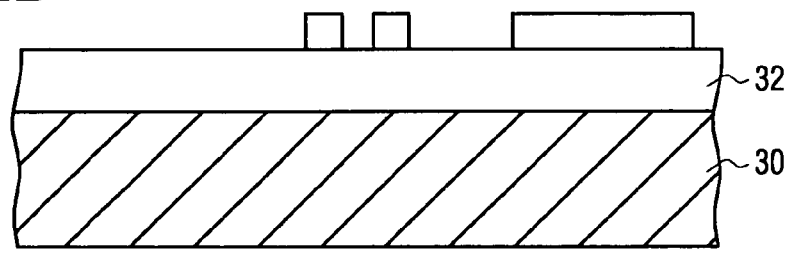
Figure 42C:
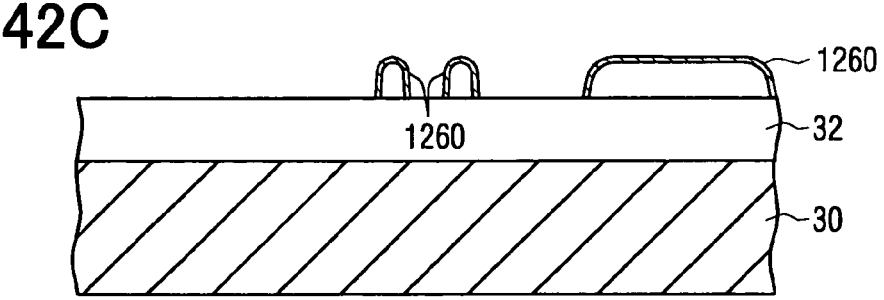
Figure 42D:
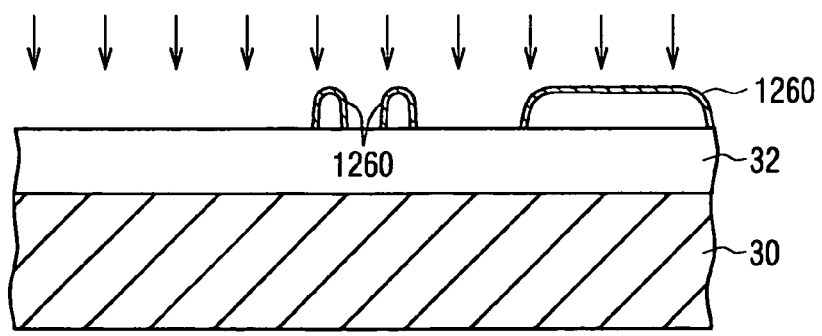

As shown in FIG. 42B, the single crystal silicon film 48 is patterned into a predetermined pattern so that the upstream and downstream heaters 11a, 11b, the upstream and downstream temperature detectors 12a, 12b and the lead wires 34a–34f are formed. As shown in FIG. 42C, the single crystal silicon film 48 is thermally oxidized so that the thermal oxidation film 1260 is formed on the surface of the single crystal silicon film 48. Thus, the corners of the upstream heater 11a are rounded. Then, a predetermined amount of boron is doped into the single crystal silicon film 48 through the thermal oxidation film 1260 as a transmission film. Then, the substrate is annealed so that the doped boron is diffused and activated in the single crystal silicon film 48.

Next, the first and second passivation films 1346a, 1346b are formed on the substrate 30 with using the low pressure CVD. Then, part of the first and second passivation film 1346a, 1346b and the thermal oxidation film 1260 is etched with using reactive ion etching method so that the contact hole 50 is formed, the part being disposed on the lead wire 34e. Then, the terminal 22e is formed in the contact hole 50. Simultaneously, the terminals 22a–22d, 22f are also formed. Next, the concavity 36 is formed in the substrate 30, so that the thin film portion 38 is formed.

In this embodiment, since the impurity is doped after the heat treatment is performed, a process for forming the transmission film 1262 can be omitted. Thus, the manufacturing cost of the sensor 1400 is reduced.

(Fifteenth Embodiment)

To optimize a thickness of a passivation film in a flow sensor, and to improve strength of a thin film portion of the sensor, the inventors have examined as follows.

The thickness of the thin film portion is thinner than other portions of the flow sensor. Therefore, heat capacitance of the thin film portion becomes small, so that the thin film portion is thermally isolated from the other portions of the flow sensor. Therefore, response of the sensor in proportion to the flow of fluid is improved. However, it is required that the thin film portion has high endurance. For example, when the sensor is mounted in an air suction passage of a combustion engine in a vehicle, the thin film portion of the sensor is required to endure high pressure generated by a pulsation of the introduced air or an engine backfire. Further, a fine particle such as sand passes through the air suction passage. This particle has the maximum dimensions of several hundreds micrometers, and flows at speed of several tens meter per second. Therefore, a collision of the particle hit on the thin film portion may be large, so that the thin film portion is required to have a sufficient strength against the collision.

If the thickness of the thin film portion becomes large so as to reinforce the strength of the thin film portion, thermal isolation between the thin film portion and other parts is reduced. Further, thermal capacitance of the thin film portion becomes large. Therefore, the electric power consumption increases, the sensor sensitivity is reduced, and response of the sensor also decreases.

Figure 43:
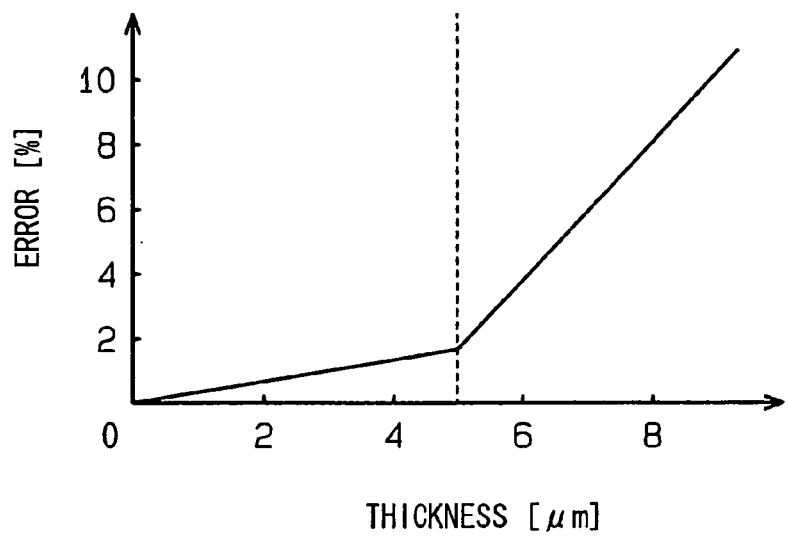
FIG. 43 is a graph showing a relationship between a thickness of a thin film portion and a detection error of a comparison flow sensor, according to a fifteenth embodiment of the present invention.

FIG. 43 shows a relationship between the thickness of the thin film portion and a detection error of the sensor. When the thickness of the thin film portion becomes larger than 5 $\mu$m, the detection error of the sensor becomes large. That is because the response of the sensor in relation to the pulsation of the pressure is reduced.

On the other hand, when the thickness of the thin film portion becomes thinner so as to increase the response of the sensor, the particle may damage the thin film portion. The damage mechanism of the particle is considered as follows.

Figure 44A:
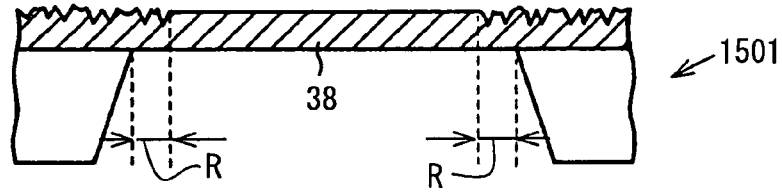
FIGS. 44A to 44C are cross-sectional views of the comparison flow sensor explaining damage mechanism caused by a particle P, according to the fifteenth embodiment.
Figure 44B:
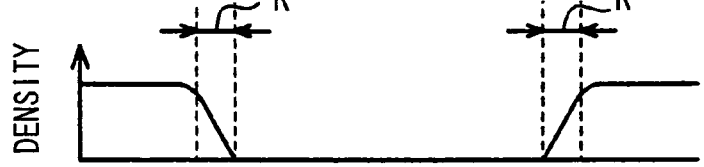
Figure 44C:
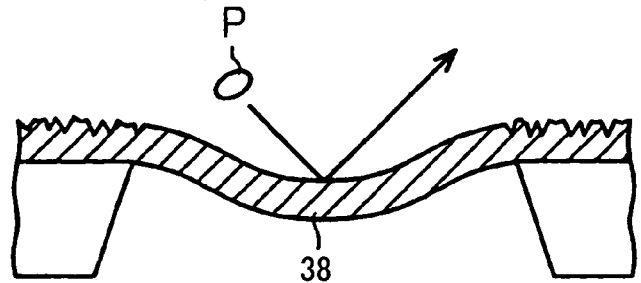

FIGS. 44A to 44C explains the damage mechanism caused by the particle P. A flow sensor 1501 as an example has the thin film portion 38. As shown in FIG. 44A, a plurality of cracks or damages is disposed around a periphery of the thin film portion 38 and outside of the thin film portion 38. Specifically, the cracks are disposed in an inside region R of the periphery of the thin film portion 38 within several ten micrometers. On the other hand, there is no crack or damage in a center portion of the thin film portion 38 substantially, as shown in FIG. 44B. That is because the thin film portion 38 is deformed so that the damage, i.e., the collision energy of the particle P is absorbed even when the particle P hits on the center of the thin film portion.

Thus, the damages, i.e., the cracks disposed around the periphery arise from the particle P, the strength of the thin film portion 38 decreases. In this case, when the excess pressure of the fluid is applied to the thin film portion 38 or a large particle hits on the thin film portion 38, the thin film portion 38 is deformed, so that the stress is concentrated into the periphery of the thin film portion 38, which has weak strength. Then, the thin film portion 38 may be broken.

The decrease of the strength of the thin film portion 38 is mainly caused by the cracks disposed on the periphery of the thin film portion 38. Therefore, it is required that the top surface of the thin film portion 38 is hardened. Here, the particle P passing through the air suction passage includes mainly a sand particle made of silicon oxide. Therefore, the top surface of the thin film portion 38 is required to be hardened harder than the silicon oxide. In view of this point, for example, a silicon nitride film (i.e., $Si_3N_4$) is harder than the silicon oxide film. Further, the silicon nitride film is appropriate for the thin film portion 38 in other physical properties.

When the thin film portion 38 is formed with using the low-pressure CVD (i.e., LP-CVD) method utilizing thermal reaction, the silicon nitride film has almost the same physical properties as that of bulk silicon nitride material. For example, the breaking stress, the Young's modulus and the hardness of the silicon nitride film formed with suing the LP-CVD method are 520 Gpa, 14 Gpa, and 1720 Vh, respectively. However, the stress applied to the thin film portion 38 in case of forming the silicon nitride film with using the LP-CVD method is about 1200 Pa. Therefore, when the thickness of the silicon nitride film becomes larger than 0.3 µm, the silicon nitride film is self-destructed.

In view of the above difficulty, the inventors have examined as follows.

Figure 45:
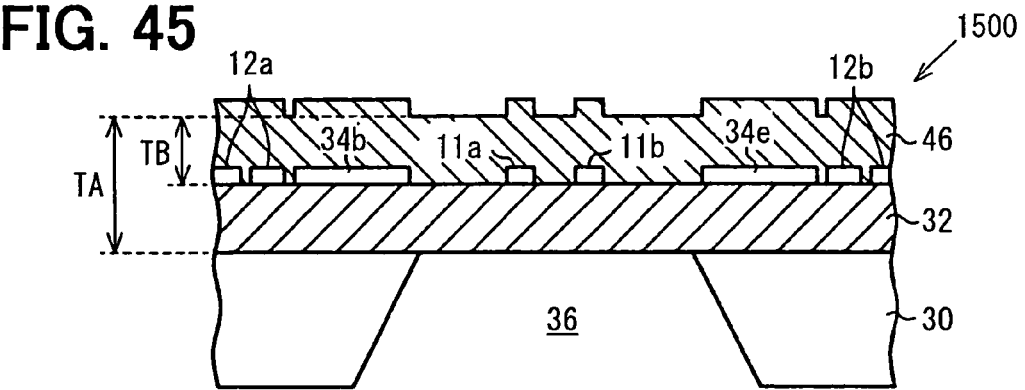
FIG. 45 is an enlarged cross-sectional view showing a flow sensor according to the fifteenth embodiment.

A flow sensor 1500 according to a fifteenth embodiment of the present invention is shown in FIG. 45. In the sensor 1500, the upstream and downstream heaters 11a, 11b, the upstream and downstream temperature detectors 12a, 12b, and the lead wires 34a, 34e are formed on the insulation film 32. They are made of poly crystalline silicon, and are covered with the silicon nitride film 46. The film 32 is made of silicon nitride film instead of silicon oxide film. The insulation film 32 made of silicon nitride and the silicon nitride film 46 are formed with using low-pressure chemical vapor deposition with using thermal reaction (i.e., thermal CVD) method. The insulation film 32 and the silicon nitride film 46 have a certain composition shifted from the stoichiometric composition. Specifically, silicon ratio in each of the insulation film 32 and the silicon nitride film 46 becomes larger than the silicon ratio of the stoichiometric composition, so that they are made of silicon rich silicon nitride film. In this case, the stress applied to the insulation film 32 and the silicon nitride film 46 is reduced when they are formed with using the thermal CVD method. Accordingly, the thickness of each of them can be enlarged compared with the silicon nitride film having the stoichiometric composition.

Figure 46:
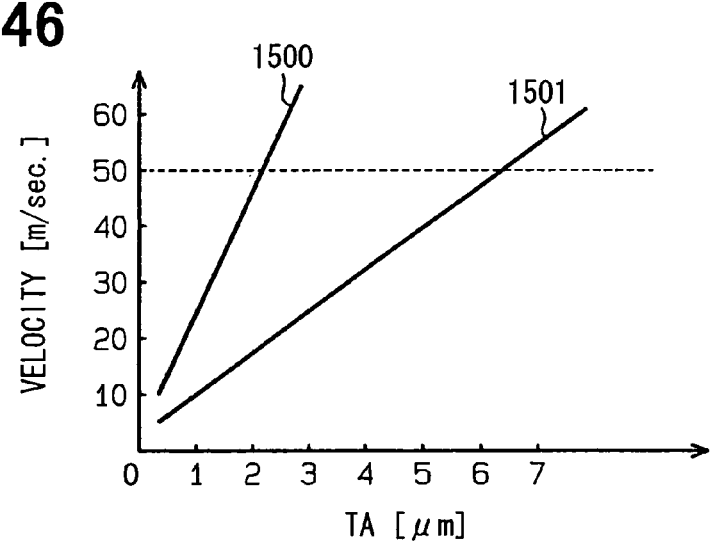
FIG. 46 is a graph showing a relationship between a thickness TA of the thin film portion and the maximum flow velocity, according to the fifteenth embodiment.

FIG. 46 shows a relationship between the thickness TA of the thin film portion 38 and the maximum flow velocity, which the sensor 1500 can detect the flow without being broken. Here, the maximum flow velocity of the fluid, i.e., sacked air in an air suction passage of an inside combustion engine of a vehicle, where the sensor is disposed, is about 50 m/sec in general. Therefore, the thickness TB of the thin film portion 38 is set such that the sensor 1500 works sufficiently even in a case where the flow velocity is 50 m/sec. Thus, the sensor 1500 having the thickness TB being equal to or larger than 2 µm can detect the flow of fluid, the flow velocity of which is 50 m/sec, so that the sensor 1500 has high endurance. Here, in the sensor 1501 as a comparison with the silicon nitride film 46 made of the stoichiometric composition, the thickness TB of the thin film portion 38 is required to be equal to or larger than 6 µm so that the sensor 1501 can detect the flow, of which the velocity is 50 m/sec.

Next, a relationship between the damage and the rate of resistance change ΔR in the sensor 1500 arising from the damage is described as follows. The rate of resistance change ΔR of the upstream and downstream heaters 11a, 11b, and the upstream and downstream temperature detectors 12a, 12b is caused by the damage of the particle. It is considered that the rate of resistance change AR arises from the flowing two reasons.

One reason is that the particle hits on the thin film portion 38 so that the surface of the thin film portion 38 is scratched and the heaters 11a, 11b or the detectors 12a, 12b are damaged. The other reason is that the silicon nitride film 46 as the second passivation film on the silicon oxide film as the first passivation film for covering the heaters 11a, 11b and the detectors 12a, 12b is scratched so that sodium, potassium and the like contained in the fluid inserts' into the crack of the silicon nitride film 46. Then, the sodium or potassium ions are diffused in the silicon oxide film so that they adhere to the surface of the heaters 11a, 11b or the detectors 12a, 12b. Then, the resistance of the heaters 11a, 11b and the detectors 12a, 12b changes.

Specifically, part of the surface of the thin film portion 38, which is disposed on the heaters 11a, 11b and the detectors 12a, 12b, has a convexity. That is because the surface of the thin film portion 38 is not flattened after the silicon nitride film 46 is formed on the substrate 30. Therefore, the surface of the thin film portion 38 may be cracked or damaged easily.

Figure 47:
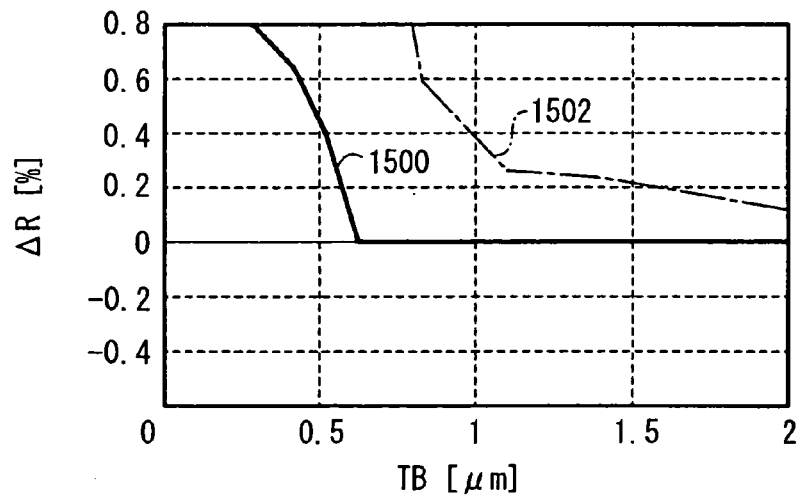
FIG. 47 is a graph showing a relationship between a thickness TB of a passivation film and a rate of resistance change ΔR, according to the fifteenth embodiment.

FIG. 47 shows a relationship between the thickness TB of the passivation film, i.e., the silicon nitride film 46 and the rate of resistance change ΔR of the heaters 11a, 11b and the detectors 12a, 12b. Here, the sensor 1500 is operated in the air suction passage during a predetermined time. Then, the resistance of the heaters 11a, 11b and the detectors 12a, 12b is measured so that the rate of resistance change ΔR between the resistances before and after the operation is obtained.

As shown in FIG. 47, when the thickness TB of the silicon nitride film 46 is equal to or larger than 0.6 µm, the rate of resistance change AR becomes almost zero percent. In this case, even if the particle hits on the surface of the thin film portion 38, the damage does not penetrate the silicon nitride film 46, so that the resistance of the heaters 11a, 11b and the detectors 12a, 12b does not change. Further, the sodium or potassium ions is not diffused deeply into the silicon nitride film 46 so that the sodium or potassium ions do not adhere to the surface of the heaters 11a, 11b and the detectors 12a, 12b.

Here, a flow sensor 1502 as a comparison having the silicon nitride film as the second passivation film 1346b on the silicon oxide film as the first passivation film 1346a as a comparison is examined. In this case, the thickness TB of the passivation film is a total thickness of the silicon nitride film and the silicon oxide film, i.e., the passivation film. The silicon nitride film as the second passivation film 1346b is set to be 0.12 µm. In the sensor 1502 having different thickness of the silicon oxide film as the first passivation film 1346a and having the silicon nitride film of 0.12 µm, the rate of resistance change AR of the heaters 11a, 11b and the detectors 12a, 12b before and after the operation is measured. The chain line in FIG. 47 shows a relationship between the thickness TB of the passivation film and the rate of resistance change ΔR of the heaters 11a, 11b and the detectors 12a, 12b in the sensor 1502. As shown in FIG. 47, when the total thickness of the silicon nitride film and the silicon oxide film is equal to or larger than 1.0 m, the rate of resistance change is much reduced. Therefore, the heaters 11a, 11b or the detectors 12a, 12b may not be damaged. However, the rate of resistance change does not become zero percent. That is because the sodium or potassium ions are diffused in the silicon oxide film so that they adhere to the surface of the heaters 11a, 11b or the detectors 12a, 12b. Therefore, the resistance of the heaters 11a, 11b and the detectors 12a, 12b changes slightly.

Thus, in the sensor 1500, the thickness TB of the silicon nitride film 46 as the passivation film is set to be equal to or larger than 0.6 µm, and the thickness TA of the thin film portion is set to be in a range between 2.0 µm and 5.0 µm. However, in some cases, the sensor 1500 is not required to have the strong thin film portion, so that the thickness of the thin film portion 38 can be smaller than 2.0 m. Further, in some cases, the sensor 1500 is not required to have the high detection accuracy so that the thickness of the thin film portion can be larger than 5.0 µm. Furthermore, in some cases, the sensor 1500 is not required to have the endurance of the thin film portion 38, so that the thickness of the silicon nitride film 46 can be smaller than 0.6 µm. In those cases, the silicon nitride film 46 having the thickness being equal to or larger than 0.3 µm and having the silicon rich composition formed with the thermal CVD method provides the endurance or the strength of the thin film portion 38.

Next, a deposition condition for forming the silicon nitride film 46 and the insulation film 32 made of silicon nitride film is described as follows. The silicon nitride film having non-stoichiometric composition, i.e., silicon rich non-stoichiometric composition is formed with using the thermal CVD method. In this case, the deposition temperature is set to be higher than that of an ordinary condition for forming the silicon nitride film having the stoichiometric composition. Further, the ratio of $SiH_2Cl_2$ gas to $NH_3$ gas becomes larger. The silicon nitride film formed with this condition has the maximum thickness without being self-destructed by the stress applied to the thin film portion 38 in case of forming the silicon nitride film with using the LP-CVD method.

Figures 48A, 48B, 48C:
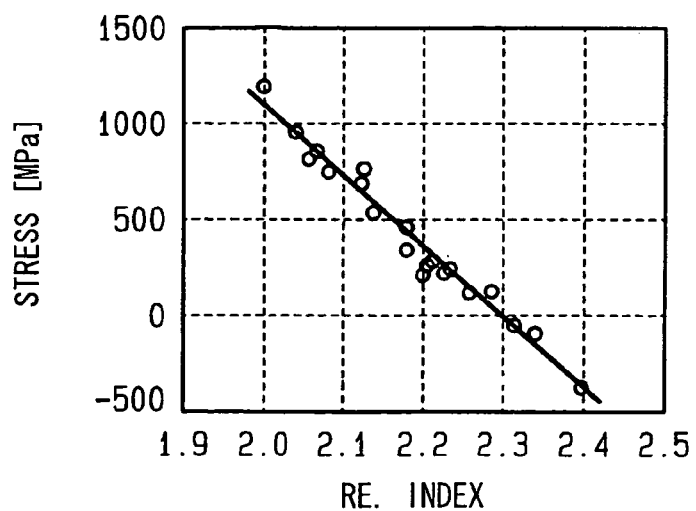
FIG. 48A is a table explaining a deposition condition for forming a silicon nitride film having thickness of 0.6 μm.
FIG. 48B is a table showing a refractive index of the silicon nitride film in accordance with a deposition condition.
FIG. 48C is a graph showing a relationship between the refractive index of the silicon nitride film and a stress in the silicon nitride film, according to the fifteenth embodiment.

FIG. 48A shows a deposition condition for forming the silicon nitride film having thickness of 0.6 µm. Specifically, FIG. 48A shows a relationship between the deposition temperature and the ratio of $SiH_2Cl_2$ gas to $NH_3$ gas (i.e., $SiH_2Cl_2/NH_3$). In FIG. 48A, a circle ○ represents that the silicon nitride film is successfully formed. A cross × represents that the silicon nitride film has a crack, and a double cross ×× represents that the silicon nitride film buckles by the compression stress.

As shown in FIG. 48A, the ratio of $SiH_2Cl_2/NH_3$ is set to be in a range between 4 and 8 in a case where the deposition temperature is at 750° C. In a case where the deposition temperature is at 850° C., the ratio of $SiH_2Cl_2/NH_3$ is set to be in a range between 1 and 4. In a case where the deposition temperature is in a range between 750° C. and 850° C., the ratio of $SiH_2Cl_2/NH_3$ is set to be a value that is interpolated such that the ratio of $SiH_2Cl_2/NH_3$ is set to be in a range between 2 and 6 in a case where the deposition temperature is at 800° C. This deposition condition is that the thickness of the silicon nitride film becomes equal to or larger than 0.6 µm. Therefore, it is preferred that the deposition condition changes in accordance with the thickness of the silicon nitride film. For example, when the thickness of the silicon nitride film is set to be 2.0 µm, the ratio of $SiH_2Cl_2/NH_3$ at a certain temperature is set to be narrower than the above condition.

FIG. 48B shows a relationship between the ratio of $SiH_2Cl_2/NH_3$ and the deposition temperature in accordance with the refractive index of the silicon nitride film. Here, the silicon nitride film having the stoichiometric composition has the refractive index of about 2.0. As the refractive index becomes larger, the ratio of silicon composition in the silicon nitride film increases. Further, FIG. 48C shows a relationship between the stress in the silicon nitride film in case of forming the silicon nitride film and the refractive index of the silicon nitride film. Here, the stress in the silicon nitride film is a total stress of the internal stress and the thermal stress. The internal stress arises in the silicon nitride film itself when the silicon nitride film is deposited, and the thermal stress arises from the difference of the coefficient of thermal expansion between the silicon nitride film and its substrate disposed under the silicon nitride film.

As shown in FIG. 48C, the stress in the silicon nitride film becomes small, as the refractive index of the silicon nitride film becomes larger. Here, the silicon nitride film is required to have the thickness being equal to or larger than 0.6 µm, so that the stress in the silicon nitride film in case of forming is equal to or smaller than 800 MPa. In this case, the silicon nitride film has the refractive index being equal to or larger than 2.1. Further, when the stress becomes lower than zero, i.e., the stress becomes the compression stress, the silicon nitride film may buckle. Therefore, it is preferred that the refractive index of the silicon nitride film is equal to or smaller than 2.3. Thus, it is preferred that the silicon nitride film has the refractive index in a range between 2.1 and 2.3.

Next, the reason why the passivation film of the sensor 1500 is formed of silicon nitride is described as follows.

Figure 49:
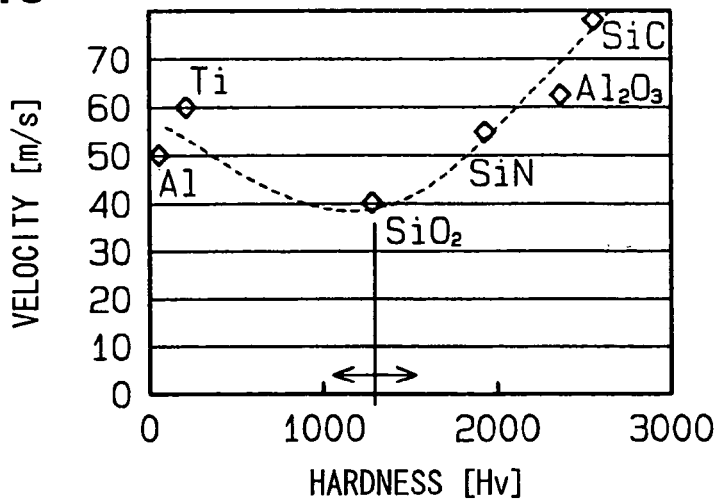
FIG. 49 is a graph showing a relationship between a Vickers hardness of various materials and the maximum flow velocity, according to the fifteenth embodiment.

FIG. 49 shows a relationship between Vickers hardness of various materials and the maximum flow velocity. Here, the various materials are aluminum (i.e., Al), titanium (i.e., Ti), silicon dioxide (i.e., $SiO_2$), silicon nitride (i.e., SiN), titanium nitride (i.e., TiN), aluminum oxide (i.e., $Al_2O_3$), and silicon carbide (i.e., SiC). The film made of each material is formed on a laminated film, which has a lamination structure of silicon nitride film and silicon oxide film alternately deposited several times and has the thickness of 3.0 µm. The film of each material has the thickness of 0.5 µm, and is formed with using the CVD method or an evaporation method. A large particle, dimensions of which are several hundred microns, is bombarded on the film of each material, so that the maximum flow velocity of the particle is obtained. The maximum flow velocity is defined such that the film of each material is not broken by the particle. The hardness of each material is normalized by the Vickers hardness.

As shown in FIG. 49, in a case where the film of a certain material that has large hardness larger than that of silicon oxide is formed on the top surface, the resistance or the strength against the particle is much improved. Although the strength of the film is improved in a case where the film of a certain material that has small hardness smaller than that of silicon oxide is formed on the top surface, the particle hits on the surface of the film so that the surface is scratched and has the damage. Therefore, the thermal capacitance and the like of the thin film portion 38 changes, so that the detection accuracy of the sensor 1500 is reduced. Although the film made of $Al_2O_3$ or SiC is much stronger than that of silicon nitride, the film made of $Al_2O_3$ or SiC cannot be manufactured in a semiconductor process.

Thus, it is preferred that the passivation film is formed of silicon nitride film.

The sensor 1500 includes the silicon nitride film 46 having an appropriate thickness and characteristics, the stress in the silicon nitride film 46 in the manufacturing process is reduced. Further, the sensor 1500 has high detection accuracy and high endurance against the particle hit on the thin film portion 38. Furthermore, the sensor 1500 with the silicon nitride film 46 having appropriate thickness so as to improve the strength of the thin film portion 38.

Although the backside of the flow sensor 1500 is covered with the housing 42, the backside of the flow sensor 1500 can be exposed in the air suction passage. In this case, the housing 42 includes a through hole for exposing the backside of the thin film portion 38. Further, it is preferred that the first insulation film 32 is made of silicon nitride film.

That is because the sodium or potassium ions diffuses in the silicon oxide film so that the thin film portion may be damaged in a case where the first insulation film is made of silicon oxide film. Although the backside of the thin film portion 38 is exposed, since the backside of the thin film portion 38 has the concavity 36 so that the backside of the thin film portion 38 is not exposed directly in the flow of fluid. Thus, the requirement of the surface of the backside of the thin film portion 38 is not so high compared with the foreside of the thin film portion 38.

(Sixteenth Embodiment)

Figure 50:
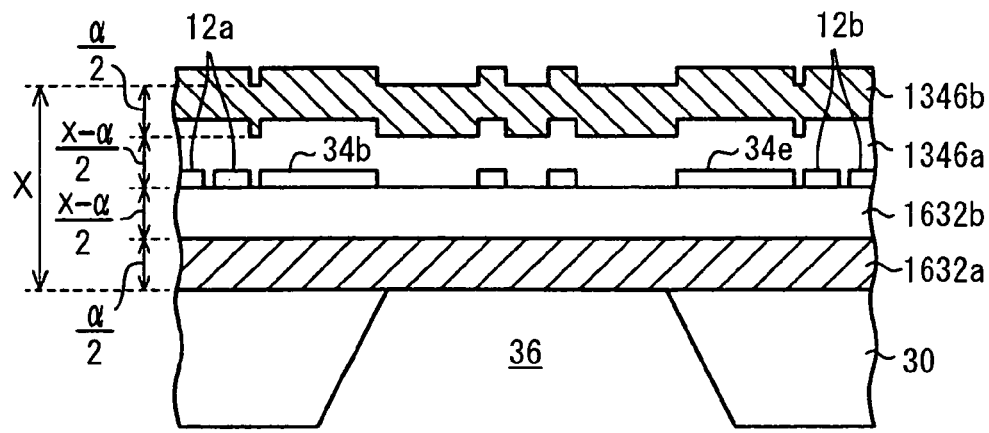
FIG. 50 is an enlarged cross-sectional view showing a flow sensor according to a sixteenth embodiment of the present invention.

A flow sensor 1600 according to a sixteenth embodiment of the present invention is shown in FIG. 50. The sensor 1600 includes the first and second insulation films 1632a, 1632b and the first and second passivation films 1346a, 1346b. Specifically, the second insulation film 1632b made of silicon oxide film is formed on the first insulation film 1632a made of silicon nitride film. The upstream and downstream heaters 11a, 11b, the upstream and downstream temperature detectors 12a, 12b and the lead wires 34b, 34e made of poly crystalline silicon are formed on the second insulation film 1632b. The upstream and downstream heaters 11a, 11b, the upstream and downstream temperature detectors 12a, 12b and the lead wires 34b, 34e made of poly crystalline silicon are covered with the first passivation film 1346a made of silicon oxide film and the second passivation film 1346b made of silicon nitride film. Here, the first and second insulation films 1632a, 1632b and the first and second passivation films 1346a, 1346b are formed on whole the surface of the substrate including the thin film portion 38.

The first insulation film 1632a and the second passivation film 1346b are formed of silicon nitride film having silicon rich composition with using the thermal CVD method. As shown in FIG. 50, the thickness of the first insulation film 1632a is equal to that of the second passivation film 1346b, that is defined as $\alpha/2$. The thickness of the second insulation film 1632b is equal to that of the first passivation film 1346a, that is defined as $(X-\alpha)/2$.

Figure 51:
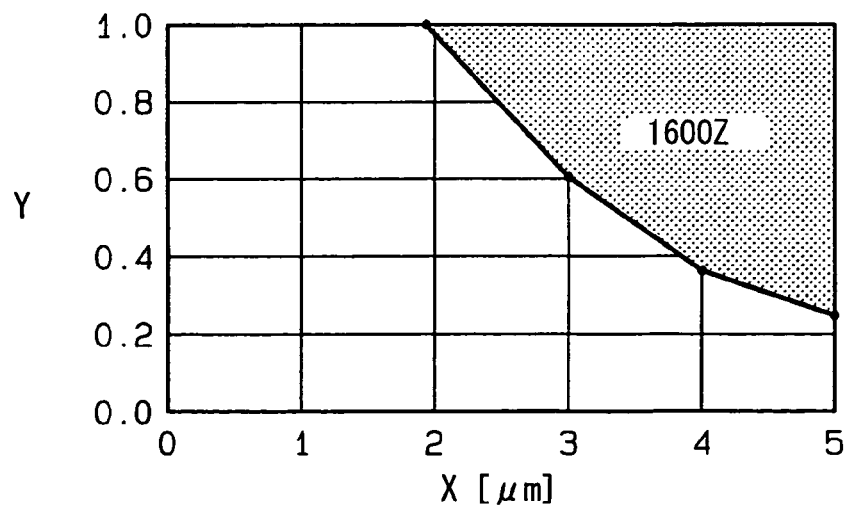
FIG. 51 is a graph explaining a region 1600Z in relation to a total thickness X of a thin film portion and a ratio Y, according to the sixteenth embodiment.

FIG. 51 shows a relationship between a total thickness X of the thin film portion 38 and the ratio Y of the thickness a of the silicon nitride films composing the first insulation film 1632a and the second passivation film 1346b to the total thickness X (i.e., $Y=\alpha/X$) in relation to a region 1600Z, in which the thin film portion 38 of the sensor 1600 is not broken. Here, the ratio Y is equal to or smaller than 1.0.

As shown in FIG. 51, a condition of the sensor 1600 not to be broken is described as:

$$Y-2.7\exp\{-0.5X\}>0 \quad (F4)$$

FIG. 51 shows the region 1600Z, in which the total thickness X is equal to or smaller than 5.0 μm. That is because the detection accuracy of the sensor 1600 is reduced in a case where the total thickness X of the thin film portion 38 is larger than 5.0 μm. In the region 1600Z where the total thickness X of the thin film portion 38 is equal to or smaller than 5.0 μm, the second passivation film 1346b is set to be equal to or larger than 0.6 μm so that the thin film portion is not broken. Accordingly, the first and second insulation films 1632a, 1632b and the first and second passivation films 1346a, 1346b are set to satisfy the formula F4. Further, the total thickness X is equal to or smaller than 5.0 μm.

Next, the flow sensor 1600 is manufactured with the following method. As shown in FIGS. 52A to 52D, the silicon substrate 30 is prepared. Then, the first insulation film 1632a is formed on the silicon substrate 30 with using the thermal CVD method. The first insulation film 1632a is made of silicon nitride film and has the thickness of, for example, 1.0 μm. Next, the second insulation film 1632b is formed on the first insulation film 1632a with using the plasma CVD method. The second insulation film 1632b is made of silicon oxide film and has the thickness of, for example, 1.5 μm. After that, the substrate 30 is annealed at a predetermined temperature (e.g., 1100° C.) during a predetermined time (e.g., 2 hours) so that the stress in the second insulation film 1632b, i.e., the silicon oxide film is released.

Figure 52A:
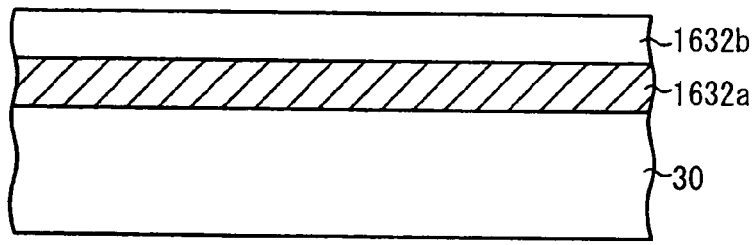
FIGS. 52A to 52D are cross-sectional views of a flow sensor explaining a manufacturing method for manufacturing the flow sensor according to the sixteenth embodiment.
Figure 52B:
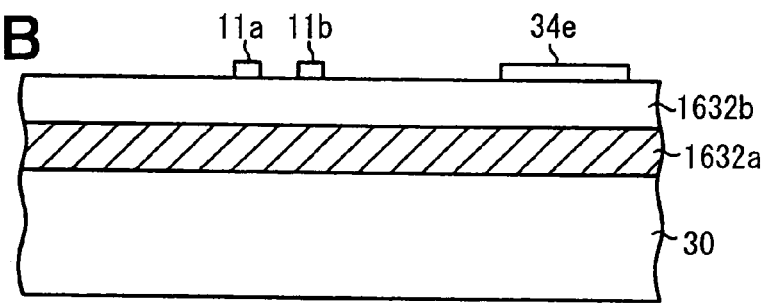
Figure 52C:
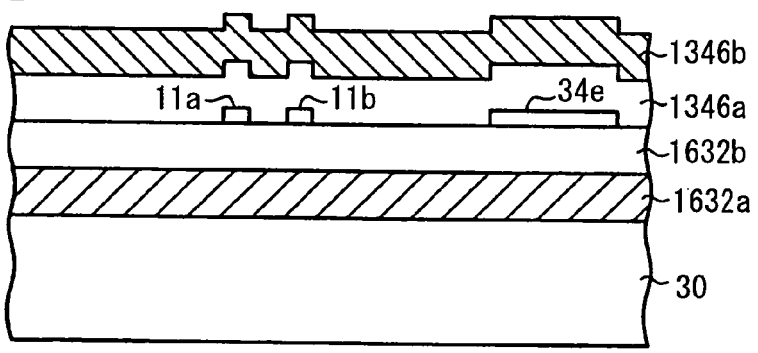
Figure 52D:
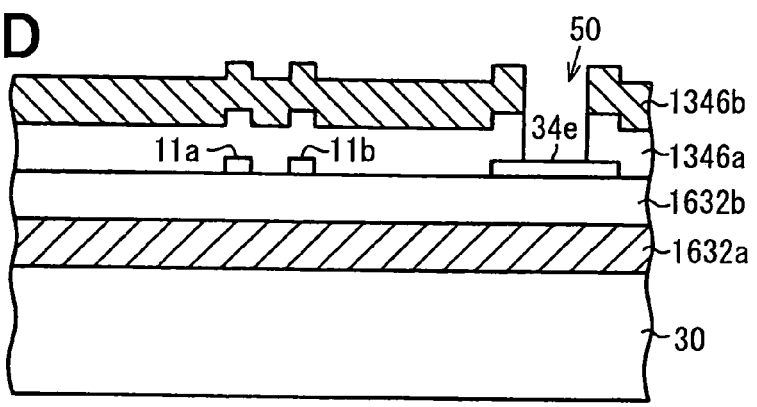

Then, the upstream and downstream heaters 11a, 11b, the upstream and downstream temperature detectors 12a, 12b and the lead wires 34a–34f are formed on the second insulation film 1632b. As shown in FIG. 52C, the first passivation film 1346a made of silicon oxide film is formed on the second insulation film 1632b. The thickness of the first passivation film 1346a is equal to that of the second insulation film 1632b. Then, the second passivation film 1346b made of silicon nitride film is formed on the first passivation film 1346a. The thickness of the second passivation film 1346b is equal to that of the first insulation film 1632a.

Then, the contact hole 50 is formed in the first and second passivation films 1346a, 1346b with using the reactive ion etching method so that the terminal 34e is formed in the contact hole 50. Then, the concavity 36 is formed so that the thin film portion 38 is formed. Thus, the sensor 1600 is completed.

The sensor 1600 includes the first and second passivation film 1346a, 1346b having an appropriate thickness and characteristics, the stress in the first and second passivation film 1346a, 1346b in the manufacturing process is reduced. Further, the sensor 1600 has high detection accuracy and high endurance against the particle hit on the thin film portion 38. Furthermore, the sensor 1600 with the first and second passivation film 1346a, 1346b having appropriate thickness so as to improve the strength of the thin film portion 38.

Although the thickness of the first insulation film 1632a is set to be equal to that of the second passivation film 1346b, and the thickness of the second insulation film 1632b is set to be equal to that of the first passivation film 1346b, the sensor 1600 can have other construction. For example, the thickness of the second passivation film 1346b can be set to be equal to or larger than 0.6 μm, and the insulation films 1632a, 1632b and the passivation films 1346a, 1346b can be set to satisfy the formula F4. Further, the thickness of each of the first passivation film 1346a and the insulation films 1632a, 1632b can be set to have a certain value so that the resistance change or the breakage of the thin film portion 38 is suppressed. In this case, in a case where the total thickness TA of the thin film portion 38 is equal to or larger than 5.0 μm, the detection accuracy of the sensor 1600 is improved.

In the above case, it is not necessary to set the thickness of the second passivation film 1346b to be equal to or larger than 0.6 μm. For example, in a case where the flow sensor 1600 is covered with the housing 42, the backside of the flow sensor 1600 is not required to have a large hardness compared with the foreside of the sensor 1600, on which the second passivation film 1346b is disposed. Therefore, the thickness of the first insulation film 1632a can be reduced smaller than 0.6 μm. However, the first insulation film 1632a made of silicon nitride film can protect the thin film portion 38 from the sodium or potassium ion diffusion. Further, when the substrate 30 is etched with the wet etching method, the first insulation film 1632a made of silicon nitride film can protect the thin film portion 38 so as to secure the selected ratio.

(Seventeenth Embodiment)

Figure 53:
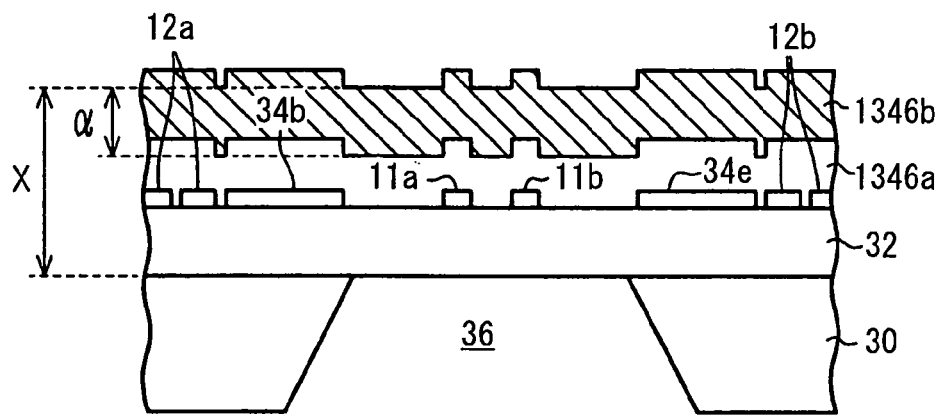
FIG. 53 is an enlarged cross-sectional view showing a flow sensor according to a seventeenth embodiment of the present invention.

A flow sensor 1700 according to a seventeenth embodiment of the present invention is shown in FIG. 53. The sensor 1700 includes the insulation film 32 made of silicon oxide film and the first and second passivation films 1346a, 1346b. The upstream and downstream heaters 11a, 11b, the upstream and downstream temperature detectors 12a, 12b and the lead wires 34b, 34e made of single crystal silicon are formed on the insulation film 32. The upstream and downstream heaters 11a, 11b, the upstream and downstream temperature detectors 12a, 12b and the lead wires 34b, 34e are covered with the first passivation film 1346a made of silicon oxide film and the second passivation film 1346b made of silicon nitride film. Here, the insulation film 32 and the first and second passivation films 1346a, 1346b are formed on whole the surface of the substrate including on the thin film portion 38.

Since the upstream and downstream heaters 11a, 11b, the upstream and downstream temperature detectors 12a, 12b and the lead wires 34b, 34e are made of single crystal silicon, the top surface of the thin film portion 38 has a small concavity and convexity, which is smaller than that of a sensor having the upstream and downstream heaters 11a, 11b, the upstream and downstream temperature detectors 12a, 12b and the lead wires 34b, 34e made of poly crystalline silicon. Here, since the poly crystalline silicon has a plurality of grain boundaries, a passivation film for covering the heaters 11a, 11b and the like made of poly crystalline silicon has a top surface with a concavity and convexity corresponding to the grain boundaries. Further, a ground substrate, on which the heaters 11a, 11b and the like are not disposed so that a passivation film is directly disposed on the ground substrate, also has a surface with a concavity and convexity corresponding to the concavity and convexity of the poly crystalline silicon film, because each grain of the poly crystalline silicon has a different etching time when part of poly crystalline silicon film disposed on the ground substrate, i.e., not disposed on the heaters 11a, 11b and the like, is etched and removed so as to expose the ground substrate and to form the heaters 11a, 11b and the like. When the thin film portion 38 is deformed, a stress is concentrated to the above concavity and convexity, so that the strength of the thin film portion 38 may be reduced. However, in a case where the heaters 11a, 11b and the like are made of single crystal silicon film, the surface of the passivation film has no concavity and convexity. Therefore, the thin film portion 38 becomes strong.

Although the surface of the passivation film is not flattened, the surface of the passivation film can be flattened so that the thin film portion 38 becomes much strong.

Figure 54:
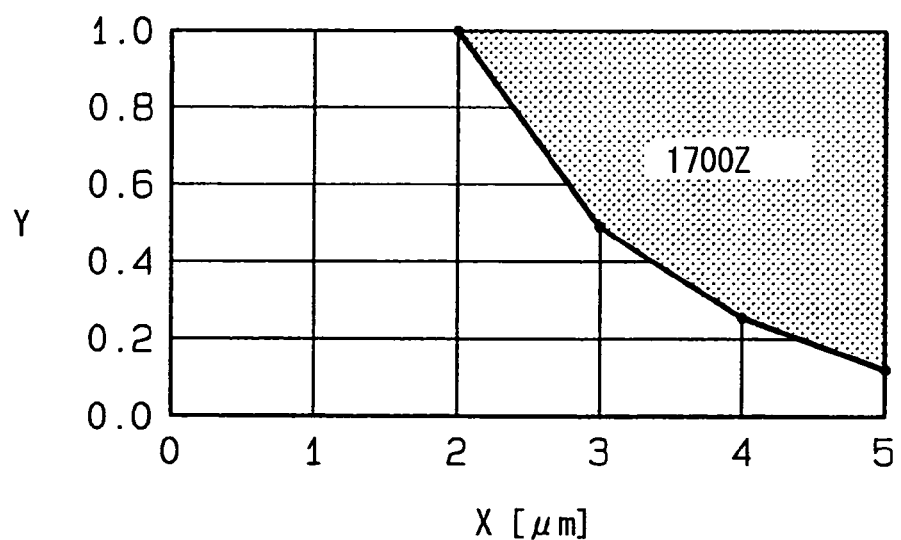
FIG. 54 is a graph explaining a region 1700Z in relation to a total thickness X of a thin film portion and a ratio Y, according to the seventeenth embodiment.

FIG. 54 shows a relationship between the total thickness X of the thin film portion 38 and the ratio Y of the thickness a of the silicon nitride film composing the second passivation film 1346b to the total thickness X (i.e., Y=α/X) in relation to a region 1700Z, in which the thin film portion of the sensor 1700 is not broken. Here, the ratio Y is equal to or smaller than 1.0.

As shown in FIG. 51, a condition of the sensor 1700 not to be broken is described as:

$$Y-4\exp\{-0.7X\}>0 \tag{F5}$$

FIG. 54 shows the region 1700Z, in which the total thickness X is equal to or smaller than 5.0 μm. That is because the detection accuracy of the sensor 1700 is reduced in a case where the total thickness X of the thin film portion 38 is larger than 5.0 μm. In the region 1700Z where the total thickness X of the thin film portion 38 is equal to or smaller than 5.0 μm, the second passivation film 1346b is set to be equal to or larger than 0.6 μm so that the thin film portion 38 is not broken. Accordingly, the second passivation film 1346b is set to satisfy the formula F5. Further, the total thickness X is equal to or smaller than 5.0 μm.

Next, the flow sensor 1700 is manufactured with the following method. As shown in FIGS. 55A to 55D, the SOI substrate is prepared. The SOI substrate includes the semiconductor substrate 30, the silicon oxide film 32, and the single crystal silicon film 48. The semiconductor substrate 30 is made of single crystal silicon having N-type conductivity. The thickness of the silicon oxide film 32 is 2.0 μm. The single crystal silicon film 48 has P-type conductivity, and the thickness of the single crystal silicon film 48 is 1.0 m.

Figure 55A:
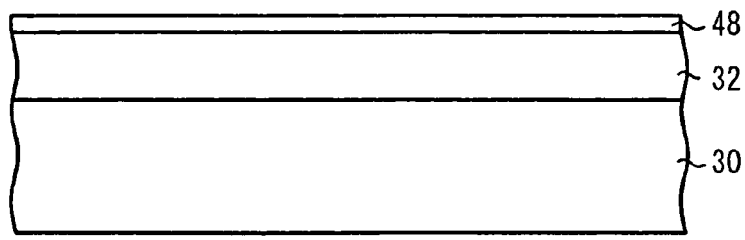
FIGS. 55A to 55D are cross-sectional views of the flow sensor explaining a manufacturing method for manufacturing the flow sensor according to the seventeenth embodiment.
Figure 55B:
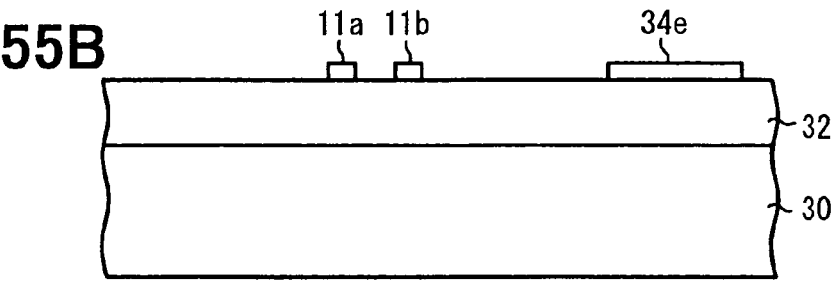

As shown in FIG. 55B, boron is doped into the single crystal silicon film 48 so that the impurity concentration of boron in the single crystal silicon film 48 is, for example, $1\times10^{20}\text{cm}^{-3}$. Then, the SOI substrate is heated at a predetermined temperature such as 1150° C. during a predetermined time such as 2 hours so as to activate the boron doped single crystal silicon film 48.

Then, the single crystal silicon film 48 is patterned into a predetermined pattern with using the reactive ion etching method so that the upstream and downstream heaters 11a, 11b, the upstream and downstream temperature detectors 12a, 12b and the lead wires 34a–34f are formed.

Figure 55C:
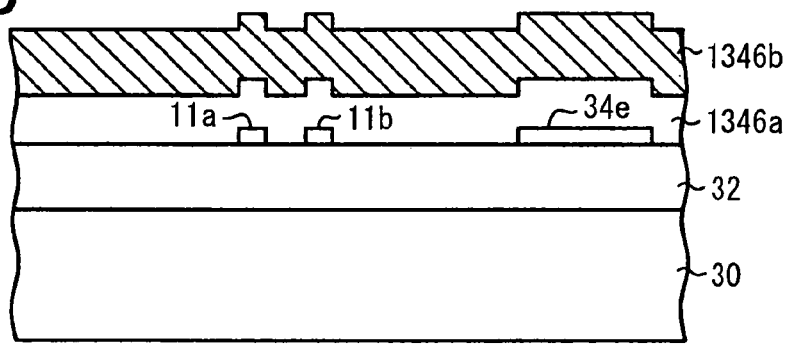
Figure 55D:
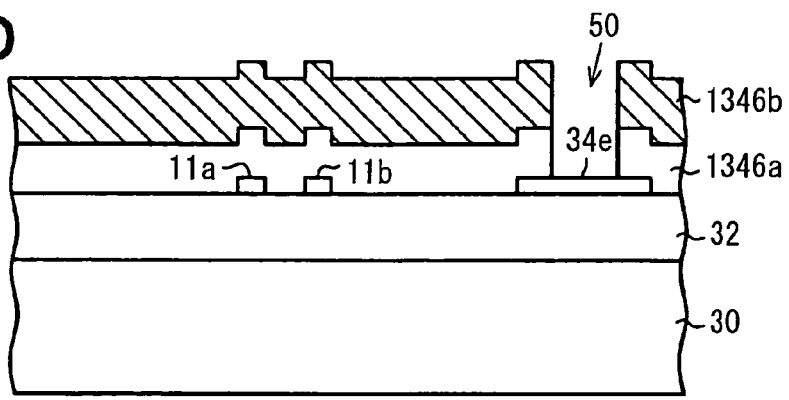

Next, as shown in FIG. 55C, the first passivation film 1346a made of silicon oxide film is formed on the silicon oxide film 32 with using the plasma CVD method. The thickness of the first passivation film 1346a is, for example, 0.2 μm. Then, the first passivation film 1346a is heated at a predetermined temperature such as 1100° C. during a predetermined time such as 2 hours so as to reduce the stress in the first passivation film 1346a. Further, the second passivation film 1346b made of silicon nitride film is formed on the first passivation film 1346a. The thickness of the second passivation film 1346b is, for example, 2.5 μm.

Then, the contact hole 50 is formed in the first and second passivation films 1346a, 1346b with using the reactive ion etching method so that the terminal 34e is formed in the contact hole 50. Then, the concavity 36 is formed so that the thin film portion 38 is formed. Thus, the sensor 1700 is completed.

The sensor 1700 includes the first and second passivation films 1346a, 1346b having an appropriate thickness and characteristics, so that the stress in the first and second passivation films 1346a, 1346b in the manufacturing process is reduced. Further, the sensor 1700 has high detection accuracy and high endurance against the particle hit on the thin film portion 38. Furthermore, the sensor 1700 with the first and second passivation film 1346a, 1346b having appropriate thickness so as to improve the strength of the thin film portion 38. Moreover, the concavity and convexity of the surface of the passivation film 1346a, 1346b is reduced, so that the sensor 1700, i.e., the thin film portion 38 becomes strong.

(Eighteenth Embodiment)

Figure 56:
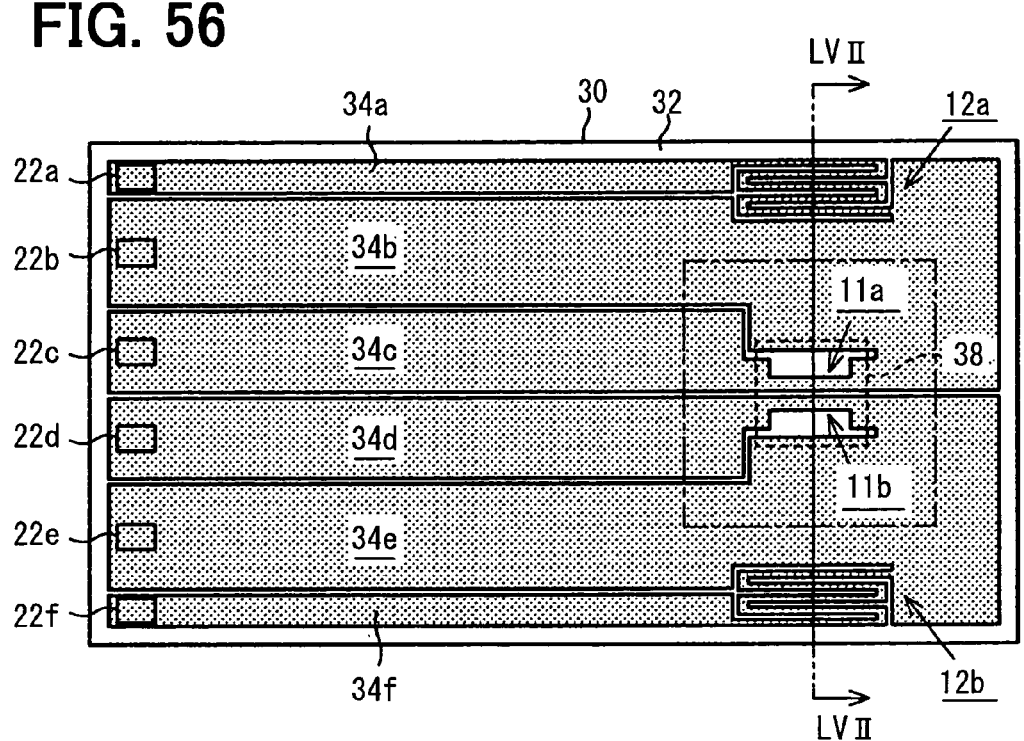
FIG. 56 is a plan view showing a flow sensor according to an eighteenth embodiment of the present invention.
Figure 57:
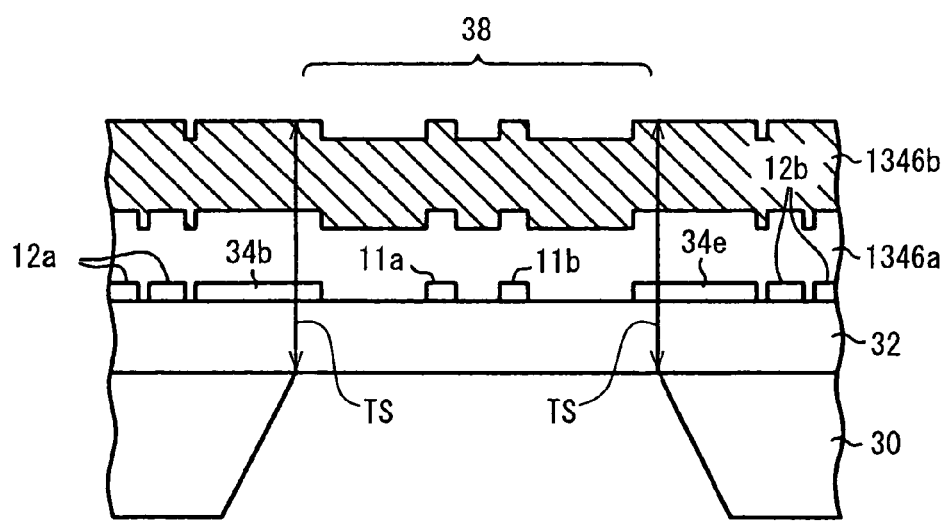
FIG. 57 is an enlarged cross-sectional view showing the flow sensor taken along line LVII—LVII in FIG. 56, according to the eighteenth embodiment.

A flow sensor 1800 according to an eighteenth embodiment of the present invention is shown in FIGS. 56 and 57. In the sensor 1800, the heaters 11a, 11b, the detectors 12a, 12b and the lewd wires 34a–34f are made of single crystal silicon film.

The lead wires 34b, 34e are protruded to the thin film portion 38 so that they cover two sides of the thin film portion 38, the two sides are disposed perpendicularly to the flow direction of fluid. Specifically, the lead wires 34b, 34e cover two edges of the thin film portion 38. Therefore, the thickness TS of the thin film portion 38 at the edge of the thin film portion 38 becomes thicker by the thickness of the lead wire 34b, 34e. Therefore, the thin film portion 38 becomes stronger, so that the protruded lead wire 34b, 34e works as a partially reinforcing member.

Since the edge of the thin film portion 38 becomes partially thicker, so that the strength of the thin film portion 38 becomes larger. Specifically, as shown in FIG. 44, the edge portion of the thin film portion 38 is easily damaged. Therefore, the edge portion of the thin film portion 38 becomes thicker so that the endurance of the thin film portion 38 is much improved.

Further, the thin film portion 38 has a rectangular shape and the two sides of the thin film portion 38 disposed in the longitudinal direction are covered with the lead wires 34b, 34e. Therefore, the endurance of the thin film portion 38 is much improved. That is because the stress applied to the two sides of the thin film portion 38 disposed in the longitudinal direction becomes largest in a case where the thin film portion 38 is deformed. Therefore, the two sides of the thin film portion 38 are reinforced, so that the thin film portion 38 becomes much stronger.

Preferably, the lead wires 34b, 34e are protruded from the two sides of the thin film portion 38 as little as possible. That is because the thermal capacity of the thin film portion 38 is required to be small.

Preferably, the heaters 11a, 11b and the like are made of single crystal silicon film. To compare the sensor 1800 having the heaters 11a, 11b and the like made of single crystal silicon film and a comparison sensor having the heaters 11a, 11b and the like made of poly crystalline silicon film, a destructive inspection is performed. Specifically, a pressure is applied to the surface of the thin film portion 38 so that a destruction pressure of destructing the thin film portion 38 is obtained. The strength, i.e., the maximum pressure of the sensor 1800 is twice larger than that of the comparison sensor.

Here, the lead wires 34b, 34e as the reinforcing member can be formed as a part thereof, so that there is no need to manufacture the reinforcing member in an additional process. Thus, the manufacturing cost of the sensor 1800 is reduced.

The sensor 1800 has high detection accuracy and high endurance against the particle hit on the thin film portion 38. Furthermore, the thin film portion 38 of the sensor 1800 becomes strong.

(Nineteenth Embodiment)

A flow sensor according to a nineteenth embodiment of the present invention has the heaters 11a, 11b, the detectors 12a, 12b and the lead wires 34a–34f made of poly crystalline silicon film. Therefore, the poly crystalline silicon film is used instead of the single crystal silicon film 48 in a manufacturing process. In this process, an impurity concentration doping to the poly crystalline silicon film is controlled so that the poly crystalline silicon film has a predetermined temperature coefficient of resistance TCR. Further, a manufacturing limitation is partially released.

Figure 58A:
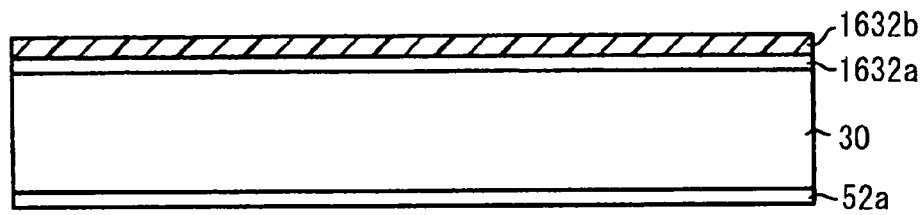
FIGS. 58A to 59C are cross-sectional views of a flow sensor explaining a manufacturing method for manufacturing the flow sensor according to a nineteenth embodiment of the present invention.
Figure 58B:
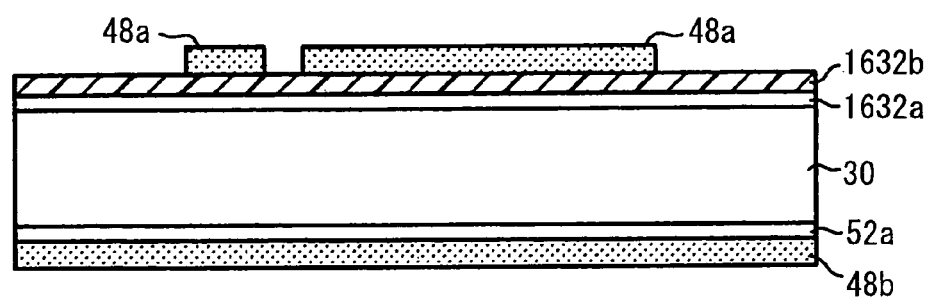

FIGS. 58A to 59C show a manufacturing process for manufacturing a flow sensor 1900 according to the nineteenth embodiment. As shown in FIG. 58A, the single crystal silicon substrate 30 having the N-type conductivity is prepared. Then, the silicon nitride film 52a is formed on the backside of the substrate 30, and the insulation film 32 made of the silicon nitride film is formed on the foreside of the substrate 30 with using the LP-CVD method. The thickness of each of the first insulation film 1632a and the silicon nitride film 52a is, for example, 0.31 μm. Each of the insulation film 1632a and the silicon nitride film 52a is formed in two steps such that firstly the silicon nitride film is deposited with the thickness of 0.151 m and then deposited with the thickness of 0.15 μm so as to form the silicon nitride film with the total thickness of 0.3 μm.

Next, the second insulation film 1632b made of silicon oxide film is formed on the first insulation film 1632a. The thickness of the second insulation film 1632b is, for example, 0.2 μm. To reduce a stress, the substrate 30 is annealed at 1000° C. during 10 minutes. Then, a poly crystalline silicon film is formed on both sides of the substrate 30 with using the LP-CVD method, so that poly crystalline silicon films 48a, 48b, are formed on the second insulation film 1632b and the silicon nitride film 52a, respectively. The thickness of each of the poly crystalline silicon films 48a, 48b is 0.741 μm. In this forming process, the poly crystalline silicon film is formed in two steps such that firstly the poly crystalline film is deposited with the thickness of 0.37 μm and then deposited with the thickness of 0.37 μm so as to form the poly crystalline silicon film with the total thickness of 0.7 μm. Then, phosphorous is doped into the poly crystalline silicon film 48a disposed on the second insulation film 1632b, and the poly crystalline silicon film 48a is patterned into a predetermined pattern. The above process for doping and patterning is described in detail as follows.

After the poly crystalline silicon film 48a is formed, the substrate 30 is annealed at, for example, 1000° C. so that a silicon oxide film (not shown) is formed on the surface of the poly crystalline silicon film 48a. The thickness of the silicon oxide film is about 40 nm to 50 nm. Then, the phosphorous is doped with using the ion implantation method. An acceleration voltage of the phosphorous ion is, for example, 130 keV, and the dose amount of the phosphorous ion is $3 \times 10^{16} cm^{-2}$, so that the phosphorous concentration in the poly crystalline silicon film 48a is $2 \times 10^{20} cm^{-3}$. Then, the poly crystalline silicon film 48a doped with the phosphorous is annealed at 1150° C. during 2 hours so as to activate the poly crystalline silicon film 48a. At the same time, a grain in the poly crystalline silicon film 48a grows bigger, so that the grain size becomes larger. Specifically, the poly crystalline silicon film 48a is composed of a plurality of grains made of single crystal silicon. Between the grains, a grain boundary is formed. When the poly crystalline silicon film 48a is annealed, the grain boundary is disappeared so that two grains are integrated together. Then, a larger grain is formed.

Next, the silicon oxide film disposed on the surface of the poly crystalline silicon film 48a is etched and removed with using HF (i.e., hydrofluoric acid) or BHF (i.e., buffered hydrofluoric acid) etchant. Then, a photoresist is coated on the poly crystalline silicon film 48a so that the poly crystalline silicon film 48a is patterned with using photolithography method. At that time, the phosphorous doped poly crystalline silicon film 48a is selectively etched, so that the upstream and downstream heaters 11a, 11b, the upstream and downstream temperature detectors 12a, 12b, the lead wires 34a–34f and the thermal conduction member 511a, 511b are formed. Then, the substrate 30 is annealed at 1000° C. so that a silicon oxide film (not shown) is formed on the surface of the poly crystalline silicon film 48a. The thickness of the silicon oxide film is about 70 nm to 80 nm.

Figure 58C:
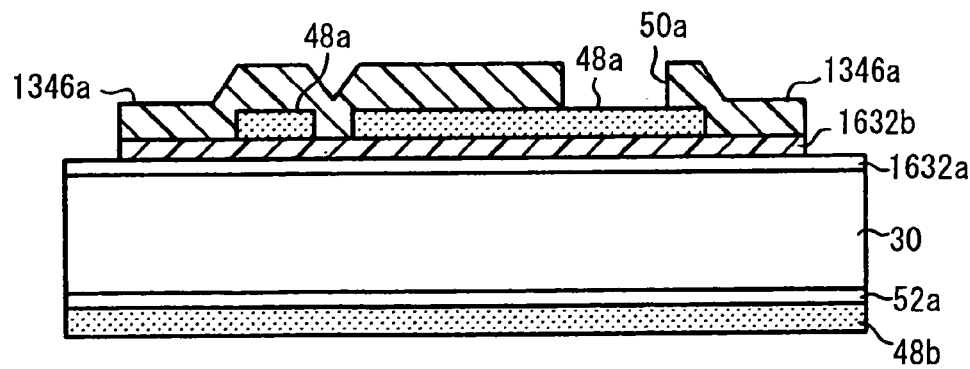

Next, as shown in FIG. 58C, the first passivation film 1346a made of borophosphosilicate glass (i.e., BPSG) is formed on the substrate 30 with using the CVD method. The thickness of the first passivation film 1346a is 0.84 m. Then, the first passivation film 1346a is annealed at, for example, 950° C. Next, a photoresist (not shown) is coated on the first passivation film 1346a, so that the first passivation film 1346a is patterned with using the photolithograph method. At that time, the first passivation film 1346a is selectively etched so that the contact hole 50a is formed.

Figure 59A:
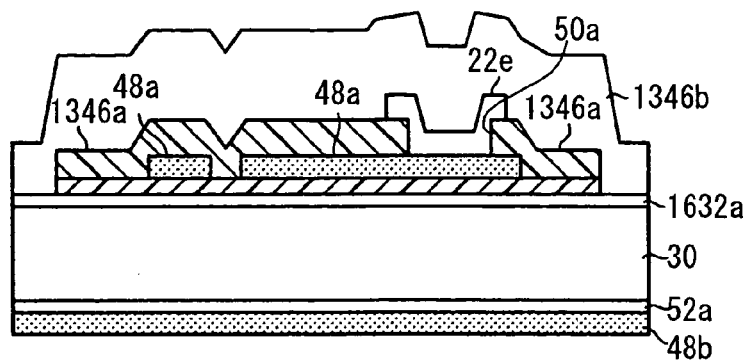

Further, as shown in FIG. 59A, a metal film such as aluminum silicon (i.e., AlSi) is deposited on the substrate 30 with using sputtering method. The thickness of the AlSi film is 1.1 $\mu$m. Then, the AlSi film is patterned so that the terminal 22e is formed in the contact hole 50a. After that, the AlSi film composing the terminal 22e is annealed at a predetermined temperature. Next, the second passivation film 1346b made of silicon nitride film is formed with using plasma CVD method. The thickness of the second passivation film 1346b is. 2.7 $\mu$m.

Figure 59B:
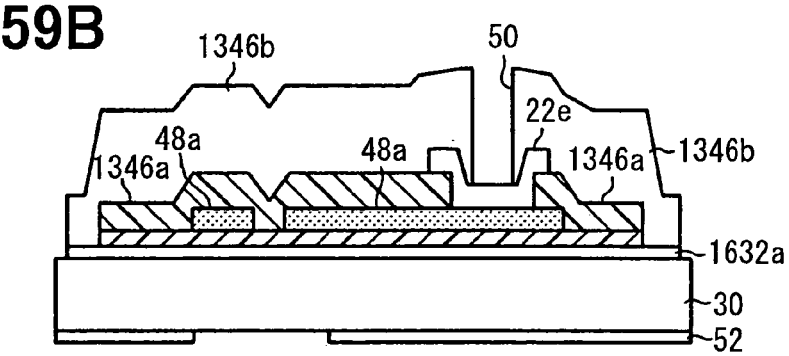
Figure 59C:
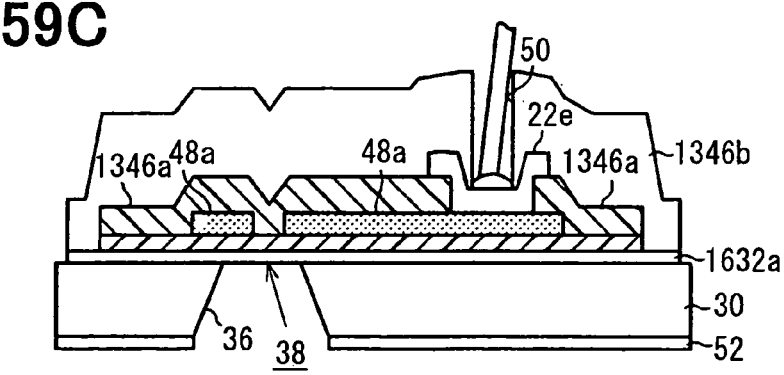

As shown in FIG. 59B, a photoresist (not shown) is coated on the second passivation film 1346b, so that the second passivation film 1346b is patterned with using photolithograph method. At that time, the second passivation film 1346b is selectively etched so that the contact hole 50 is formed. Then, the substrate 30 is annealed, and the backside of the substrate 30 is polished so that the thickness of the substrate 30 is 500 $\mu$m. At that time, the poly crystalline silicon film 48b and the silicon nitride film 52a disposed on the backside of the substrate 30 is removed.

Next, another silicon nitride film 52 is formed on the backside of the substrate 30 with using the plasma CVD method. The thickness of the silicon nitride film 52 is 0.5 $\mu$m. Then, a photoresist (not shown) is coated on the silicon nitride film 52, so that the silicon nitride film 52 is patterned with using the photolithograph method. At that time, the silicon nitride film 52 is selectively etched so that the opening of the silicon nitride film 52 is formed. Further, the backside of the substrate 30 is selectively etched with the silicon nitride film 52 as a mask by wet etching method so that the concavity 36 is formed. Thus, the thin film portion 38 is formed. Further, the terminal 22e is connected to an external circuit with a bonding wire such as gold (i.e., Au).

In this way, the heaters 11a, 11b and the like are formed with the poly crystalline silicon film 48a instead of single crystal silicon film, so that the sensor 1900 can be formed without using SOI substrate. Therefore, the manufacturing cost of the sensor 1900 without using the SOI substrate is decreased, since the SOI substrate is expensive. Further, the poly crystalline silicon film can be easily formed on an insulator, so that the manufacturing method can be simplified.

Figure 60:
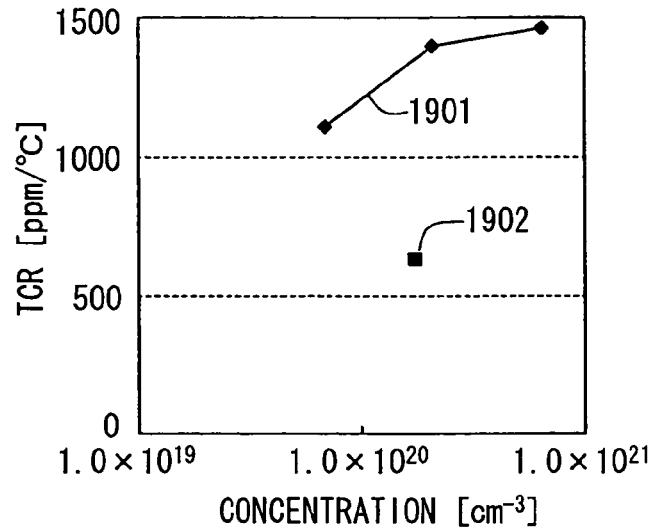
FIG. 60 is a graph showing a relationship between an impurity concentration in a poly crystalline silicon film and a temperature coefficient of resistance TCR, according to the nineteenth embodiment.

FIG. 60 shows a relationship between an impurity concentration and the temperature coefficient of resistance TCR in a sample heater made of poly crystalline silicon film, which has a line width of 10 $\mu$m and formed with the above manufacturing method. In FIG. 60, the first sample heater 1901 made of phosphorous doped poly crystalline silicon film, and the second sample heater 1902 made of boron doped poly crystalline silicon film are shown. The temperature coefficient of resistance TCR of the first heater 1901 is larger than that of the second sample heater 1902. That is because the phosphorous promotes to enlarge a grain in the poly crystalline silicon film much more than the boron. In general, the temperature coefficient of resistance TCR of the poly crystalline silicon film is smaller than that of the single crystal silicon film, since the poly crystalline silicon film has a plurality of grain boundaries. Therefore, the grain in the phosphorous doped poly crystalline silicon film becomes larger, so that the grain boundaries is reduced. That is, influence of the grain boundary for affecting the temperature coefficient of resistance TCR is decreased compared with the boron doped poly crystalline silicon film. Thus, the temperature coefficient of resistance TCR of the phosphorous doped poly crystalline silicon film has a certain value, which is close to the temperature coefficient of resistance TCR of the single crystal silicon film. Thus, the sensitivity of the sensor 1900 having the heaters 11a, 11b made of phosphorous doped poly crystalline silicon film is improved.

Further, as shown in FIG. 60, the temperature coefficient of resistance TCR of the phosphorous doped poly crystalline silicon film becomes large, as the phosphorous concentration n the film becomes larger. When the phosphorous concentration is about $2\times10^{20}$cm$^{-3}$, the temperature coefficient of resistance TCR becomes almost the maximum value of 1400 ppm/° C. to 1500 ppm/° C., i.e., a curve of the temperature coefficient of resistance TCR is substantially saturated. Thus, the phosphorous concentration in the film is preferably equal to or larger than $2\times10^{20}$cm$^{-3}$, and equal to or smaller than the limitation of solid solubility (i.e., the maximum solubility limit) of the phosphorous in the film.

Thus, the sensor 1900 has high sensitivity and can be formed with low cost.

(Twentieth Embodiment)

A flow sensor 2000 according to a twentieth embodiment of the present invention has the heaters 11a, 11b, the detectors 12a, 12b and the lead wires 34a–34f made of poly crystalline silicon film. In this embodiment, the phosphorous concentration in the poly crystalline silicon film is controlled such that an activation annealing for annealing the substrate 30 after phosphorous doping can be easily performed. In the manufacturing method for forming the sensor 2000, the phosphorous concentration is, for example, equal to or larger than $7\times10^{20}$cm$^{-3}$, i.e., the dose amount of the phosphorous on the film is equal to or larger than $5.2\times10^{16}$cm$^{-2}$. And then the phosphorous doped poly crystalline silicon film is annealed at, for example, 1000° C.

Figure 61:
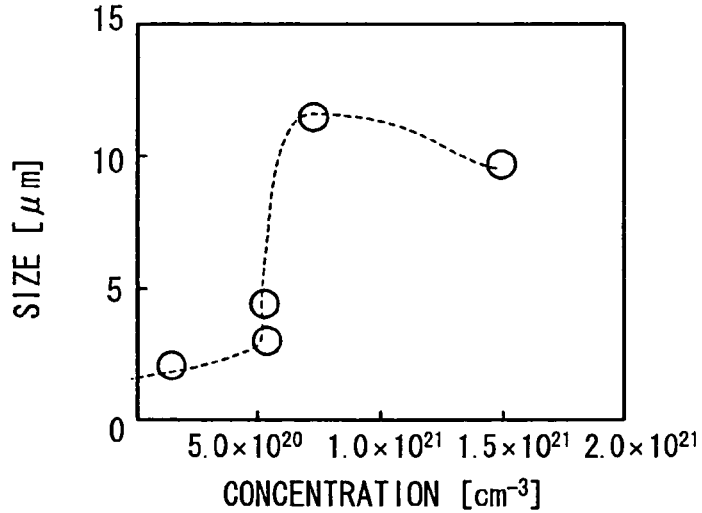
FIG. 61 is a graph showing a relationship between an impurity concentration in a poly crystalline silicon film and a grain size of the poly crystalline silicon film, according to a twentieth embodiment of the present invention.
Figure 62:
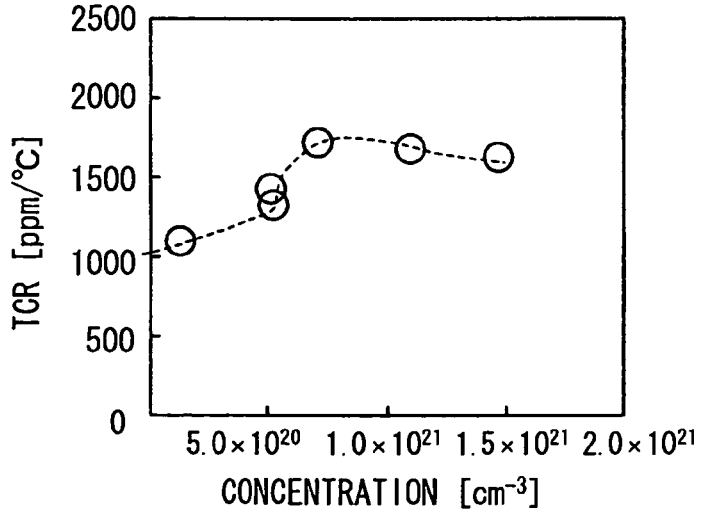
FIG. 62 is a graph showing a relationship between the impurity concentration in the poly crystalline silicon film and a temperature coefficient of resistance TCR, according to the twentieth embodiment.

FIG. 61 shows a relationship between an impurity concentration and an average grain size of the poly crystalline silicon film in a sample heater 2001 made of poly crystalline silicon film, which has a line width of 10 $\mu$m. FIG. 62 shows a relationship between an impurity concentration and the temperature coefficient of resistance TCR of the sample heater 2001.

Here, when the substrate 30 is annealed after the phosphorous is doped in the poly crystalline silicon film, the grain of the poly crystalline silicon film becomes larger. In this case, as the annealing temperature becomes higher, the average size of the grain becomes large. Therefore, as the annealing temperature becomes higher, the temperature coefficient of resistance TCR of the poly crystalline silicon film becomes large. For example, when the phosphorous concentration in the film is $6.3\times10^{20}$cm$^{-3}$, the temperature coefficient of resistance TCR is 1160 ppm/° C. in a case where the substrate 30 is annealed at 1000° C. When the phosphorous concentration in the film is $6.3\times10^{20}$cm$^{-3}$, the temperature coefficient of resistance TCR is 1450 ppm/° C. in a case where the substrate 30 is annealed at 1150° C.

However, the substrate 30 is annealed higher than 1150° C., the silicon nitride film 1632a may crack or a crystal defect may be generated in the substrate 30. Therefore, increase of the annealing temperature for increasing the temperature coefficient of resistance TCR is limited. Therefore, in this embodiment, the phosphorous concentration in the film is controlled so that the temperature coefficient of resistance TCR is increased. As shown in FIG. 61, as the phosphorous concentration in the film becomes larger, the grain of the film becomes large. Specifically, when the phosphorous concentration is in a range between $6\times10^{20}$ $cm^{-3}$ and $8\times10^{20}cm^{-3}$, the grain size of the poly crystalline silicon film is much increased. As shown in FIG. 62, when the phosphorous concentration is equal to or larger than $7\times10^{20}cm^{-3}$, the temperature coefficient of resistance TCR is in a range between 1400 ppm/° C. and 1600 ppm/° C., which is almost equal to that of the film annealed at 1150° C.

Therefore, the phosphorous concentration in the poly crystalline silicon is set to be equal to or larger than $7\times10^{20}cm^{-3}$, so that the temperature coefficient of resistance TCR becomes large. Thus, the sensitivity of the sensor 2000 is improved. Further, in this case, the annealing temperature is comparatively low, so that the yielding ratio of the sensor 2000 is improved.

Such changes and modifications are to be understood as being within the scope of the present invention as defined by the appended claims.

What is claimed is:

1. A flow sensor for detecting flow of fluid, the sensor comprising: a thin film portion including a heater and a detector for detecting temperature around the heater,
   wherein the heater is made of semiconductor;
   the thin film portion includes a passivation film for covering the heater;
   the heater consumes an electric power so that the sensor detects the flow on the basis of the electric power consumed in the heater;
   the heater includes a thermal conduction member made of heat conductive material, a heat conductivity of which is higher than that of the passivation film; and
   the thermal conduction member does not flow current.

2. The sensor according to claim 1,
   wherein the heater is made of semiconductor having P type conductivity, and has a width in a range between 7 μm and 80 μm.

3. The sensor according to claim 2,
   wherein the width of the heater is equal to or larger than 15 μm.

4. The sensor according to claim 2,
   wherein the semiconductor having P type conductivity is a boron doped silicon.

5. The sensor according to claim 4,
   wherein the semiconductor having P type conductivity has an impurity concentration being equal to or larger than $1\times10^{20}$ $cm^{-3}$.

6. The sensor according to claim 1,
   wherein the heater includes a plurality of line heaters, which are connected together in series, and
   wherein the line heater flows current in a direction, which is opposite to a direction of current flowing in a neighboring line heater.

7. The sensor according to claim 1,
   wherein the detector is made of semiconductor having P type conductivity, and has a width in a range between 7 μm and 80 μm.

8. The sensor according to claim 7,
   wherein the width of the detector is equal to or larger than 15 μm.

9. The sensor according to claim 1,
   wherein the detector includes a plurality of line detectors, which are connected together in series, and
   wherein the line detector flows current in a direction, which is opposite to a direction of current flowing in a neighboring line detector.

10. The sensor according to claim 1,
    wherein the thermal conduction member is insulated with the passivation film electrically.

11. The sensor according to claim 1,
    wherein the thermal conduction member connects to the heater at one portion with a thermal connection, a heat conductivity of which is higher than that of the passivation film.

12. The sensor according to claim 1,
    wherein the thermal conduction member directly connects to the heater, and extends toward a direction perpendicular to a longitudinal direction of the heater.

13. The sensor according to claim 1,
    wherein the heater is made of silicon.

14. The sensor according to claim 13,
    wherein the heater is made of boron doped silicon, and has a width being equal to or larger than 7 μm.

15. The sensor according to claim 14,
    wherein the width of the heater is equal to or larger than 15 μm.

16. The sensor according to claim 13,
    wherein the heater is made of poly crystalline silicon.

17. The sensor according to claim 16,
    wherein the heater is made of phosphorous doped poly crystalline silicon.

18. The sensor according to claim 17,
    wherein the phosphorous doped poly crystalline silicon has a phosphorous concentration being equal to or larger than $2\times10^{20}$ $cm^{-3}$.

19. The sensor according to claim 18,
    wherein the phosphorous doped poly crystalline silicon has a phosphorous concentration being equal to or larger than $7\times10^{20}$ $cm^{-3}$.

20. The sensor according to claim 1,
    wherein the thermal conduction member is disposed nearby the heater, and both ends of the thermal conduction member connect to the heater through a pair of thermal connections having electric conductivity,
    wherein the thermal conduction member has one contact point for connecting one thermal connection, and has the other contact point for connecting the other thermal connection, and
    wherein the one contact point has electric potential being equal to that of the other contact point.

21. The sensor according to claim 20,
    wherein the heater is made of silicon.

22. The sensor according to claim 21,
    wherein the heater is made of boron doped silicon, and has a width being equal to or larger than 7 μm.

23. The sensor according to claim 22,
    wherein the width of the heater is equal to or larger than 15 μm, the width being disposed in a direction perpendicular to a current flow direction of the heater.

24. The sensor according to claim 21,
    wherein the heater is made of poly crystalline silicon.

25. The sensor according to claim 24,
    wherein the heater is made of phosphorous doped poly crystalline silicon.

26. The sensor according to claim 25,
    wherein the phosphorous doped poly crystalline silicon has a phosphorous concentration being equal to or larger than $2\times10^{20}$ $cm^{-3}$.

27. The sensor according to claim 26,
wherein the phosphorous doped poly crystalline silicon has a phosphorous concentration being equal to or larger than $7 \times 10^{20}$ cm$^{-3}$.

28. The sensor according to claim 1,
wherein the thermal conduction member is made of the same material as that of the heater.

29. The sensor according to claim 1,
wherein the heater is made of silicon, and the thermal conduction member is made of silicon.

30. The sensor according to claim 29,
wherein the heater is made of poly crystalline silicon.

31. The sensor according to claim 30,
wherein the heater is made of phosphorous doped poly crystalline silicon.

32. The sensor according to claim 31,
wherein the phosphorous doped poly crystalline silicon has a phosphorous concentration being equal to or larger than $2 \times 10^{20}$ cm$^{-3}$.

33. The sensor according to claim 32,
wherein the phosphorous doped poly crystalline silicon has a phosphorous concentration being equal to or larger than $7 \times 10^{20}$ cm$^{-3}$.

34. The sensor according to claim 29,
wherein the heater includes a plurality of line heaters, which are connected together in series, and wherein the line heater flows current in a direction, which is opposite to a direction of current flowing in a neighboring line heater.

35. The sensor according to claim 1,
wherein the heater is made of boron doped silicon, and has a narrow portion,
wherein the narrow portion narrows a width of the heater in a direction perpendicular to a current flow direction of the heater so that the narrow portion limits the current flowing in the heater, and
wherein the narrow portion has a minimum width being equal to or larger than 7 $\mu$m.

36. The sensor according to claim 35,
wherein the minimum width of the narrow portion is equal to or larger than 15 $\mu$m.

37. The sensor according to claim 1,
wherein the heater includes a plurality of line heaters connecting together in parallel, and
wherein each line heater is made of boron doped silicon, and has a width being equal to or larger than 7 $\mu$m.

38. The sensor according to claim 37,
wherein the width of the line heater is equal to or larger than 15 $\mu$m.

39. The sensor according to claim 1, further comprising:
a lead wire connecting to the heater for supplying electric power to the heater,
wherein the heater is provided by a resistor,
wherein the resistor and the lead wire are made of semiconductor film, and
wherein the resistor is locally thinned.

40. The sensor according to claim 39,
wherein the detector is provided by another resistor.

41. The sensor according to claim 40,
wherein part of the heater and the detector disposed in a region projected in a flow direction of the fluid is thinned.

42. The sensor according to claim 41,
wherein the heater and the detector are provided as a non-insulated region, which is disposed in a partially insulated semiconductor film by heat treatment.

43. The sensor according to claim 42,
wherein the heat treatment is a thermal oxidation.

44. The sensor according to claim 1, further comprising:
a passivation film,
wherein at least one of the heater and the detector is made of a semiconductor resistor,
wherein the passivation film covers the heater and the detector, and
wherein the semiconductor resistor has a surface covered with a thermal oxidation film.

45. The sensor according to claim 44,
wherein the surface of the semiconductor resistor is performed with thermal oxidation so as to form the thermal oxidation film.

46. The sensor according to claim 1, further comprising:
a passivation film,
wherein the passivation film covers at least one surface of the heater and the detector, one surface being disposed in a passage of the fluid, and
wherein the passivation film is made of silicon nitride film having silicon rich composition, in which a ratio of silicon to nitrogen is larger than that in a stoichiometric composition.

47. The sensor according to claim 46,
wherein the silicon nitride film is formed with using a thermal chemical vapor deposition method.

48. The sensor according to claim 46,
wherein the passivation film has a refractive index between 2.1 and 2.3.

49. The sensor according to claim 46,
wherein the passivation film has a thickness being equal to or larger than 0.6 $\mu$m.

50. The sensor according to claim 46,
wherein the thin film portion has a thickness being equal to or larger than 2.0 $\mu$m.

51. The sensor according to claim 46,
wherein the thin film portion has a thickness being equal to or smaller than 5.0 $\mu$m.

52. The sensor according to claim 46, further comprising:
an insulation film,
wherein the insulation film covers the other surface of the heater and the detector, the other surface being disposed opposite to the one surface, and
wherein the insulation film is made of silicon nitride film having silicon rich composition, in which a ratio of silicon to nitrogen is larger than that in a stoichiometric composition.

53. The sensor according to claim 52, further comprising:
another passivation film made of silicon oxide film; and
another insulation film made of silicon oxide film,
wherein the another passivation film has a thickness, and the another insulation film has another thickness so that a total thickness thereof is defined as $\alpha$,
wherein the passivation film has a thickness, and the insulation film has another thickness so that a total thickness thereof is defined as $\beta$,
wherein the total thickness $\alpha$ and the total thickness $\beta$ have a following relationship as:

$(\beta/\alpha+\beta)-2.7 \cdot \exp\{-0.5 \cdot (\alpha+\beta)\} > 0$, and wherein the thickness $\alpha$ is positive.

54. The sensor according to claim 53,
wherein the another insulation film is disposed on the insulation film, the heater and the detector are disposed on the another insulation film, the another passivation film is disposed on the heater and the detector, and the passivation film is disposed on the another passivation film.

55. The sensor according to claim 46, further comprising:
another passivation film made of silicon oxide film;
an insulation film made of silicon oxide film,
wherein the another passivation film has a thickness, and the insulation film has another thickness so that a total thickness thereof is defined as $\alpha$,
wherein the passivation film has a thickness defined as $\beta$,
wherein the total thickness $\alpha$ and the thickness $\beta$ have a following relationship as:

$$(\beta/\alpha+\beta)-4.0 \cdot \exp\{-0.7 \cdot (\alpha+\beta)\} > 0, \text{ and}$$

wherein the thickness $\alpha$ is positive.

56. The sensor according to claim 46, further comprising:
a semiconductor substrate having a concavity,
wherein the thin film portion is disposed on the concavity as a bridge portion,
wherein the thin film portion has two edges disposed in a longitudinal direction of the detector, and
wherein the two edges are covered with a reinforcing film disposed on the same layer as the detector.

57. The sensor according to claim 56,
wherein the reinforcing film is made of the same material as the detector.

58. The sensor according to claim 56,
wherein the reinforcing film and the detector are made of poly crystalline silicon.

59. The sensor according to claim 56,
wherein the reinforcing film and the detector are made of single crystal silicon.

60. A method for manufacturing a flow sensor according to claim 1, the method comprising the steps of:
forming the thin film portion with using a silicon substrate,
forming the heater and the detector in the thin film portion,
forming the passivation film in the thin film portion, and
forming the thermal conduction member in the heater.

61. The method according to claim 60,
wherein the heater is made of semiconductor having P type conductivity, and has a width in a range between 7 $\mu$m and 80 $\mu$m.

62. The method according to claim 61,
wherein the heater is made of boron doped single crystal silicon.

63. The method according to claim 62,
wherein the boron doped single crystal silicon has a boron concentration being equal to or larger than $1 \times 10^{20}$ cm$^{-3}$.

64. The method according to claim 61,
wherein the heater is made of phosphorous doped poly crystalline silicon.

65. The method according to claim 64,
wherein the phosphorous doped poly crystalline silicon has a phosphorous concentration being equal to or larger than $2 \times 10^{20}$ cm$^{-3}$.

66. The method according to claim 60,
wherein the detector is made of semiconductor having P type conductivity, and has a width in a range between 7 $\mu$m and 80 $\mu$m.

* * * * *